United States Patent
Shirwadkar et al.

(10) Patent No.: US 12,547,656 B2
(45) Date of Patent: Feb. 10, 2026

(54) METHOD AND SYSTEM FOR ENTITY EXTRACTION AND DISAMBIGUATION

(71) Applicant: YAHOO ASSETS LLC, New York, NY (US)

(72) Inventors: Sanika Shirwadkar, Sunnyvale, CA (US); Daozheng Chen, Sunnyvale, CA (US); Guillaume Le Chenadec, Sunnyvale, CA (US); Ralph Rabbat, San Carlos, CA (US); Prateeksha Uday Chandraghatgi, San Jose, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 0 days.

(21) Appl. No.: 18/317,563

(22) Filed: May 15, 2023

(65) Prior Publication Data
US 2023/0306052 A1 Sep. 28, 2023

Related U.S. Application Data

(63) Continuation of application No. 14/874,814, filed on Oct. 5, 2015, now Pat. No. 11,675,824.

(51) Int. Cl.
*G06F 16/36* (2019.01)
(52) U.S. Cl.
CPC .................. *G06F 16/36* (2019.01)
(58) Field of Classification Search
CPC ...... G06F 16/36; G06F 16/335; G06F 16/337; G06F 16/635
See application file for complete search history.

(56) References Cited

U.S. PATENT DOCUMENTS

| | | | |
|---|---|---|---|
| 5,659,724 A | 8/1997 | Borgida et al. | |
| 6,295,541 B1* | 9/2001 | Bodnar | G06F 16/275 |
| | | | 707/999.203 |
| 7,539,697 B1 | 5/2009 | Akella et al. | |
| 8,364,692 B1* | 1/2013 | Allen | G06F 16/90344 |
| | | | 707/758 |
| 2002/0107827 A1 | 8/2002 | Benitez-Jimenez et al. | |
| 2007/0005750 A1 | 1/2007 | Lunt et al. | |
| 2007/0295797 A1* | 12/2007 | Herman | G06Q 10/10 |
| | | | 235/375 |
| 2008/0270458 A1 | 10/2008 | Gvelesiani | |
| 2009/0119245 A1 | 5/2009 | Lynch | |
| 2009/0281988 A1 | 11/2009 | Yoo | |

(Continued)

OTHER PUBLICATIONS

Jiexun Li & G. Alan Wang & Hsinchun Chen, Identity matching using personal and social identity features, Inf Syst Front (2011) 13: 101-113. (Year: 2011).*

(Continued)

*Primary Examiner* — Cheyne D Ly
(74) *Attorney, Agent, or Firm* — Venable LLP

(57) ABSTRACT

The present teaching relates to entity extraction and disambiguation. In one example, an entity name extracted from a data source associated with a user is obtained. One or more entity types associated with the entity name are determined. One or more entity candidates are identified with respect to each of the one or more entity types. An entity candidate is selected with respect to one of the one or more entity types to be an individual associated with the entity name.

11 Claims, 29 Drawing Sheets

(56) References Cited

U.S. PATENT DOCUMENTS

| | | |
|---|---|---|
| 2010/0057772 A1 | 3/2010 | Manolescu et al. |
| 2010/0161662 A1 | 6/2010 | Jonas et al. |
| 2010/0179855 A1 | 7/2010 | Chen et al. |
| 2010/0191748 A1* | 7/2010 | Martin .................. G06F 16/334 707/E17.084 |
| 2011/0072052 A1 | 3/2011 | Skarin et al. |
| 2011/0125770 A1 | 5/2011 | Battestini et al. |
| 2011/0208740 A1 | 8/2011 | Lynch |
| 2011/0246482 A1 | 10/2011 | Badenes et al. |
| 2011/0270628 A1 | 11/2011 | Mital et al. |
| 2012/0078906 A1* | 3/2012 | Anand ................. G06Q 10/105 707/E17.089 |
| 2012/0109966 A1 | 5/2012 | Liang et al. |
| 2012/0144317 A1 | 6/2012 | Balasubramanian et al. |
| 2012/0246182 A1 | 9/2012 | Stephens, Jr. |
| 2012/0323877 A1 | 12/2012 | Ray et al. |
| 2012/0323890 A1 | 12/2012 | Dixon et al. |
| 2013/0204894 A1 | 8/2013 | Faith et al. |
| 2013/0325858 A1* | 12/2013 | Xu ......................... G06F 16/335 707/730 |
| 2013/0345971 A1 | 12/2013 | Stamm et al. |
| 2013/0346069 A1 | 12/2013 | Huang et al. |
| 2014/0136504 A1 | 5/2014 | Shum et al. |
| 2014/0164372 A1 | 6/2014 | Bitonti et al. |
| 2014/0324597 A1 | 10/2014 | Schoen et al. |
| 2015/0052128 A1 | 2/2015 | Sharifi |
| 2015/0081784 A1 | 3/2015 | Ng et al. |
| 2015/0220588 A1 | 8/2015 | Krauss |
| 2015/0286747 A1 | 10/2015 | Anastasakos et al. |
| 2015/0324454 A1 | 11/2015 | Roberts et al. |
| 2015/0347593 A1 | 12/2015 | Tsai et al. |
| 2015/0350372 A1 | 12/2015 | Griffin |
| 2016/0070806 A1 | 3/2016 | Kergin et al. |
| 2016/0147758 A1 | 5/2016 | Chhaya et al. |
| 2016/0171537 A1 | 6/2016 | Fanous et al. |
| 2017/0024375 A1 | 1/2017 | Hakkani-Tur et al. |
| 2017/0083963 A1 | 3/2017 | Agarwal |

OTHER PUBLICATIONS

Lev Ratinov, Local and Global Algorithms for Disambiguation to Wikipedia, Proceedings of the 49th Annual Meeting of the Association for Computational Linguistics, pp. 1375-1384,Portland, Oregon, Jun. 19-24, 2011 (Year: 2011).*

Nado et al., Extracting Entity Profiles from Semistructured Information Spaces, SIGMOD Record, vol. 26, No. 4, Dec. 1997, pp. 32-38. (Year: 1997).*

Papadakis et al., Efficient Entity Resolution for Large Heterogeneous Information Spaces, WSDM'11, Feb. 9-12, 2011, Hong Kong, China, pp. 535-544. (Year: 2011).*

Office Action mailed Dec. 17, 2021 in U.S. Appl. No. 14/874,768.

Office Action mailed Nov. 1, 2022 in U.S. Appl. No. 14/874,768.

Goga, "Matching user accounts across on line social networks: methods and applications", Jun. 18, 2015, pp. 1-151, Universite Pierre et Marie Curie, Paris, France.

Final Office Action mailed Mar. 27, 2024 in U.S. Appl. No. 14/874,768.

Office Action mailed Oct. 2, 2023 in U.S. Appl. No. 14/874,768.

* cited by examiner

Fig. 11

METHOD AND SYSTEM FOR ENTITY EXTRACTION AND DISAMBIGUATION

CROSS-REFERENCE TO RELATED APPLICATIONS

The present application is a continuation of U.S. patent application Ser. No. 14/874,814, filed on Oct. 5, 2015, which is related to U.S. patent application Ser. No. 14/874,768, filed Oct. 5, 2015, the contents of which are hereby incorporated by reference in their entirety.

BACKGROUND

1. Technical Field

The present teaching generally relates to organizing, retrieving, presenting, and utilizing information. Specifically, the present teaching relates to methods and systems for entity extraction and disambiguation.

2. Discussion of Technical Background

The Internet has made it possible for a person to electronically access virtually any content at any time and from any location. The Internet technology facilitates information publishing, information sharing, and data exchange in various spaces and among different persons. One problem associated with the rapid growth of the Internet is the so-called "information explosion," which is the rapid increase in the amount of available information and the effects of this abundance. As the amount of available information grows, the problem of managing the information becomes more difficult, which can lead to information overload. With the explosion of information, it has become more and more important to provide users with information from a public space that is relevant to the individual person and not just information in general.

In addition to the public space such as the Internet, semi-private spaces including social media and data sharing sites have become another important source where people can obtain and share information in their daily lives. The continuous and rapid growth of social media and data sharing sites in the past decade has significantly impacted the lifestyles of many; people spend more and more time on chatting and sharing information with their social connections in the semi-private spaces or use such semi-private sources as additional means for obtaining information and entertainment. Similar to what has happened in the public space, information explosion has also become an issue in the social media space, especially in managing and retrieving information in an efficient and organized manner.

Private space is another data source used frequently in people's everyday lives. For example, personal emails in Yahoo! mail, Gmail, Outlook etc. and personal calendar events are considered as private sources because they are only accessible to a person when she or he logs in using private credentials. Although most information in a person's private space may be relevant to the person, it is organized in a segregated manner. For example, a person's emails may be organized by different email accounts and stored locally in different email applications or remotely at different email servers. As such, to get a full picture of some situation related to, e.g., some event, a person often has to search different private spaces to piece everything together. For example, to check with a friend of the actual arrival time for a dinner, one may have to first check a particular email (in the email space) from the friend indicating the time the friend will arrive, and then go to Contacts (a different private space) to search for the friend's contact information before making a call to the friend to confirm the actual arrival time. This is not convenient.

The segregation of information occurs not only in the private space, but also in the semi-private and public spaces. This has led to another consequential problem given the information explosion: requiring one to constantly look for information across different segregated spaces to piece everything together due to lack of meaningful connections among pieces of information that are related in actuality yet isolated in different segregated spaces.

Efforts have been made to organize the huge amount of available information to assist a person to find the relevant information. Conventional scheme of such effort is application-centric and/or domain-centric. Each application carves out its own subset of information in a manner that is specific to the application and/or specific to a vertical or domain. For example, such attempt is either dedicated to a particular email account (e.g., www.Gmail.com) or specific to an email vertical (e.g., Outlook); a traditional web topical portal allows users to access information in a specific vertical, such as www.IMDB.com in the movies domain and www.ESPN.com in the sports domain. In practice, however, a person often has to go back and forth between different applications, sometimes across different spaces, in order to complete a task because of the segregated and unorganized nature of information existing in various spaces. Moreover, even within a specific vertical, the enormous amount of information makes it tedious and time consuming to find the desired information.

Another line of effort is directed to organizing and providing information in an interest-centric manner. For example, user groups of social media in a semi-private space may be formed by common interests among the group members so that they can share information that is likely to be of interest to each other. Web portals in the public space start to build user profiles for individuals and recommend content based on an individual person's interests, either declared or inferred. The effectiveness of interest-centric information organization and recommendation is highly relied on the accuracy of user profiling. Oftentimes, however, a person may not like to declare her/his interests, whether in a semi-private space or a public space. In that case, the accuracy of user profiling can only be relied on estimation, which can be questionable. Accordingly, neither of the application-centric, domain-centric, and interest-centric ways works well in dealing with the information explosion challenge.

FIG. 1 depicts a traditional scheme of information organization and retrieval in different spaces in a segregated and disorganized manner. A person 102 has to interact with information in private space 104, semi-private space 106, and public space 108 via unrelated and separate means 110, 112, 114, respectively. For accessing private data from the private space 104, means 110, such as email applications, email sites, local or remote Contacts and calendars, etc., has to be selected and used. Each means 110 is domain or application-oriented, allowing the person 102 to access information related to the domain with the specific application that the means 110 is developed for. Even for information residing within different applications/domains in the private space 104, a person 102 still has to go by different means 110 to access content of each application/domain, which is not convenient and not person-centric. For example, in order to find out the phone numbers of attendees of a birthday party, the person 102 has to first find all the confirmation emails from the attendees (may be sent in different emails and even to different email accounts), write down each name, and open different Contacts to look for their phone numbers.

Similarly, for interacting with the semi-private space 106, a person 102 needs to use a variety of means 112, each of which is developed and dedicated for a specific semi-private data source. For example, Facebook desktop application, Facebook mobile app, and Facebook site are all means for accessing information in the person 102's Facebook account. But when the person 102 wants to open any document shared on Dropbox by a Facebook friend, the person 102 has to switch to another means dedicated to Dropbox (a desktop application, a mobile app, or a website). As shown in FIG. 1, information may be transmitted between the private space 104 and the semi-private space 106. For instance, private photos can be uploaded to a social media site for sharing with friends; social media or data sharing sites may send private emails to a person 102's private email account notifying her/him of status updates of social friends. However, such information exchange does not automatically create any linkage between data between the private and semi-private spaces 104, 106. Thus, there is no application that can keep track of such information exchange and establish meaningful connections, much less utilizing the connections to make it easier to search for information.

As to the public space 108, means 114 such as traditional search engines (e.g., www.Google.com) or web portals (e.g., www.CNN.com, www.AOL.com, www.IMDB.com, etc.) are used to access information. With the increasing challenge of information explosion, various efforts have been made to assist a person 102 to efficiently access relevant and on-the-point content from the public space 108. For example, topical portals have been developed that are more domain-oriented as compared to generic content gathering systems such as traditional search engines. Examples include topical portals on finance, sports, news, weather, shopping, music, art, movies, etc. Such topical portals allow the person 102 to access information related to subject matters that these portals are directed to. Vertical search has also been implemented by major search engines to help to limit the search results within a specific domain, such as images, news, or local results. However, even if limiting the search result to a specific domain in the public space 108, there is still an enormous amount of available information, putting much burden on the person 102 to identify desired information.

There is also information flow among the public space 108, the semi-private space 106, and the private space 104. For example, www.FedeEx.com (public space) may send a private email to a person 102's email account (private space) with a tracking number; a person 102 may include URLs of public websites in her/his tweets to followers. However, in reality, it is easy to lose track of related information residing in different spaces. When needed, much effort is needed to dig them out based on memory via separate means 110, 112, 114 across different spaces 104, 106, 108. In today's society, this consumes more and more people's time.

Because information residing in different spaces or even within the same space is organized in a segregated manner and can only be accessed via dedicated means, the identification and presentation of information from different sources (whether from the same or different spaces) cannot be made in a coherent and unified manner. For example, when a person 102 searches for information using a query in different spaces, the results yielded in different search spaces are different. For instance, search result from a conventional search engine directed to the public space 108 is usually a search result page with "blue links," while a search in the email space based on the same query will certainly look completely different. When the same query is used for search in different social media applications in the semi-private space 106, each application will again likely organize and present the search result in a distinct manner. Such inconsistency affects user experience. Further, related information residing in different sources is retrieved piece meal so that it requires the person 102 to manually connect the dots provide a mental picture of the overall situation.

Therefore, there is a need for improvements over the conventional approaches to organize, retrieve, present, and utilize information.

SUMMARY

The present teaching relates to methods, systems, and programming for entity extraction and disambiguation.

In one example, a method, implemented on a machine having at least one processor, storage, and a communication platform capable of connecting to a network for determining an individual associated with an entity name is disclosed. An entity name extracted from a data source associated with a user is obtained. One or more entity types associated with the entity name are determined. One or more entity candidates are identified with respect to each of the one or more entity types. An entity candidate is selected with respect to one of the one or more entity types to be an individual associated with the entity name.

In a different example, a system having at least one processor, storage, and a communication platform connected to a network for determining an individual associated with an entity name is disclosed. The system comprises an entity type determiner configured for obtaining an entity name extracted from a data source associated with a user and determining one or more entity types associated with the entity name; an entity candidate determiner configured for identifying one or more entity candidates with respect to each of the one or more entity types; and an entity individual selector configured for selecting an entity candidate with respect to one of the one or more entity types to be an individual associated with the entity name.

Other concepts relate to software for implementing the present teaching on entity extraction and disambiguation. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for determining an individual associated with an entity name is disclosed. The information, when read by the machine, causes the machine to perform the following. An entity name extracted from a data source associated with a user is obtained. One or more entity types associated with the entity name are determined. One or more entity candidates are identified with respect to each of the one or more entity types. An entity candidate is selected with respect to one of the one or more entity types to be an individual associated with the entity name.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 illustrates an exemplary search results card, according to an embodiment of the present teaching;

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high level, without detail, in order to avoid unnecessarily obscuring aspects of the present teachings.

The present teaching describes methods, systems, and programming aspects of efficiently and effectively organizing, retrieving, presenting, and utilizing information.

Figure 1:
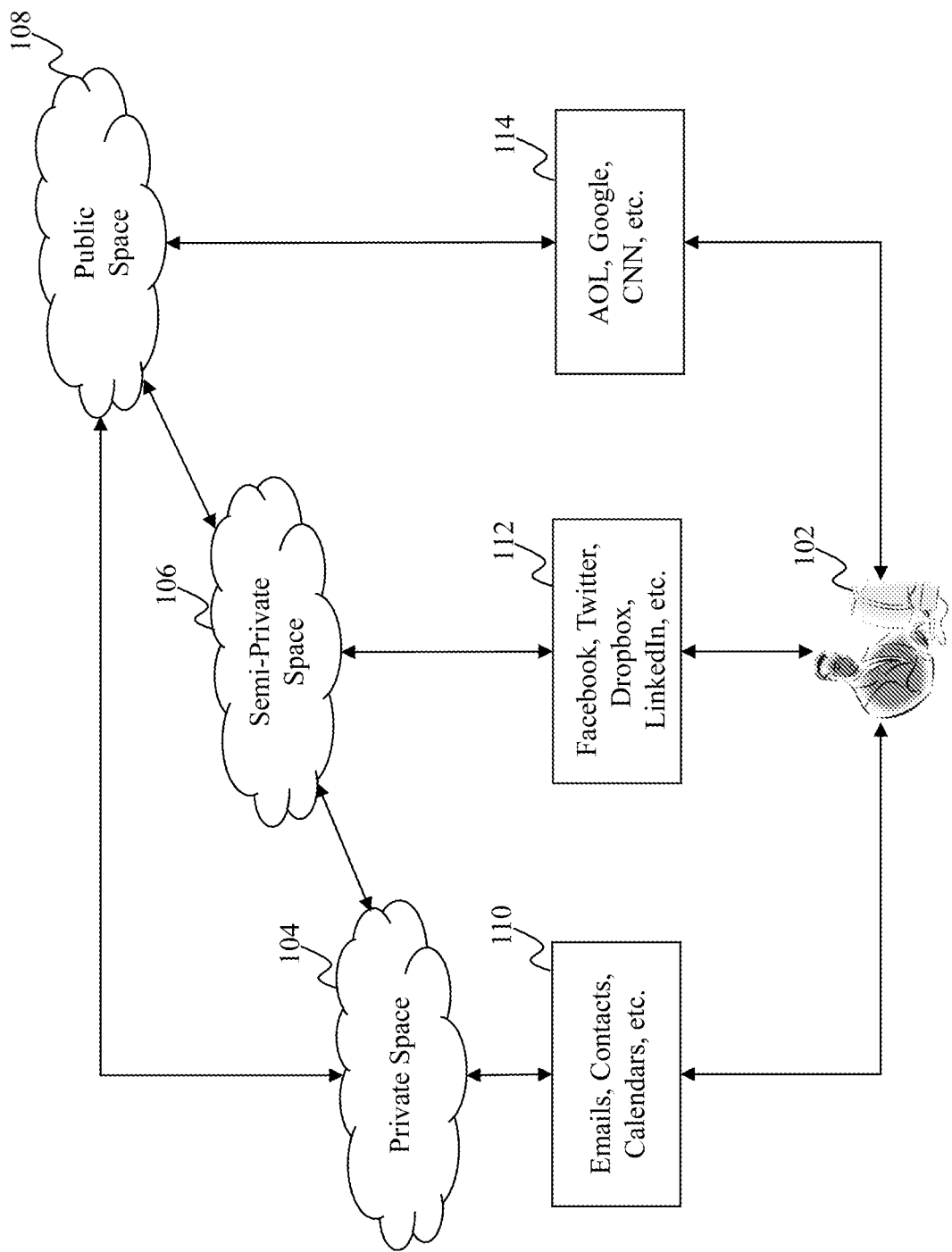
FIG. 1 (prior art) depicts a traditional scheme of information organization and retrieval from different spaces in a segregated and disorganized manner.
Figure 2:
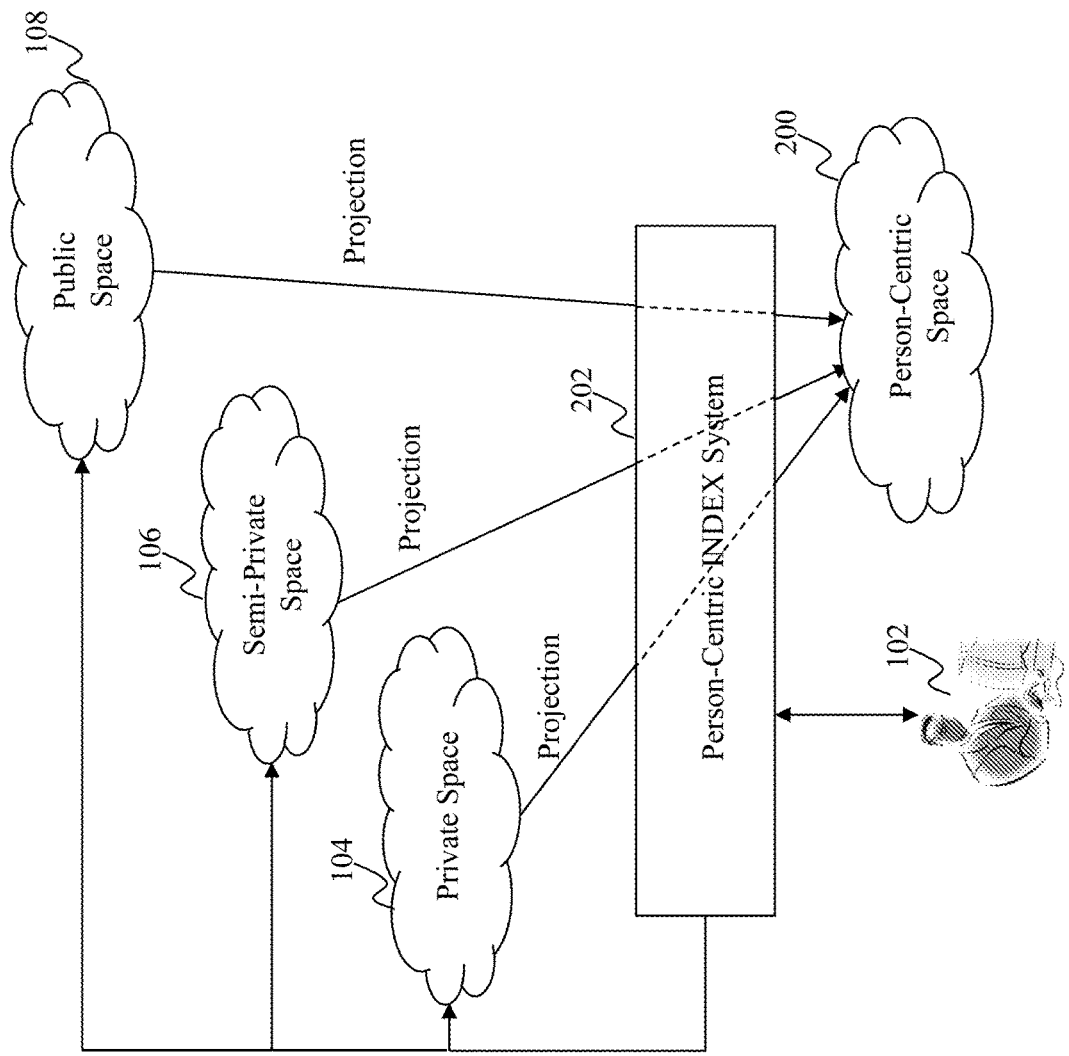
FIG. 2 depicts a novel scheme of building a person-centric space for a person by cross-linking data from different spaces and applications thereof, according to an embodiment of the present teaching.

FIG. 2 depicts a novel scheme of building a person-centric space 200 for a person 102 by cross-linking data from different spaces and applications thereof, according to an embodiment of the present teaching. Unlike the traditional approach to organize information in different spaces in a segregated and disorganized manner, as illustrated in FIG. 1, FIG. 2 provides a person-centric INDEX system 202, which builds the person-centric space 200 specific to the person 102 by digesting information from the public space 108, semi-private space 106, and private space 104 and cross-linking relevant data from those spaces 104, 106, 108. As described herein, a person 102 referred herein may include a human being, a group of people, an organization such as a business department or a corporation, or any unit that can use the person-centric INDEX system 202. A space, whether private, semi-private, or public, may be a collection of information in one or more sources. Through the person-centric INDEX system 202, information relevant to the person 102 from each of the private, semi-private, and public spaces 104, 106, and 108 is projected, into the person-centric space 200 in a meaningful manner. That is, a part of the data in the person-centric space 200 is projected from the public space 108 in a manner relevant to the person 102; a part of the data in the person-centric space 200 is projected from the semi-private space 106 in a manner relevant to the person 102; a part of the data in the person-centric space 200 is projected from the private space 104. Thus, the person-centric space 200 is an information universe meaningful to the person 102 and formed from the perspective of the person 102.

Different from conventional approaches, which organize information in an application-centric, domain-centric, or interest-centric manner, the person-centric INDEX system 202 recognizes relevant information from the enormous information available in the public space 108, semi-private space 106, and private space 104 in accordance with the perspective of the person 102, thereby filtering out information that is not relevant to the person 102, assisting the person 102 to make sense out of the relevance among different pieces of information in the person-centric space. The person-centric space 200 is dynamic and changes with the online (possibly offline) activities of the person 102. For example, the person 102 can search more content via the person-centric INDEX system 202 (this function may be similar to conventional search engine) that will lead to the continuously expansion of the person-centric space 200. The person-centric INDEX system 202 can cross-link data across information different spaces, or information from different sources in the same space. For instance, by identifying a FedEx tracking number in an order confirmation email sent to a personal email account from www.Amazon.com, the person-centric INDEX system 202 can automatically search for any information in any space that is relevant to the tracking number, such as package delivery status information from www.FedEx.com in the public space 108. Although most information from www.FedEx.com may not be related to the person 102, the particular package delivery status information relevant to the person 102 and can be retrieved by the person-centric INDEX system 202 and indexed against the information from the person 102's private emails. In other words, the package delivery status information, even though from the public space 108, can be projected into the person-centric space 200 and, together with other information in the person-centric space 200 (such as a confirmation email related to the package), the person-centric INDEX system 202 integrates relevant information from different sources to yield unified and semantically meaningful information, such as a card related to an order incorporating the name of the ordered item, the name of the person who ordered it, the name of the company that is to deliver the item, as well as the current delivery status.

In another example, when a private email reminding of an upcoming soccer game from a coach is received, the person-centric INDEX system 202 may be triggered to process the private email and identify, based on the content of the email, certain information in the sports domain such as date/time, location, and players and coaches of the soccer game and cross link the email with such information. The person-centric INDEX system 202 may also retrieve additional relevant information from other data sources, such as phone number of the coach from Contacts of the person 102. The person-centric INDEX system 202 may also retrieve map and directions to the soccer game stadium from Google Maps based on the location information and retrieve weather forecast of the game from www.Weather.com based on the date. If the coach is connected with the person 102 in any social media, then the person-centric INDEX system 202 may go to the social media site in the semi-private space 106 to retrieve any content made by the coach that is relevant to the soccer game. In this example, all those different pieces of information from the public space 108, semi-private space 106, and private space 104 are cross-linked and projected to the person-centric space 200 in accordance with the person 102's perspective on the soccer game.

The person-centric INDEX system 202 may build the initial person-centric space 200 when the person 102 first time accesses the person-centric INDEX system 202. By analyzing all the information in the private space 104 which the person 102 has granted access permission, the person-centric INDEX system 202 can identify, retrieve, and link relevant information from the public space 108, semi-private space 106, and private space 104 and project them into the person-centric space 200. As mentioned above, the person-centric INDEX system 202 also maintains and updates the person-centric space 200 in a continuous or dynamic manner. In one example, the person-centric INDEX system 202 may automatically check any change, either in the private space 104 or otherwise, based on a schedule and initiates the update of the person-centric space 200 when necessary. For example, every two hours, the person-centric INDEX system 202 may automatically check any new email that has not been analyzed before. In another example, the person-centric INDEX system 202 may automatically check any change occurring in the public space 108 and the semi-private space 106 that is relevant to the person 102. For instance, in the soccer game example descried above, every day before the scheduled soccer game, the person-centric INDEX system 202 may automatically check www.Weather.com to see if the weather forecast needs to be updated. The person-centric INDEX system 202 may also update the person-centric space 200 responsive to some triggering event that may affect any data in the person-centric space 200. For example, in the FedEx package example described above, once the scheduled delivery date has passed or a package delivery email has been received, the person-centric INDEX system 202 may update the person-centric space 200 to remove the temporary relationship between the person 102 and www.FedEx.com until a new connection between them is established again in the future. The triggering event is not limited to events happening in the public space 108, semi-private space 106, or private space 104, but can include any internal operation of the person-centric INDEX system 202. As an example, every time the person-centric INDEX system 202 performs a search in response to a query or to answer a question, it may also trigger the person-centric INDEX system 202 to update the person-centric space 200 based on, e.g., newly retrieved information related to, e.g., a search result or some answers. When the search result or answers cannot be found in the person-centric space 200, the person-centric INDEX system 202 may also update the person-centric space 200 to include those search results and answers. That is, the person-centric INDEX system 202 may dynamically update the person-centric space 200 in response to any suitable triggering events.

To better understand information in the person-centric space 200 and make it meaningful, the person-centric INDEX system 202 may further build a person-centric knowledge database including person-centric knowledge by extracting and associating data about the person 102 from the person-centric space 200. The person-centric INDEX system 202 can extract entities related to the person 102 and infer relationships between the entities without the person 102's explicit declaration. A person-centric knowledge representation for the person 102 can be created by person-centric INDEX system 202 the based on the entities and relationships. The inference can be based on any information in the person-centric space 200. The knowledge elements that can be inferred or deduced may include the person 102's social contacts, the person 102's relationships with places, events, etc.

In order to construct the person-centric knowledge representation, the person-centric INDEX system 202 may extract entities from content in the person 102's person-centric space 200. These entities can be places like restaurants or places of interest, contact mentions like names, emails, phone numbers or addresses, and events with date, place and persons involved. In addition to extracting these mentions, the person-centric INDEX system 202 can resolve them to what they refer to (i.e. can disambiguate an extracted entity when it may refer to multiple individuals). For example, a word "King" in a private email may refer to a title of a person who is the King of a country or refer to a person's last name. The person-centric INDEX system 202 may utilize any information in the person-centric space 200 to determine what type of entity the word "King" refers to in the email. In addition to determining an entity type for an extracted entity name, the person-centric INDEX system 202 may also determine a specific individual referred to by this entity name. As one instance, a person's first name may refer to different Contacts, and a same restaurant name can refer to several restaurants. The person-centric INDEX system 202 can make use of contextual information and/or textual metadata associated with the entity name in the email to disambiguate such cases, thereby providing a high precision resolution. With the precise disambiguation, the person-centric INDEX system 202 can find right information from unstructured personal data and provide it in a structured way (e.g. in a graph associated with the person 102). In contrast to a conventional personal profile, the person-centric INDEX system 202 generates a single personal graph for an individual to encompass connections, interests, and events associated with the person 102. It can be understood that a person-centric knowledge may also be represented in a format other than a graph.

The person-centric INDEX system 202, in conjunction with the person-centric space 200, may organize related information from different sources and provide the information to a person 102 in a user-friendly, unified presentation style. In addition to providing requested information in any known format, such as hyperlinks on a search results page, the person-centric INDEX system 202 may present information in intent-based cards. Unlike existing entity-based search results cards organizing results based on an entity, the person-centric INDEX system 202 may focus on a person 102's intent to dynamically build a card for the person 102. The intent may be explicitly specified in the query, or estimated based on the context, trending events, or any knowledge derived from the person-centric space 200. Knowing the person 102's intent when the card is created to answer the query, the person-centric INDEX system 202 can provide relevant information on the card. The relevant information may include partial information associated with the entity in the query, and/or additional information from the person-centric space 200 that is related to the person's intent. In the soccer game example descried above, in response to the person's query or question related to the soccer game, the person-centric INDEX system 202 may estimate the person's intent is to know the date/time of the game and thus, build a card that includes not only the direct answer of the date/time but also other information related to the soccer game in the person-centric space 200, such as the map and directions, weather forecast, and contact information of the coach.

In one embodiment, knowing the current intent of the person 102, the person-centric INDEX system 202 can anticipate the next intent of the person 102, such that the current card provided by the person-centric INDEX system 202 can lead to next steps. For example, the person-centric INDEX system 202 can anticipate that after looking at the show times of a new movie, the person 102 will be likely to buy tickets. In another embodiment, focusing on the person 102's intent, the person-centric INDEX system 202 can answer the person 102 with a card even when there is no entity in the query or request (i.e., in a query-less or anticipatory use case). For example, if the person-centric INDEX system 202 determines that the person 102 has a behavior pattern of searching traffic information from work place to home at 5 pm on workdays, then from now on, the person-centric INDEX system 202 may automatically generate and provide a notice card to the person 102 at around 5 pm on every workday, to notify the person 102 about the traffic information regardless whether a query is received from the person 102.

The person-centric INDEX system 202 can be used for both building the person-centric space 200 for a person 102 and facilitating the person 102 to apply the person-centric space 200 in a variety for applications. Instead of using different means 110, 112, 114 shown in FIG. 1 to access different data sources across different spaces, the person-centric INDEX system 202 can serve as a centralized interface between the person 102 and her/his own person-centric space 200, thereby reducing the time and efforts spent by the person 102 on retrieving desired information or any other applications. As different pieces of relevant information from the public space 108, semi-private space 106, and private space 104 have been projected to the person-centric space 200 in a well-organized way, they can be handled by a single person-centric INDEX system 202, thereby improving the efficiency and effectiveness in finding the desired information. For example, in the FedEx package example described above, any time the person wants to know the current status of the package, she/he no longer needs to dig out the email with the tracking number, write down the tracking number, and open www.FedEx.com in a browser and type in the tracking number. The person-centric INDEX system 202 may have already stored the package delivery status information since the time when the initial order email was received and have kept updating the package delivery status information in the person-centric space 200. So any time when the person 102 inputs a request for package delivery status update, either in the form of a search query or a question n, the person-centric INDEX system 202 can go directly to retrieve the updated package delivery status information from the person-centric space 200 or automatically call the tracking application programing interface (API) of FedEx server with the stored tracking number for the current status update. The result is then provided to the person 102 without any additional efforts made by the person 102. In some embodiments, the person 102 may not even need to explicitly request the status update. Responsive to receiving the order confirmation email, the person-centric INDEX system 202 may automatically set up a task to regularly send the status update to the person 102 until the package is delivered or may dynamically notify the person 102 with any event, like if the package is delayed or lost.

In one aspect of the present teaching, the person-centric INDEX system 202, in conjunction with the person-centric space 200, can be used for answering questions. To achieve this, the person-centric INDEX system 202 may classify a question from a person 102 into a personal question or a non-personal question. In some embodiment, data from the person-centric space 200 may be for classification. For example, a question related to "uncle Sam" may be classified as a personal question if "uncle Sam" is a real person identified from the private Contacts. Once the question is classified as personal, the person-centric INDEX system 202 may extract various features including entities and relationships from the question. The extracted entities and relationships may be used by the person-centric INDEX system 202 to traverse a person-centric knowledge database derived from the person-centric space 200. In some embodiments, the person-centric knowledge database may store data in a triple format including one or more entities and relationships between the one or more entities. When an exact match of relationship and entity are found, an answer is returned. When there is no exact match, a similarity between the question and answer triples is taken into consideration and used to find the candidate answers. In the "uncle Sam" example described above, if the question is "where is uncle Sam," the person-centric INDEX system 202 may search the person-centric knowledge database for any location entity that has a valid relationship with the entity "uncle Sam." In one example, a recent email may be sent by "uncle Sam," and the email may also mention that he will be attending a conference on these days. The location of the conference can be retrieved from the conference website in the public space 108, stored in the person-centric space 200, and associated with entity "uncle Sam." Based on the relationship, the person-centric INDEX system 202 can answer the question with the location of the conference. The person-centric INDEX system 202 thus provides an efficient solution to search for answers to personal questions and increases user engagement and content understanding.

In another aspect of the present teaching, the person-centric INDEX system 202, in conjunction with the person-centric space 200, can be used for task completion. Task completion often involves interactions with different data sources across different spaces. A task such as "making mother's day dinner reservation" involves task actions such as identifying who is my mother, checking what date is mother's day this year, finding out a mutually available time slot on mother's day for my mother and me, picking up a restaurant that my mother and I like, making an online reservation on the restaurant's website, etc. Traditionally, in order to complete each task action, a person 102 has to open a number of applications to access information from different sources across different spaces and perform a series of tedious operations, such as searching for "mother's day 2015" in a search engine, checking my own calendar and mother's shared calendar, digging out past emails about the restaurant reservations for dinners with my mother, making online reservation via a browser, etc. In contrast to the traditional approaches for task completion, the person-centric INDEX system 202 can complete the same task more efficiently and effectively because all pieces of information related to mother's day dinner reservation have already been projected to the person-centric space 200. This makes automatic task generation and completion using the person-centric INDEX system 202 possible. In response to receiving an input of "making mother's day dinner reservation" from a person 102, the person-centric INDEX system 202 can automatically generate the list of task actions as mentioned above and execute each of them based on information from the person-centric space 200 and update the person 102 with the current status of completing the task.

With the dynamic and rich information related to the person 102 that is available in the person-centric space 200, the person-centric INDEX system 202 can even automatically generate a task without any input from the person 102. In one embodiment, anytime a card is generated and provided to the person 102, the information on the card may be analyzed by the person-centric INDEX system 202 to determine whether a task needs to be generated as a follow-up of the card. For example, once an email card summarizing an online order is constructed, the person-centric INDEX system 202 may generate a task to track the package delivery status until it is delivered and notify any status update for the person 102. In another embodiment, any event occurring in the public space 108, semi-private space 106, or private space 104 that is relevant to the person 102 may trigger the task completion as well. For instance, a flight delay message on an airline website in the public space 108 may trigger generation of a task for changing hotel, rental car, and restaurant reservations in the same trip. In still another embodiment, the person 102's past behavior patterns may help the person-centric INDEX system 202 to anticipate her/his intent in the similar context and automatically generate a task accordingly. As an instance, if the person 102 always had a dinner with her/his mother on mother's day at the same restaurant, a task may be generated by the person-centric INDEX system 202 this year, in advance, to make the mother's day dinner reservation at the same restaurant.

It is understood that in some occasions, certain task actions may not be completed solely based on information from the person-centric space 200. For example, in order to complete the task "sending flowers to mom on mother's day," flower shops need to be reached out to. In one embodiment of the present teaching, a task exchange platform may be created to facilitate the completion of tasks. The person-centric INDEX system 202 may send certain tasks or task actions to the task exchange platform so that parties interested in completing the task may make bids on it. The task exchange platform alone, or in conjunction with the person-centric INDEX system 202, may select the winning bid and update the person 102 with the current status of task completion. Monetization of task completion may be achieved by charging service fee to the winning party and/or the person 102 who requests the task.

In still another aspect of the present teaching, the person-centric INDEX system 202, in conjunction with the person-centric space 200, can be used for query suggestions. By processing and analyzing data from the person-centric space 200, the person-centric INDEX system 202 may build a user corpus database, which provides suggestions based on information from the private space 104 and/or semi-private space 106. In response to any input from a person 102, the person-centric INDEX system 202 may process the input and provide suggestions to the person 102 at runtime based on the person 102's relevant private and/or semi-private data from the user corpus database as well other general log-based query suggestion database and search history database. The query suggestions may be provided to the person 102 with very low latency (e.g., less than 10 ms) in response to the person 102's initial input. Further, in some embodiments, before presenting to the person 102, suggestions generated using the person 102's private and/or semi-private data from the user corpus database may be blended with suggestions produced based on general log-based query suggestion database and search history database. Such blended suggestions may be filtered and ranked based on various factors, such as type of content suggested (e.g., email, social media information, etc.), estimated intent based on an immediate previous input from the person 102, context (e.g., location, data/time, etc.) related to the person 102, and/or other factors.

Figure 3:
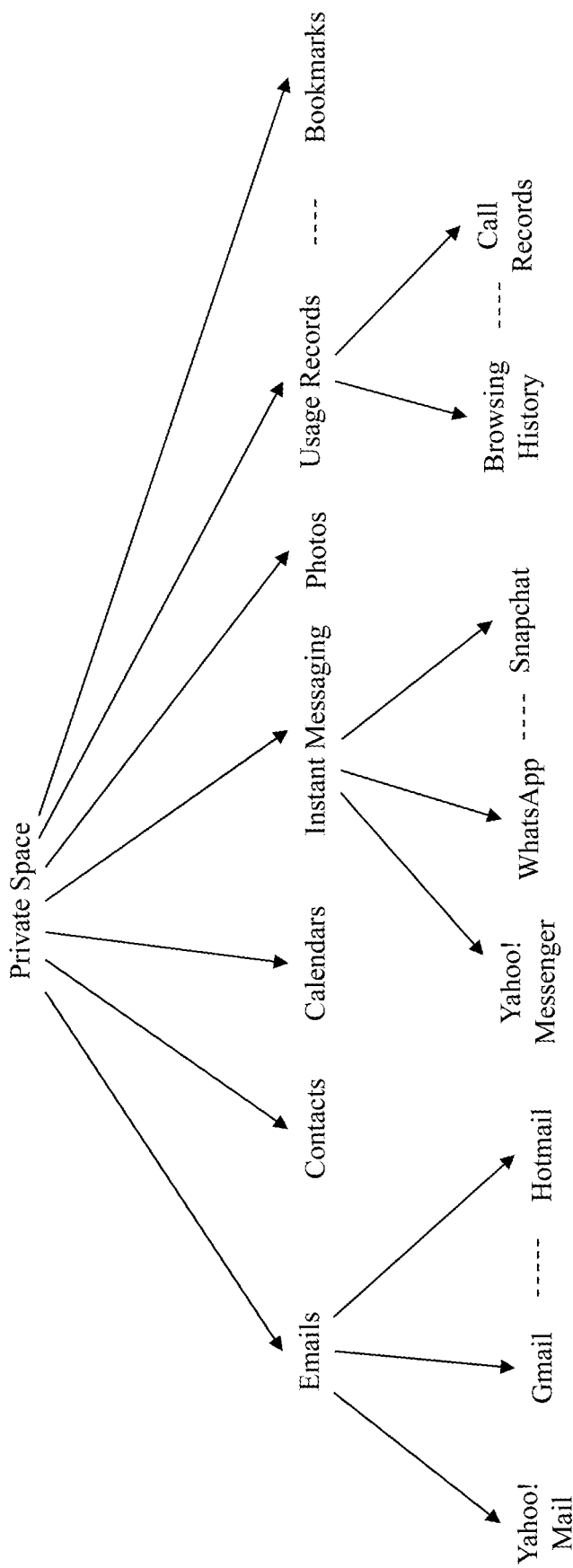
FIG. 3 illustrates exemplary types of data sources in a private space.

FIG. 3 illustrates exemplary types of data sources in a private space. The private space of a person may include any data source that is private to the person. For example, the private space may include any data source that requires access information of the person (e.g., password, token, biometric information, or any user credentials). The private space may also include any data source that is intended to be accessed only by the person even without requiring access control, such as data on a person's smart phone that does not require password or finger print verification. In this illustration, the private space includes several categories of data sources such as emails, Contacts, calendars, instant messaging, photos, usage records, bookmarks, etc. Emails include emails stored in remote email servers such as Yahoo! Mail, Gmail, Hotmail, etc. and local emails in an email application on a personal computer or mobile device. Instant messaging includes any messages communicated between the person 102 and others via any instant messaging applications, for example, Yahoo! Messenger, WhatsApp, Snapchat, to name a few. Usage records may be any logs private to the person, such as, but not limited to, browsing history and call records. It is understood that the examples described above are for illustrative purpose and are not intended to be limiting.

Figure 4:
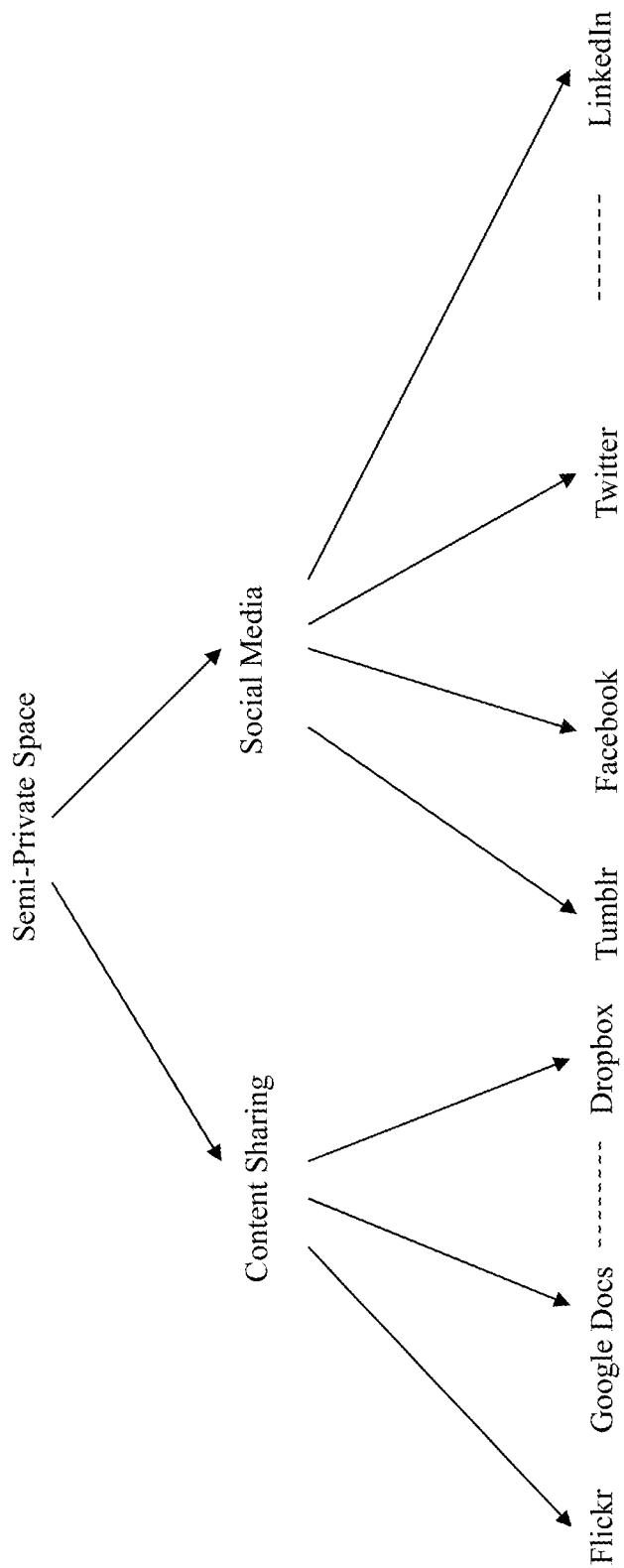
FIG. 4 illustrates exemplary types of data sources in a semi-private space.

FIG. 4 illustrates exemplary types of data sources in a semi-private space. The semi-private space of a person may include any data source that is accessible for a group of people designated by the person. One example of data sources in the semi-private space is social media, such as Tumblr, Facebook, Twitter, LinkedIn, etc. A person can designate a group of people who can access her/his information shared in the social media sites, such as status updates, posts, photos, and comments. Another example of data sources in the semi-private space is a content sharing site. For instance, a person can share photos with family and friends at Flickr, share work documents with colleagues or classmates at Google Docs, and share any files at Dropbox. It is understood that in some cases, there is not a clear boundary between a data source in the private space and a data source in the semi-private space. For instance, if a person restricts photos at Flickr to be only accessible by her/himself, then Flickr becomes a private source of the person, just like local photos stored on the person's device. Similarly, when the entire or a portion of a calendar is shared with others, the calendar becomes part of the semi-private space. It is understood that the examples described above are for illustrative purpose and are not intended to be limiting.

Figure 5:
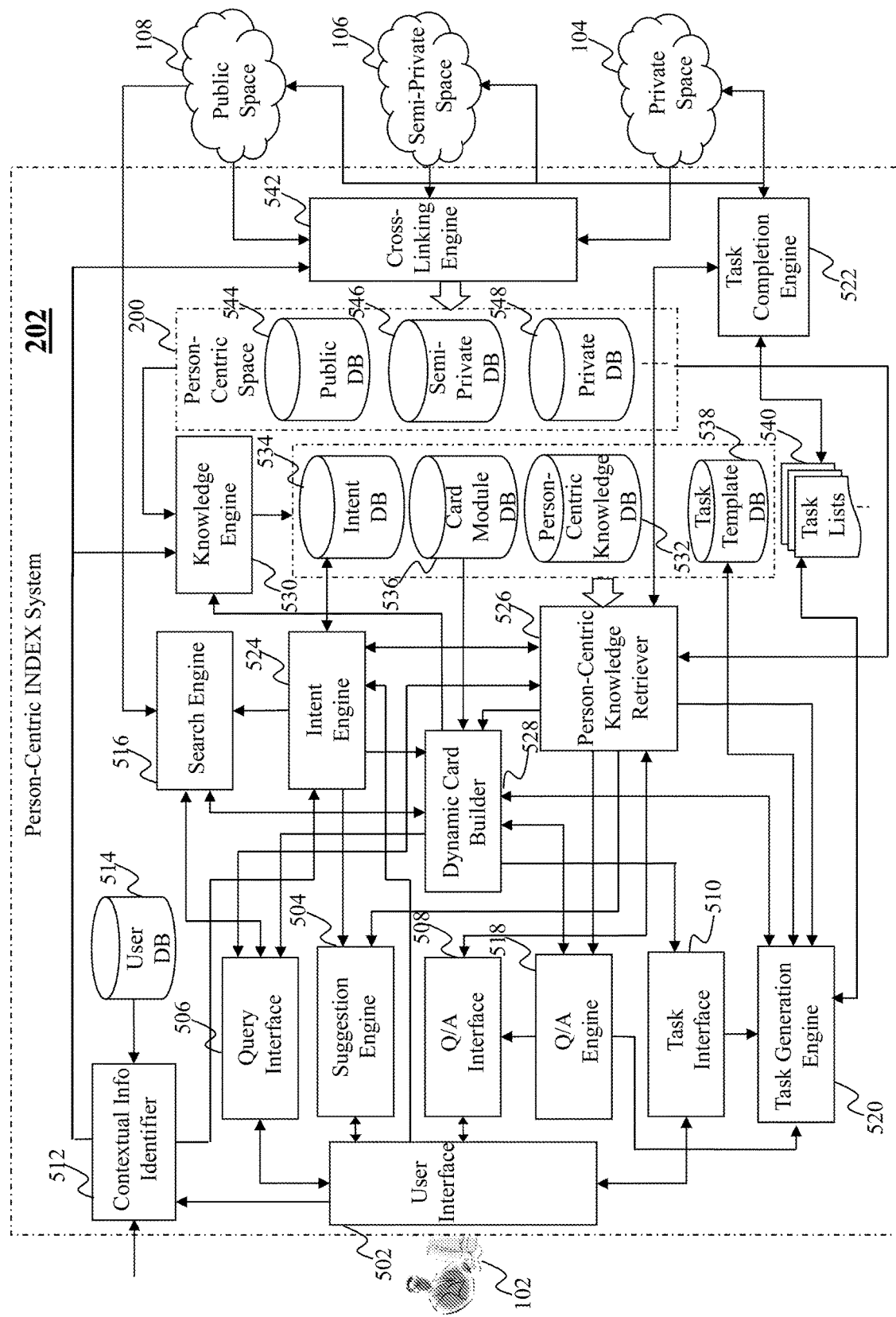
FIG. 5 depicts an exemplary system diagram of a person-centric INDEX system, according to an embodiment of the present teaching.

FIG. 5 depicts an exemplary system diagram of the person-centric INDEX system 202, according to an embodiment of the present teaching. The person-centric INDEX system 202 includes a user interface 502 that connects a person 102 with multiple front-end components including a suggestion engine 504, a query interface 506, a Q/A interface 508, a task interface 510, and a contextual information identifier 512 coupled with a user database 514. To support the front-end components, the person-centric INDEX system 202 further includes multiple functional components including a search engine 516, a Q/A engine 518, a task generation engine 520, a task completion engine 522, an intent engine 524, a person-centric knowledge retriever 526, and a dynamic card builder 528. In the back-end, the person-centric INDEX system 202 includes a variety of databases for storing information in different forms for different purposes, such as the person-centric space 200 having a public database 544, a semi-private database 546, and a private database 548. The person-centric space 200 in this embodiment is built up by a cross-linking engine 542. The person-centric INDEX system 202 further includes a knowledge engine 530 for building a person-centric knowledge database 532 by processing and analyzing information in the person-centric space 200. In addition, additional types of analytic results from the knowledge engine 530 based on data from the person-centric space 200 and/or any other suitable data sources may be stored in an intent database 534, a card module database 536, and a task template database 538.

A person 102 may interact with the person-centric INDEX system 202 via the user interface 502 by providing an input. The input may be made by, for example, typing in a query, question, or task request, or clicking or touching any user interface element in the user interface 502 to enter a query, question, or task request. With each input from the person 102, the suggestion engine 504 provides a list of suggestions to facilitate the person 102 to complete the entire input. In this embodiment, the suggestion engine 504 may provide suggestions based on the person's private and/or semi-private information retrieved by the person-centric knowledge retriever 526 from the person-centric space 200 and/or the person-centric knowledge database 532. Those suggestions include, for example, a contact name from the private Contacts, part of a tweet from Twitter, or a package tracking status stored in the person-centric space 200. In some embodiments, the suggestion engine 504 may blend those suggestions based on the person 102's private and/or semi-private information with the conventional suggestions based on popular query logs and search history. In this embodiment, the intent engine 524 may provide an estimated intent associated with each input to help filtering and/or ranking the suggestions provided to the person 102.

Each of the query interface 506, Q/A interface 508, and task interface 510 is configured to receive a particular type of user inputs and forward them to the respective engine for handling. Once the results are returned from the respective engine and/or from the dynamic card builder 528, each of the query interface 506, Q/A interface 508, and task interface 510 forwards the results to the user interface 502 for presentation. In one embodiment, the user interface 502 may first determine the specific type of each input and then dispatch it to the corresponding interface. For example, the user interface 502 may identify that an input is a question based on semantic analysis or keyword matching (e.g., looking for keywords like "why" "when" "who," etc. and/or a question mark). The identified question is then dispatched to the Q/A interface 508. Similarly, the user interface 502 may determine, based on semantic analysis and/or machine learning algorithms, that an input is a task request and forward the input to the task interface 510. For any input that cannot be classified or does not fall within the categories of question and task request, the user interface 502 may forward it to the query interface 506 for general query search. It is understood that, in some embodiments, the user interface 502 may not classify an input first, but instead, forward the same input to each of the query interface 506, Q/A interface 508, and task interface 510 to have their respective engines to process the input in parallel.

Another function of the user interface 502 involves presenting information to the person 102 either as responses to the inputs, such as search results, answers, and task status, or as spontaneous notices, reminders, and updates in response to any triggering events. In this embodiment, the information to be presented to the person 102 via the user interface 502 may be presented in the form of cards that are dynamically built on-the-fly by the dynamic card builder 528 based on the intent estimated by the intent engine 524. The cards may be of different types, such as an email card summarizing one or more related emails, a search results card summarizing information relevant to one or more search results, an answer card including an answer to a question with additional information associated with the answer, or a notice card that is automatically generated to notify the person 102 of any event of interest. Based on its type, a card may be dispatched to one of the query interface 506, Q/A interface 508, and task interface 510 and eventually presented to the person 102 via the user interface 502. In addition to cards, information in any other format or presentation styles, such as search results in a research results page with "blue links" or answers in plain text, may be provided by the search engine 516 and the Q/A engine 518 directly to the query interface 506 and Q/A interface 508, respectively. It is understood that the user interface 502 may also provide information in a hybrid matter, meaning that some information may be presented as cards, while other information may be presented in its native format or style.

As the user interface 502 receives an input from the person 102, it also triggers the contextual information identifier 512 to collect any contextual information related to the person 102 and the input of the person 102. The contextual information identifier 512 in this embodiment receives user-related information from the user database 514, such as the person 102's demographic information and declared and inferred interests and preferences. Another source of contextual information is the person 102's device including, for example, date/time obtained from the timer of the person 102's device, location obtained from a global positioning system (GPS) of the person 102's device, and information related to the person 102's device itself (e.g., the device type, brand, and specification). Further, the contextual information identifier 512 may also receive contextual information from the user interface 502, such as one or more inputs immediately before the current input (i.e., user-session information). Various components in the person-centric INDEX system 202, including the cross-linking engine 542, knowledge engine 530, and intent engine 524, may take advantage of the contextual information identified by the contextual information identifier 512.

The intent engine 524 in this embodiment has two major functions: creating and updating the intent database 534 and estimating an intent based on the information stored in the intent database 534. The intent database 534 may store a personal intent space which includes all the intents that make sense to the person 102 in the form of an action plus a domain. For example, based on the person 102's search history, the intent engine 524 may identify that the person 102 has repeatedly entered different queries all related to the same intent "making restaurant reservations." This intent then may be stored as a data point in the person's personal intent space in the intent database 534 in the form of {action=making reservations; domain=restaurant}. More and more data points will be filled into the personal intent space as the person 102 continues interacting with the person-centric INDEX system 202. In some embodiments, the intent engine 524 may also update the personal intent space in the intent database 534 by adding new intents based on existing intents. For instance, the intent engine 524 may determine that hotel is a domain that is close to the restaurant domain and thus, a new intent "making hotel reservations" (in the form of {action=making reservations; domain=hotel}) likely makes sense to the person 102 as well. The new intent "making hotel reservations," which is not determined from user data directly, may be added to the personal intent space in the intent database 534 by the intent engine 524. In some embodiments, the intent database 534 include a common intent space for the general population. Some intents that are not in the personal intent space may exist in the common intent space. If they are popular among the general population or among people similar to the person 102, then the intent engine 524 may consider those intents as candidates as well in intent estimation.

In estimating intent of the person 102, the intent engine 524 receives the input from the user interface 502 or any information retrieved by the person-centric knowledge retriever 526 and tries to identify any action and/or domain from the input that is also in the intent spaces in the intent database 534. If both action and domain can be identified from the input, then an intent can be derived directly from the intent space. Otherwise, the intent engine 524 may need to take the contextual information from the contextual information identifier 512 to filter and/or rank the intent candidates identified from the intent space based on the action or domain. In one example, if the input involves only the action "making reservations" without specifying the domain, the intent engine 524 may first identify a list of possible domains that can be combined with such action according to the personal intent space, such as "hotel" and "restaurant." By further identifying that the location where the input is made is at a hotel, the intent engine 524 may estimate that the person 102 likely intends to make restaurant reservations as he is already in the hotel. It is understood that in some cases, neither action nor domain can be identified from the input or the identified action or domain does not exist in the intent space, the intent engine 524 may estimate the intent purely based on the available contextual information. Various components in the person-centric INDEX system 202, including the search engine 516, the suggestion engine 504, the dynamic card builder 528, and the person-centric knowledge retriever 526, may take advantage of the intent estimated by the intent engine 524.

The search engine 516 in this embodiment receives a search query from the query interface 506 and performs a general web search or a vertical search in the public space 108. Intent estimated by the intent engine 524 for the search query may be provided to the search engine 516 for purposes such as query disambiguation and search results filtering and ranking. In some embodiments, some or all of the search results may be returned to the query interface 506 in their native format (e.g., hyperlinks) so that they can be presented to the person 102 on a conventional search results page. In this embodiment, some or all of the search results are fed into the dynamic card builder 528 for building a dynamic search results card based on the estimated intent. For instance, if the intent of the query "make reservation" is estimated as "making restaurant reservations," then the top search result of a local restaurant may be provided to the dynamic card builder 528 for building a search results card with the name, directions, menu, phone number, and reviews of the restaurant.

The Q/A engine 518 in this embodiment receives a question from the Q/A interface 508 and classifies the question into either a personal or non-personal question. The classification may be done based on a model such as a machine learning algorithm. In this embodiment, the Q/A engine 518 may check the person-centric knowledge database 532 and/or the private database 548 and semi-private database 546 in the person-centric space 200 via the person-centric knowledge retriever 526 to see if the question is related to any private, semi-private data, or personal knowledge of the person 102. For instance, the question "who is Taylor Swift" is normally classified as a non-personal question. But in the case if "Taylor Swift" is in the person 102's Contacts or social media friend list, or if "Taylor Swift" has sent emails to the person 102, the Q/A engine 518 then may classify the question as a personal question. For non-personal questions, any known approaches may be used to obtain the answers.

Once the question is classified as personal, various features including entities and relationships are extracted by the Q/A engine 518 from the question using, for example, a machine learned sequence tagger. The extracted entities and relationships are used to traverse, by the person-centric knowledge retriever 526, the person-centric knowledge database 532, which stores person-centric relationships stored in a pre-defined form. In some embodiments, the person-centric relationships may be stored in a triple format including one or more entities and a relationship therebetween. When the Q/A engine 518 finds an exact match of relationship and entity, it returns an answer. When there is no exact match, the Q/A engine 518 takes into consideration a similarity between the question and answer triples and uses the similarity to find the candidate answers. To measure the similarity, words embedded over a large corpus of user texts may be collected and trained by the Q/A engine 518. The well-organized, person-centric information stored in the person-centric space 200 and the person-centric knowledge database 532 makes it possible for the Q/A engine 518 to answer a personal question in a synthetic manner without the need of fully understanding the question itself. The answers generated by the Q/A engine 518 may be provided to the dynamic card builder 528 for building answer cards.

The task generation engine 520 and the task completion engine 522 work together in this embodiment to achieve automatic task generation and completion functions of the person-centric INDEX system 202. The task generation engine 520 may automatically generate a task in response to a variety of triggers, including for example, a task request from the person 120 received via the task interface 510, an answer generated by the Q/A engine 518, a card constructed by the dynamic card builder 528, or an event or behavior pattern related to the person 102 from the person-centric space 200 and/or the person-centric knowledge database 532. Intent may have also been taken into account in some embodiments in task generation. The task generation engine 520 in this embodiment also divides each task into a series of task actions, each of which can be scheduled for execution by the task completion engine 522. The task template database 538 stores templates of tasks in response to different triggers. The task generation engine 520 may also access the task template database 538 to retrieve relevant templates in task generation and update the templates as needed. In some embodiments, the task generation engine 520 may call the dynamic card builder 528 to build a card related to one or more tasks so that the person 102 can check and modify the automatically generated task as desired.

The tasks and task actions are stored into task lists 540 by the task generation engine 520. Each task may be associated with parameters, such as conditions in which the task is to be executed and completed. Each individual task action of a task may also be associated with execution and completion conditions. The task completion engine 522 fetches each task from the task lists 540 and executes it according to the parameter associated therewith. For a task, the task completion engine 522 dispatches each of its task actions to an appropriate executor to execute it, either internally through the person-centric knowledge retriever 526 or externally in the public space 108, semi-private space 106, or private space 104. In one example, task actions such as "finding available time on Tuesday for lunch with mom" can be completed by retrieving calendar information from the private database 548 in the person-centric space 200. In another example, task actions like "ordering flowers from Aunt Mary's flower shop" can only be completed by reaching out to the flower shop in the public space 108. The task completion engine 522 may also schedule the execution of each task action by putting it into a queue. Once certain conditions associated with a task action are met, the assigned executor will start to execute it and report the status. The task completion engine 522 may update the task lists 540 based on the status of each task or task action, for example, by removing completed tasks from the task lists 540. The task completion engine 522 may also provide the status updates to the person-centric knowledge retriever 526 such that the status updates of any ongoing task become available for any component in the person-centric INDEX system 202 as needed. For instance, the dynamic card builder 528 may build a notice card notifying the person that your task request "sending flowers to mom on Mother's day" has been completed.

As a component that supports intent-based dynamic card construction for various front-end components, the dynamic card builder 528 receives requests from the search engine 516, the Q/A engine 518, the task generation engine 520, or the person-centric knowledge retriever 526. In response, the dynamic card builder 528 asks for the estimated intent associated with the request from the intent engine 524. Based on the request and the estimated intent, the dynamic card builder 528 can create a card on-the-fly by selecting suitable card layout and/or modules from the card module database 536. The selection of modules and layouts is not predetermined, but may depend on the request, the intent, the context, and information from the person-centric space 200 and the person-centric knowledge database 532. Even for the same query repeatedly received from the same person 102, completely different cards may be built by the dynamic card builder 528 based on the different estimated intents in different contexts. A card may be created by populating information, such as search results, answers, status updates, or any person-centric information, into the dynamically selected and organized modules. The filling of information into the modules on a card may be done in a centralized manner by the dynamic card builder 528 regardless of the type of the card or may be done at each component where the request is sent. For example, the Q/A engine 518 may receive an answer card construction with dynamically selected and organized modules on it and fill in direct and indirect answers into those modules by itself.

In one embodiment, the person-centric knowledge retriever 526 can search the person-centric space 200 and the person-centric knowledge database 532 for relevant information in response to a search request from the intent engine 524, the query interface, the Q/A engine 518, the suggestion engine 504, the dynamic card builder 528, or the task generation engine 520. The person-centric knowledge retriever 526 may identify one or more entities from the search request and search for the matched entities in the person-centric knowledge database 532. As entities stored in the person-centric knowledge database 532 are connected by relationships, additional entities and relationships associated with the matched entities can be returned as part of the retrieved information as well. As for searching in the person-centric space 200, in one embodiment, the person-centric knowledge retriever 526 may first look for private data in the private database 548 matching the entities in the search request. As data in the person-centric space 200 are cross-linked by cross-linking keys, the entities and/or the cross-linking keys associated with the relevant private data may be used for retrieving additional information from the semi-private database 546 and the public database 544. For instance, to handle a search request related to "amazon package," the person-centric knowledge retriever 526 may first look for information in the private database 548 that is relevant to "amazon package." If an order confirmation email is found in the private database 548, the person-centric knowledge retriever 526 may further identify that the order confirmation email is associated with a cross-linking key "tracking number" in the package shipping domain. Based on the tracking number, the person-centric knowledge retriever 526 then can search for any information that is also associated with the same tracking number in the person-centric space 200, such as the package delivery status information from www.FedEx.com in the public database 544. As a result, the person-centric knowledge retriever 526 may return both the order confirmation email and the package delivery status information as a response to the search request.

In some embodiments, the person-centric knowledge retriever 526 may retrieve relevant information from multiple data sources in parallel and then blend and rank all the retrieved information as a response to the search request. It is understood that information retrieved from each source may be associated with features that are unique for the specific source, such as the feature "the number of recipients that are cc'd" in the email source. In order to be able to blend and rank results from different sources, the person-centric knowledge retriever 526 may normalize the features of each result and map them into the same scale for comparison.

The cross-linking engine 542 in this embodiment associates information relevant to the person 102 from the private space 104, the semi-private space 106, and the public space 108 by cross-linking data based on cross-linking keys. The cross-linking engine 542 may first process all information in the private space 104 and identify cross-linking keys from the private space 104. For each piece of content in the private space 104, the cross-linking engine 542 may identify entities and determine the domain to which the content belongs. Based on the domain, one or more entities may be selected as cross-linking keys for this piece of content. In one example, tracking number may be a cross-linking key in the package shipping domain. In another example, flight number, departure city, and departure date may be cross-linking keys in the flight domain. Once one or more cross-linking keys are identified for each piece of information in the private space 104, the cross-linking engine 542 then goes to the semi-private space 106 and the public space 108 to fetch information related to the cross-linking keys. For example, the tracking number may be used to retrieve package delivery status information from www.FedEx.com in the public space 108, and the flight number, departure city, and departure date may be used to retrieve flight status from www.UA.com in the public space 108. Information retrieved by the cross-linking engine 542 from the private space 104, semi-private space 106, and public space 108 may be stored in the private database 548, semi-private database 546, and public database 544 in the person-centric space 200, respectively. As each piece of information in the person-centric space 200 is associated with one or more cross-linking keys, they are cross-linked with other information associated with the same cross-linking keys, regardless which space it comes from. Moreover, as the cross-linking keys are identified based on the person's private data (e.g., emails), all the cross-linked information in the person-centric space 200 are relevant to the person 102.

Although only one database is shown in FIG. 5 for information from the private space 104, the semi-private space 106, or the public space 108, it is understood that information within a particular space may be organized and stored in different databases in the person-centric space 200. For instance, private data from emails, Contacts, calendars, and photos may be stored in separate databases within the private database 548; semi-private data from Facebook, Twitter, LinkedIn, etc. may be stored in separate databases within the semi-private database 546 as well. Such arrangement may enable applying different feature extraction models to different data sources, which may be helpful for the suggestion engine 504 and the person-centric knowledge retriever 526. As mentioned above, the cross-linking engine 542 continuously and dynamically maintains and updates the person-centric space 200 on a regular basis and/or in response to any triggering event. For example, any internal operation, such as query search, question answering, or task completion, may trigger the cross-linking engine 542 to update the affected data or add missing data in the person-centric space 200.

The knowledge engine 530 in this embodiment processes and analyzes the information in the person-centric space 200 to derive analytic results in order to better understand the person-centric space 200. In one embodiment, the knowledge engine 530 extracts entities from content in the person-centric space 200 and resolves them to what they refer to (i.e., can disambiguate an extracted entity when it may refer to multiple individuals). In addition to determining an entity type for an extracted entity name, the knowledge engine 530 may also determine a specific individual referred to by this entity name. The knowledge engine 530 can make use of contextual information and/or textual metadata associated with the entity name in the email to disambiguate such cases, providing a high precision resolution.

The knowledge engine 530 also builds a person-centric knowledge representation for a person 102 by extracting and associating data about the person 102 from personal data sources. The person-centric knowledge representation for the person 102 is stored in the person-centric knowledge database 532. The knowledge engine 530 can extract entities related to the person 102 and infer relationships between the entities without the person 102's explicit declaration, and create, for example, a person-centric knowledge graph for the person 102 based on the entities and relationships. The knowledge elements that can be inferred or deduced may include, for example, the person 102's social contacts, and the person 102's relationships with places, events, or other users.

Figure 6:
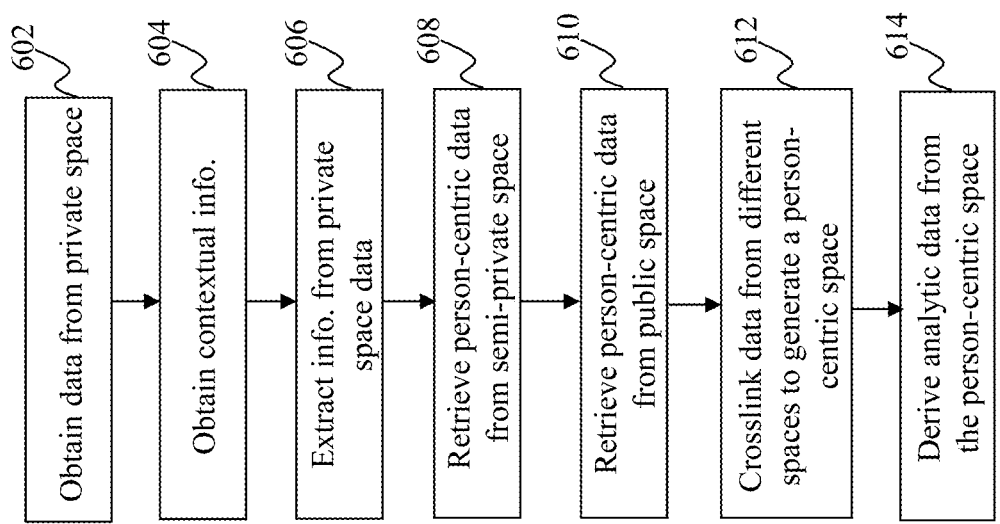
FIG. 6 is a flowchart of an exemplary process for building a person-centric space, according to an embodiment of the present teaching.

FIG. 6 is a flowchart of an exemplary process for building a person-centric space, according to an embodiment of the present teaching. Starting at 602, data from the private space 104 is obtained. The data includes any content that is private to a person, such as emails, Contacts, calendar events, photos, bookmarks, instant messages, usage records, and so on. Contextual information is obtained at 604. The contextual information includes, but is not limited to, user information such as demographic information and interests and preferences, locale information, temporal information, device information, and user-session information (e.g., other user inputs in the same or adjacent user-sessions). At 606, information from the private space data is extracted. The information may be cross-linking keys determined from entities extracted from the private space data based on the domain of the private space data and/or the obtained contextual information. Person-centric data is then retrieved from the semi-private space at 608. Similarly, person-centric data is retrieved from the public space at 610. In this embodiment, the person-centric data is retrieved based on the cross-linking keys. At 612, all pieces of person-centric data retrieved from the private space, semi-private space, and public space are cross-linked together to generate a person-centric space. In this embodiment, the cross-linking is done based on the same cross-linking keys associated with these pieces of person-centric data. At 614, analytic data is derived from the person-centric space. For example, entities may be extracted from the person-centric space and are disambiguated by the knowledge engine 530 to ascertain their extract meanings. Relationships between the entities may be inferred based on information from the person-centric space by the knowledge engine 530 as well. Based on the entities and relationships, person-centric knowledge can be derived and stored in the person-centric knowledge database 532.

Figure 7:
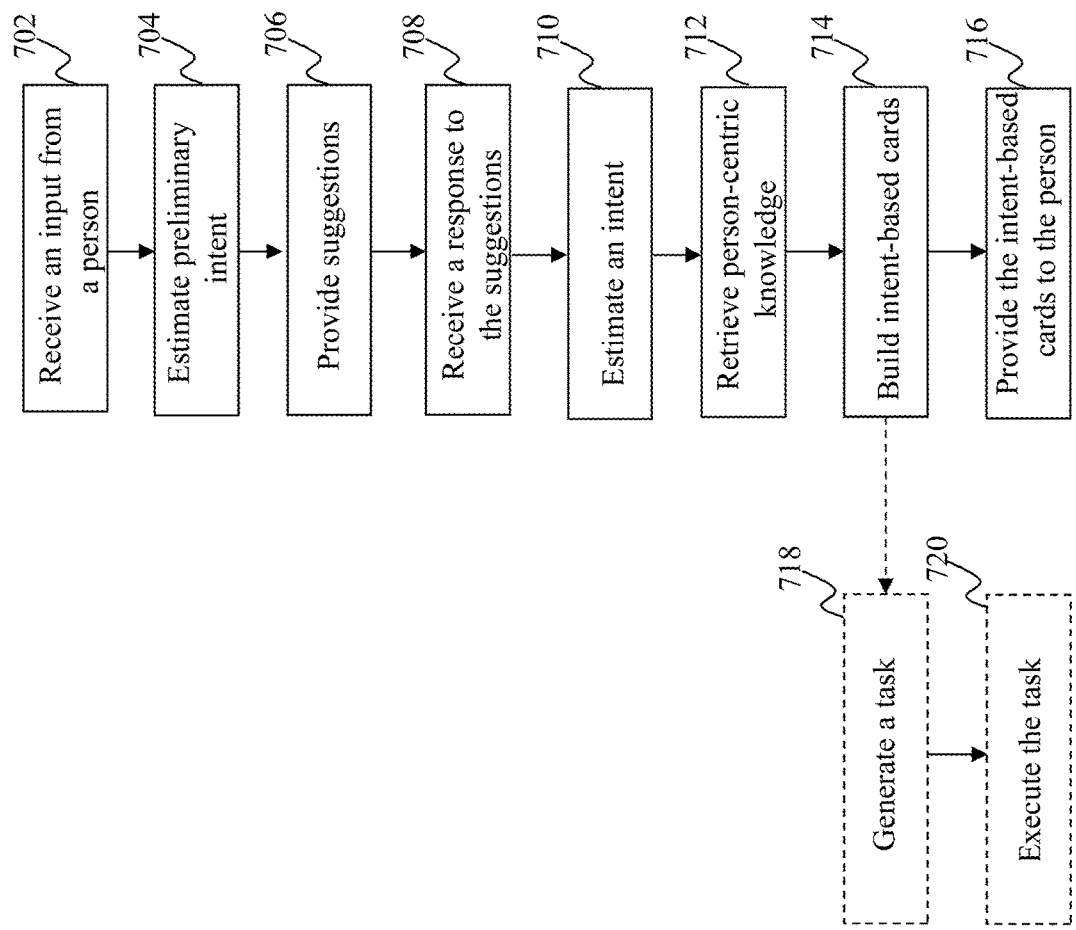
FIG. 7 is a flowchart of an exemplary process for applying a person-centric space for digital personal assistance, according to an embodiment of the present teaching.

FIG. 7 is a flowchart of an exemplary process for applying a person-centric space for digital personal assistance, according to an embodiment of the present teaching. Starting at 702, an input from a person is received. As the person enters the input, a preliminary intent is estimated and continuously updated at 704. The estimation may be based on the current input and any contextual information currently available. At 706, one or more suggestions are generated based on the current input and the estimated intent and provided to the person to assist completing the current input. A response to the suggestions is received from the person at 708. The response may be a selection of one suggestion or ignoring the suggestions and finishing the input as the person desires. Once the completed input is received, either as a selection of a suggestion or a fully-entered input, at 710, the intent is estimated again for the completed input. The intent may be estimated based on the completed input and the currently available contextual information. In some embodiments, if no input is received (e.g., when the person just logs into and has not entered anything yet), the intent may be estimated based on the contextual information alone. At 712, person-centric knowledge is retrieved based on the input. In some embodiments, the estimated intent may be used for retrieving the person-centric knowledge as well. As described above in detail, the input may be a question, a task request, or a query. In any event, entities and/or relationships may be derived from the input and are used for retrieving relevant person-centric knowledge from the person-centric knowledge database 532. In some embodiments, additional information may be retrieved from the person-centric space. Intent-based cards are built at 714. Each card may be constructed based on a layout and one or more modules that are selected based on the type of the card and the estimated intent. Content in each module may be filled in based on the person-centric knowledge and any additional information retrieved at 712. Optionally or additionally, at 718, the construction of a card may cause a task to be generated based on the estimated intent. For instance, an email card summarizing an online order confirmation email may trigger the generation of a task for automatically tracking the package delivery status. At 720, the task is executed. Nevertheless, at 716, the intent-based cards, either an email card, an answer card, a search results card, or a notice card, are provided to the person as a response to the input.

Figure 8:
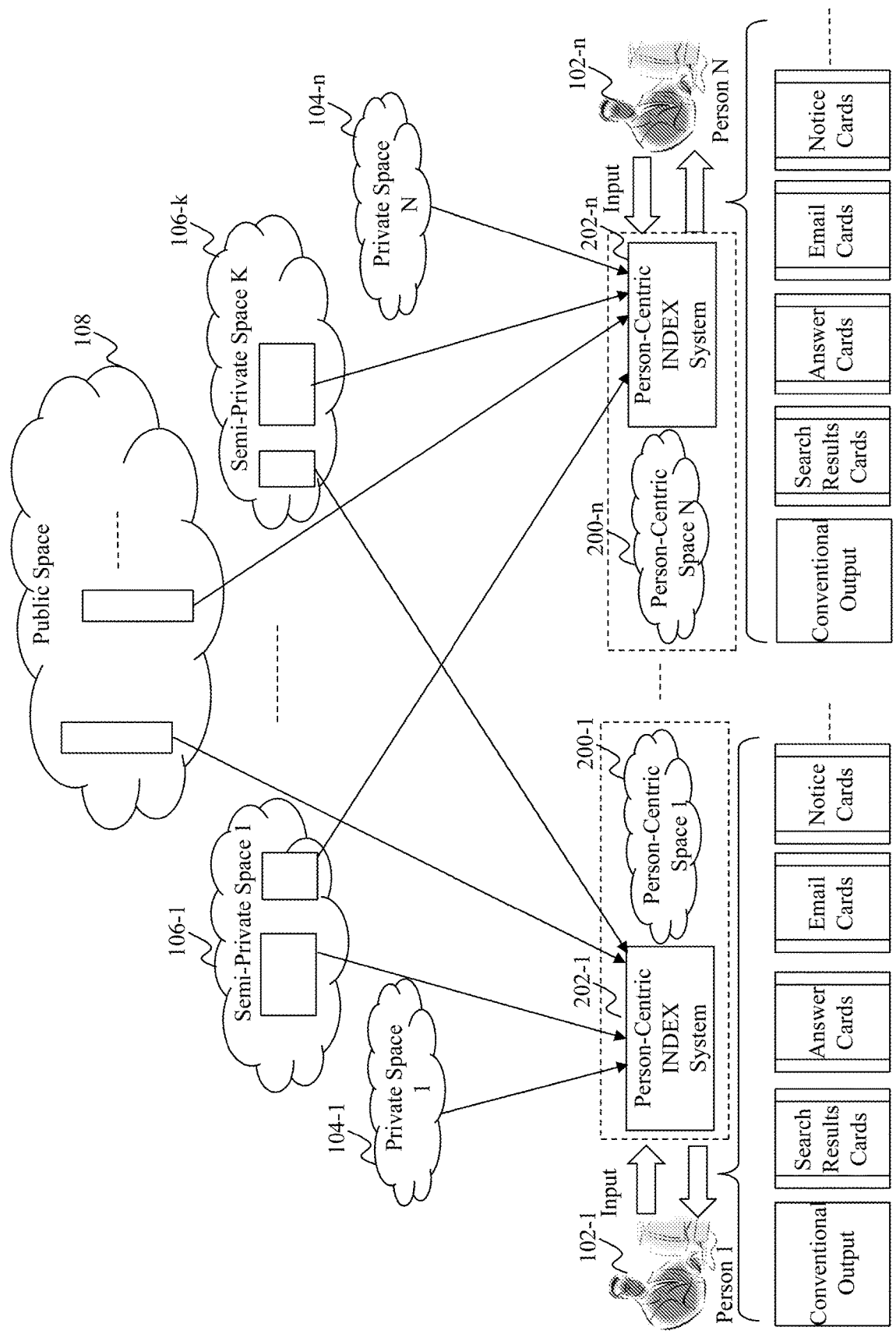
FIG. 8 depicts an exemplary scheme of building a person-centric space for each individual person via a person-centric INDEX system and applications thereof, according to an embodiment of the present teaching.

FIG. 8 depicts an exemplary scheme of building a person-centric space for each individual person via the person-centric INDEX system and applications thereof, according to an embodiment of the present teaching. In this embodiment, each person 102-1, . . . 102-*n* may access its own person-centric INDEX system 202-1, . . . 202-*n*, respectively. The person-centric INDEX system 202 may be a stand-alone system installed on each person 102-1, . . . 102-*n*'s device, a cloud-based system shared by different persons 102-1, . . . 102-*n*, or a hybrid system in which some components are installed on each person 102-1, . . . 102-*n*'s device and some components are in the cloud and shared by different persons 102-1, . . . 102-*n*.

In this embodiment, individual person-centric spaces 200-1, . . . 200-*n* are generated for each person 102-1, . . . 102-*n* via its own person-centric INDEX system 202-1, . . . 202-*n*, respectively. For example, person-centric space 1 200-1 includes the projections from different spaces related to person 1 102-1 from the perspectives of person 1 102-1 (e.g., the entire private space 1 104-1, parts of the semi-private spaces 1-*k* 106-1, . . . 106-*k* that are relevant to person 1 102-1, and a slice of the public space 108 that is relevant to person 1 102-1). Each person 102-1, . . . 102-*n* then uses its own person-centric INDEX system 202-1, . . . 202-*n* to access its own person-centric space 200-1, . . . 200-*n*, respectively. Based on inputs from a person to its person-centric INDEX system, outputs are returned based on information from the person-centric space in any forms and styles, including, for example, any conventional outputs such as search result pages with "blue links," and any types of intent-based cards such as search results cards, answer cards, email cars, notice cards, and so on.

Figure 9:
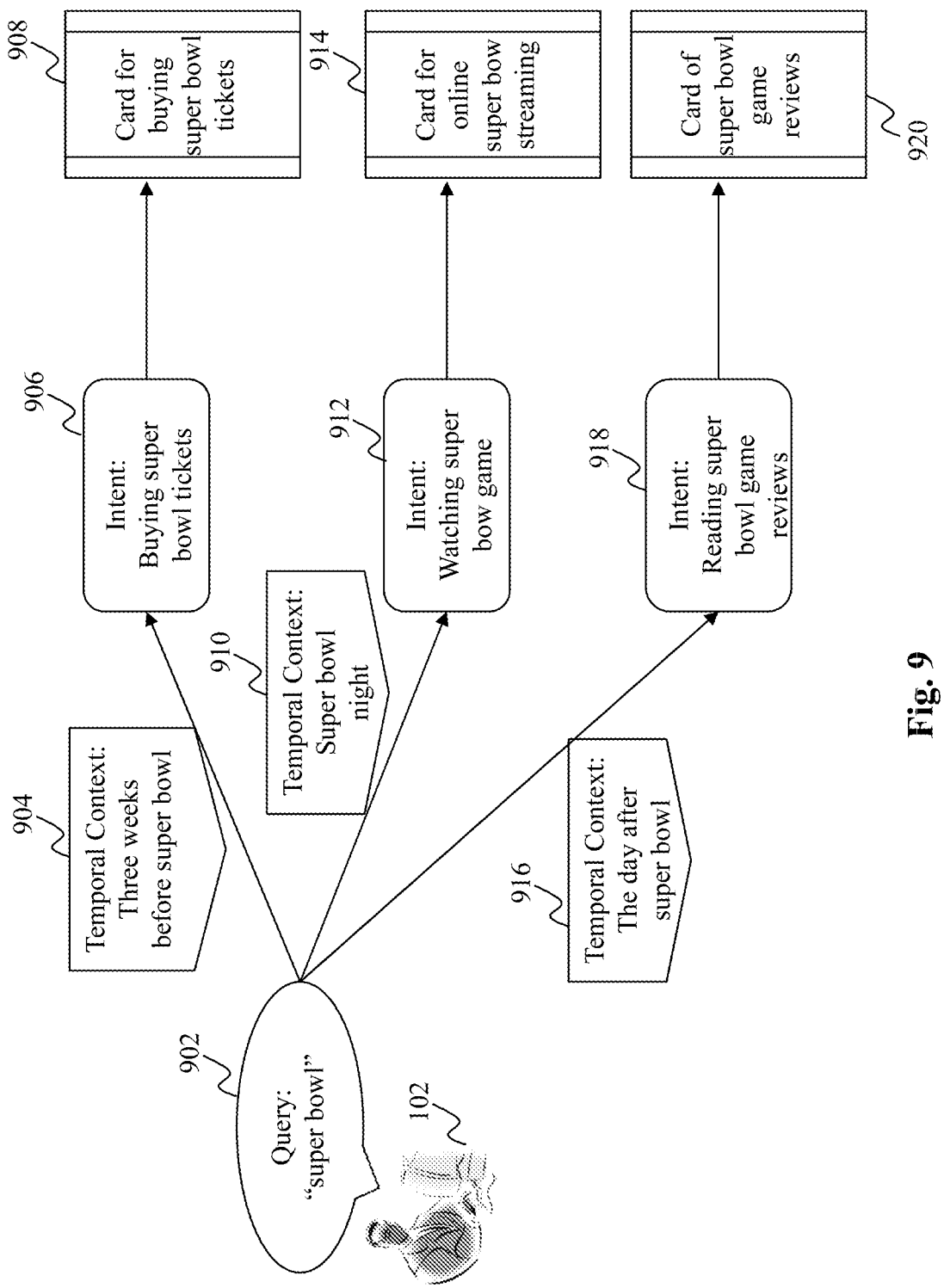
FIG. 9 depicts an exemplary scheme in which a variety of dynamic cards are built and provided to a person based on different intents estimated for the same query in different contexts, according to an embodiment of the present teaching.

FIG. 9 depicts an exemplary scheme in which a variety of dynamic cards are built and provided to a person based on different intents estimated for the same query in different contexts, according to an embodiment of the present teaching. Conventionally, a static card that has been pre-constructed for certain popular entities may be presented to a person when the query from the person happens to include one of those popular entities. In contrast, intent-based cards according to the present teaching can be dynamically generated on-the-fly by the person-centric INDEX system 202 responsive to a query 902 from the person 102. In this example, the person 102 inputs the same query 902 "super bowl" at different times. When the query 902 is entered three weeks before the super bowl game, its temporal context 904 will likely cause the intent 906 to be estimated as "buying super bowl tickets." Based on such intent, a card 908 is dynamically generated for buying super bowl tickets, including information such as super bowl ticket prices, tips on how to purchase, purchase website, etc. In some embodiments, the generation of this card 908 would cause a task of purchasing super bowl tickets to be automatically generated and completed. As time passes, when the temporal context 910 changes to the super bowl night, when the person 102 enters the same query 902, the intent 912 will likely change to "watching super bowl game." Accordingly, a different card 914 for online super bowl game streaming is built and presented to the person 102, which may include, for example, websites currently streaming the game. When the game finishes and the temporal context 916 changes to the day after the super bowl game, if the person 102 again enters the query 902, the intent 918 will likely become "reading super bowl game reviews." A card 920 of super bowl game reviews is constructed and presented to the person 102. It is understood that the examples described above are for illustrative purpose and are not intended to be limiting.

Figure 10:
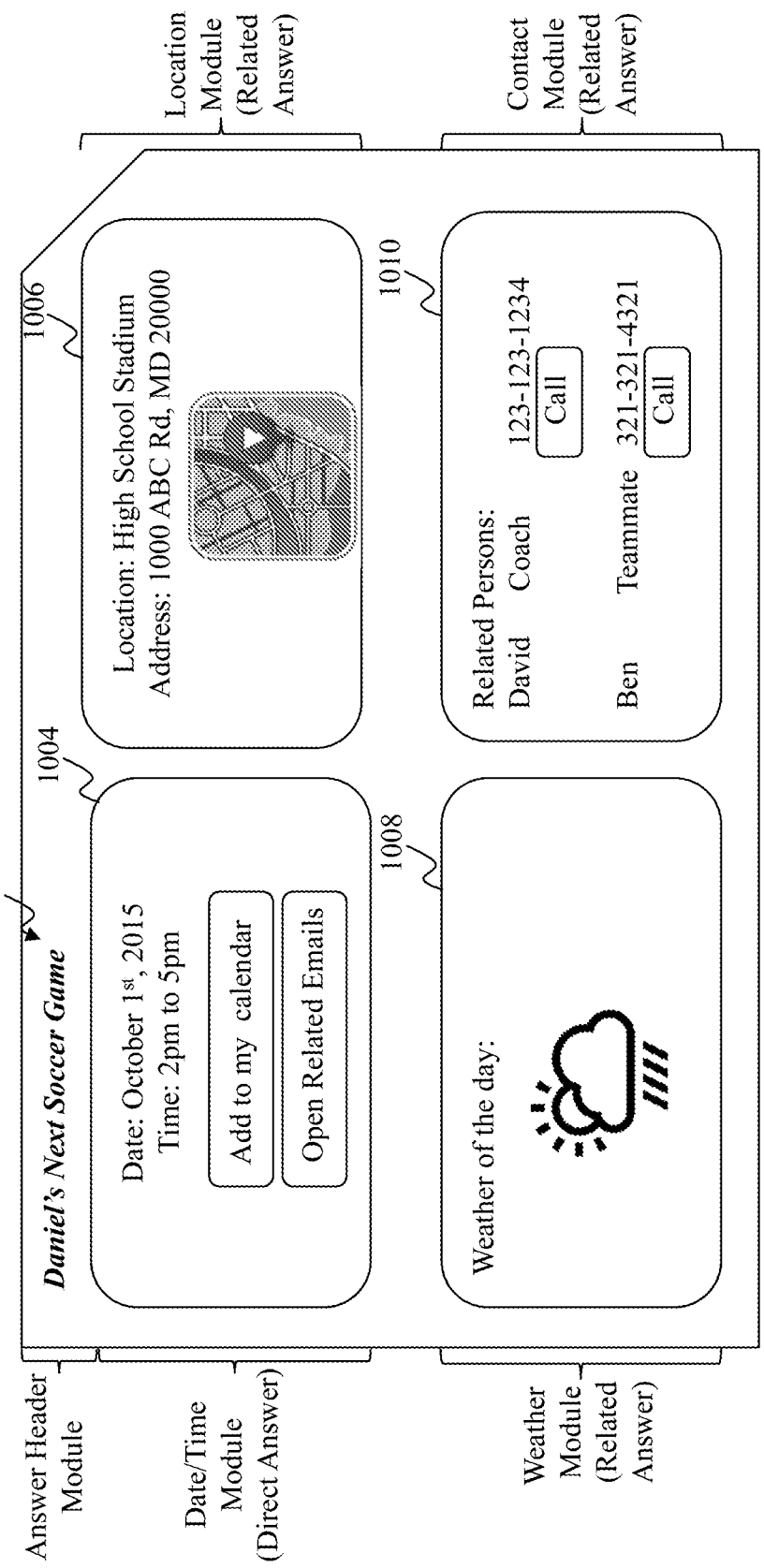
FIG. 10 illustrates an exemplary answer card, according to an embodiment of the present teaching.

FIG. 10 illustrates an exemplary answer card, according to an embodiment of the present teaching. The answer card 1000 in this example is dynamically constructed on-the-fly in response to the question "when is my son's soccer game?" Based on the type of the card (answer card) and intent (finding out my son's soccer game date/time), the layout and modules are determined as shown in FIG. 10. It is understood that the shape, size, and layout of the answer card 1000 is for illustrative purpose only and may vary in other examples. In some embodiments, the shape, size, and layout may be dynamically adjusted to fit the specification of the user device (e.g., screen size, display resolution, etc.).

In this example, the answer card includes an answer header module 1002 indicating that the topic of the answer card 1000 is "Daniel's (my son's name identified according to person-centric knowledge) Next Soccer Game." The direct answer to the question is found from a private email and provided in the date/time module 1004. Optionally, certain actions related to the answer may be provided as well, such as "add to my calendar" and "open related emails." Other information related to the direct answer is provided in other modules as well. The location module 1006 provides the location, address, and map of the soccer game. Information such as location and address may be retrieved from the email related to the game in the private database 548 of the person-centric space 200, while the map may be retrieved from Google Maps in the public space 108. The weather module 1008 provides the weather forecast of the game day, which may be retrieved from wwww.Weather.com in the public space 108. The contact module 1010 shows persons involved in the game and their contact information retrieved from the email about the game and private Contacts in the private database 548 of the person-centric space 200. Optionally, action buttons may be provided to call the persons directly from the answer card 1000. It is understood that the example described above is for illustrative purpose and are not intended to be limiting.

Figure 11:
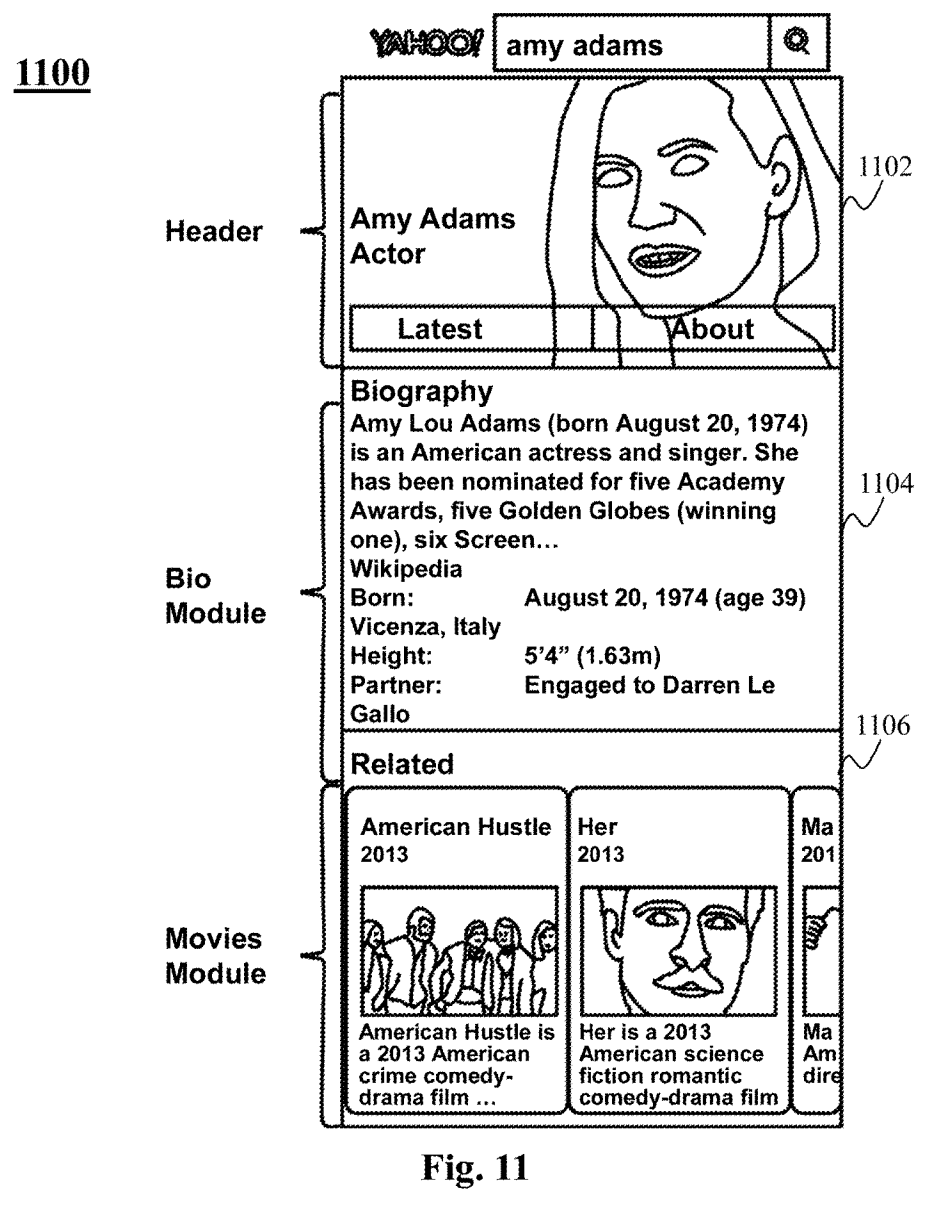

FIG. 11 illustrates an exemplary search result card, according to an embodiment of the present teaching. The search results card 1100 in this example is dynamically constructed on-the-fly in response to the query "amy adams." Based on the type of the card (a search results card) and intent (learning more about actor Amy Adams), the layout and modules are determined as shown in FIG. 11. It is understood that the shape, size, and layout of the search results card 1100 is for illustrative purpose only and may vary in other examples. In some embodiments, the shape, size, and layout may be dynamically adjusted to fit the specification of the user device (e.g., screen size, display resolution, etc.). In this example, the search results card 1100 includes a header module 1102 with the name, occupation, and portrait of Amy Adams. The bio module 1104 includes her bio retrieved from Wikipedia, and the movies module 1106 includes her recent movies. In the movies module 1106, each movie may be presented in a "mini card" with the movie's name, release year, poster, and brief instruction, which are retrieved from www.IMDB.com. The movies module 1106 is actionable so that a person can swap the "mini cards" to see information of more her movies. If more modules cannot be shown simultaneously due to the size of the search results card 1100 (for example when it is shown on a smart phone screen), tabs (e.g., "Latest," "About") may be used to display different modules. It is understood that the example described above is for illustrative purpose and are not intended to be limiting.

Figure 12:
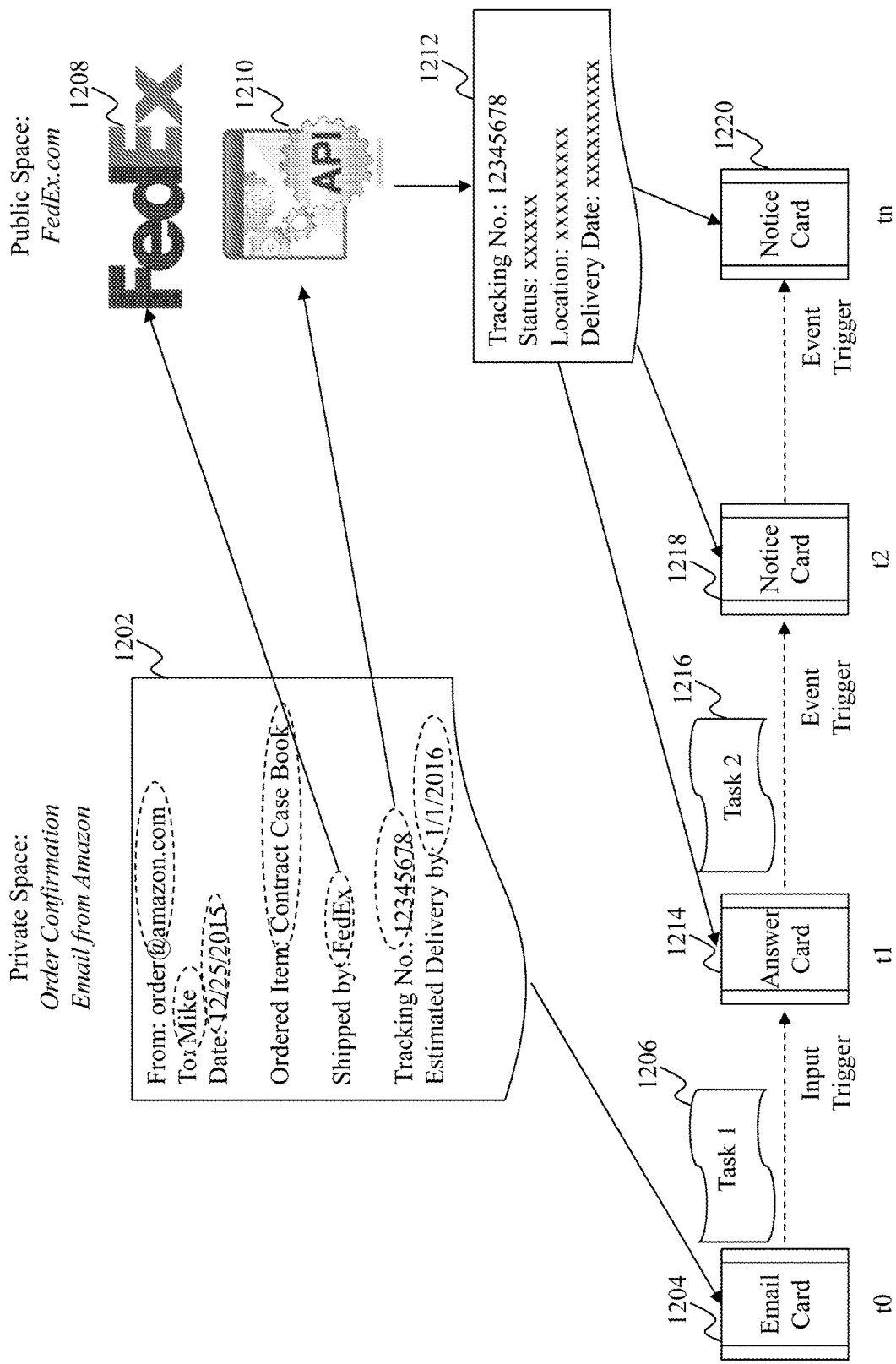
FIG. 12 depicts an exemplary scheme of automatic online order email summary and package tracking via cross-linked data in a person-centric space, according to an embodiment of the present teaching.

FIG. 12 depicts an exemplary scheme of automatic online order email summary and package tracking via cross-linked data in a person-centric space, according to an embodiment of the present teaching. Various aspects of the present teaching are illustrated in FIG. 12 as well as related FIGS. 13-15, including cross-linking data from different spaces, entity extraction and building person-centric knowledge representation, dynamic card productions based on intent, answering personal questions, and automatic task generation and completion. In this example, at time t0, an order confirmation email 1202 is received from www.Amazon.com. The email 1202 in the private space is processed to extract and identify entities. The entities include, for example, seller/vendor—www.Amazon.com, recipient/person—Mike, order date—Dec. 25, 2015, item—Contract Case book, shipping carrier—FedEx, tracking number—12345678, and estimated delivery date: Jan. 1, 2016. In response to receiving the email 1202, an email card 1204 summarizing the email 1202 is generated and may be provided to Mike automatically or upon his request.

Figure 13:
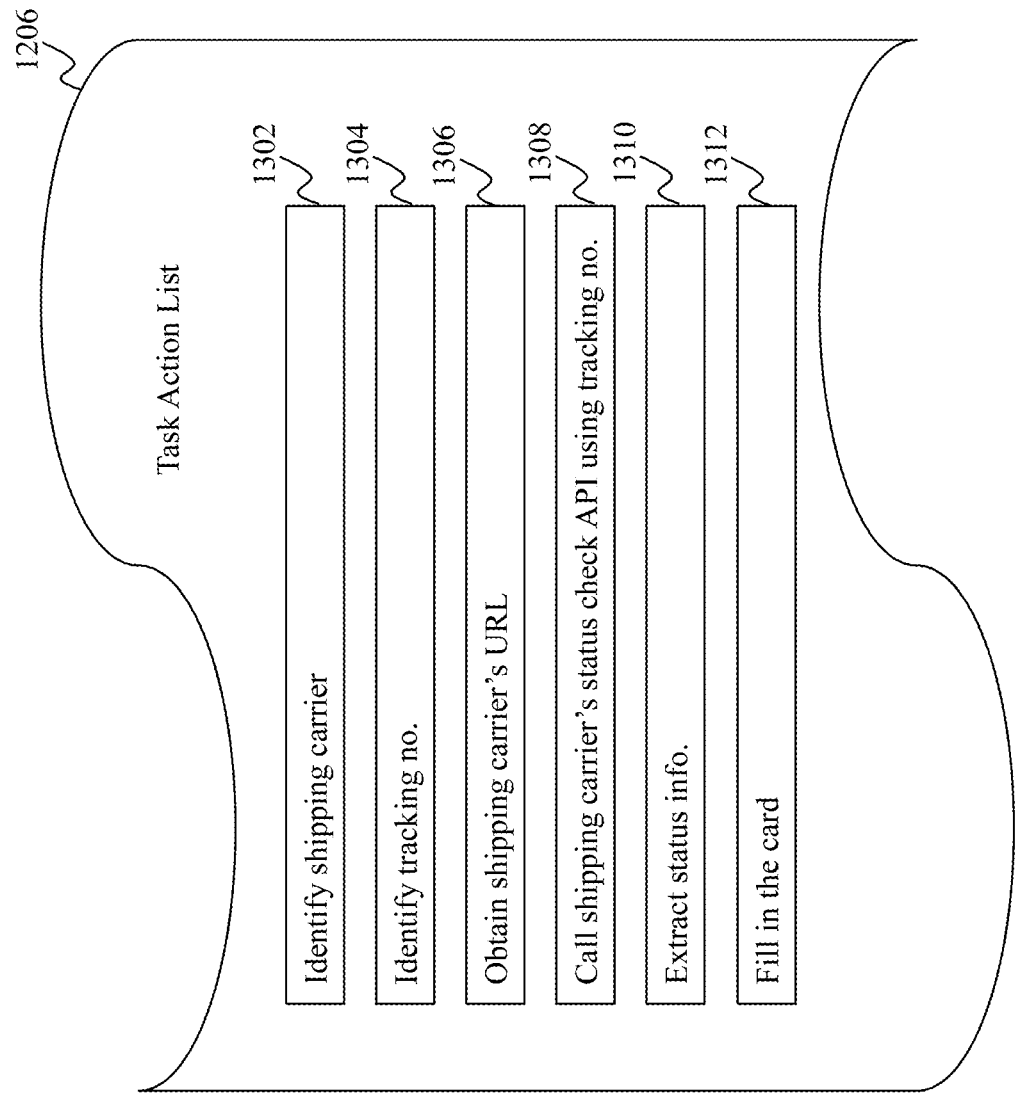
FIG. 13 illustrates an exemplary task with a list of task actions for automatic package tracking.

The generation of the email card 1204 in this example automatically initiates the generation of task 1 1206 for checking package delivery status. The details of task 1 1206 will be described in FIG. 13. In order to check the package delivery status, one or more cross-linking keys in the package shipping domain are identified among the entities extracted from the email 1202. As shown in FIG. 13, the entity "shipping carrier-FedEx" is a cross-linking key used for identifying the website of FedEx 1208 in the public space, and the entity "tracking number-12345678" is a cross-linking key used for calling the status check API 1210 of FedEx 1208. Based on the tracking number, package delivery status information 1212 is retrieved from FedEx 1208. Different pieces of information from the private space and public space are thus cross-linked based on the cross-linking keys and can be projected into the person-centric space.

At time t1, in response to an input from Mike (e.g., a question "where is my amazon order?"), an answer card 1214 is dynamically generated based on private information in the email card 1204 and the public package delivery status information 1212. The answer card 1214 is presented to Mike as an answer to his question. In this example, the generation of the answer card 1214 automatically initiates another task 2 1216 for monitoring and reporting package delivery status update. According to task 2 1216, package delivery status information 1212 may be regularly refreshed and updated according to a schedule (e.g., every two hours) or may be dynamically refreshed and updated upon detecting any event that affects the package delivery. In this example, at times t2 and tn, certain events, such as package being delayed due to severe weather or package being delivered, trigger the generation of notice cards 1218, 1220, respectively. It is understood that the example described above is for illustrative purpose and are not intended to be limiting.

FIG. 13 illustrates an exemplary task with a list of task actions for automatic package tracking. Task 1 1206 for tracking package delivery status in this example includes a series of task actions (task action list): identifying shipping carrier 1302, identifying tracking number 1304, obtaining shipping carrier's URL 1306, calling shopping carrier's status check API using the tracking number 1308, extracting status information 1310, and filling in the card 1312. Each task action may be associated with parameters such as conditions in which the task action is to be executed. For example, for task action 1312 "filling in the card," the condition may be filling the current package delivery status into an answer card when a question about the package delivery status is asked by the person or filling the current package delivery status into a notice card of package delivery status update without waiting for any input from the person. Some task actions (e.g., 1302, 1304) may be executed by retrieving relevant information from the person-centric space 200 and/or the person-centric knowledge database 532, while some task actions (e.g., 1308) need to be completed in the public space 108. It is understood that the example described above is for illustrative purpose and are not intended to be limiting.

Figure 14:
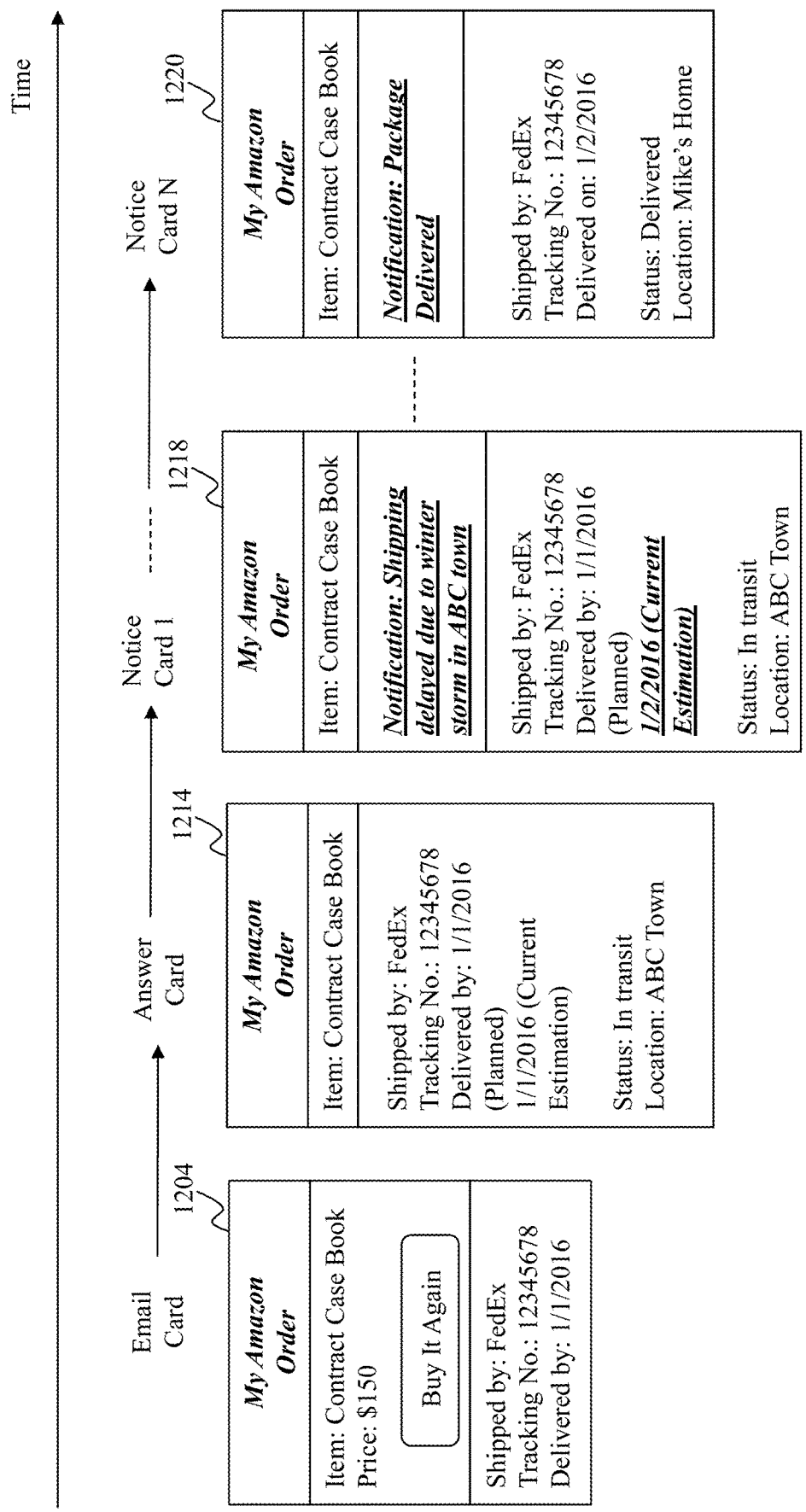
FIG. 14 illustrates a series of exemplary cards provided to a person in the process of automatic online order email summary and package tracking.

FIG. 14 illustrates a series of exemplary cards provided to a person in the process of automatic online order email summary and package tracking. In this example, the email card 1204 is automatically generated responsive to receiving the amazon order confirmation email 1202 and summarizes the email 1202 based on the entities extracted from the email 1202 and relationships thereof. The email card 1204 includes a header module "My Amazon Oder" and an order module with entities of item and price. A "buy it again" action button may be added in the order module. The email card 1204 also includes a shipping module with entities of shipping carrier, tracking number, and scheduled delivery date.

In this example, the answer card 1214 is generated in response to a question from the person about the status of the package. The answer card 1214 includes the header module and order module (but with less information as the order information is not a direct answer to the question). The answer card 1214 includes a shipping module with rich information related to shipping, which is retrieved from both the private email 1202 and FedEx 1208. The information includes, for example, entities of shipping carrier, tracking number, and scheduled delivery date from the private email 1202, and current estimated delivery date, status, and location from FedEx 1208.

In this example, multiple notice cards 1218, 1220 are automatically generated in response to any event that affects the status of the package. Each notice card 1218, 1220 includes an additional notification module. If any other information is affected or updated due to the event, it may be highlighted as well to bring to the person's attention. In notice card 1 1218, shipment is delayed due to a winter storm in ABC town and as a consequence, the current estimated delivery date is changed according to information retrieved from FedEx 1208. According to notice card N 1220, the package has been delivered to Mike's home. It is understood that the examples described above are for illustrative purpose and are not intended to be limiting.

Figure 15:
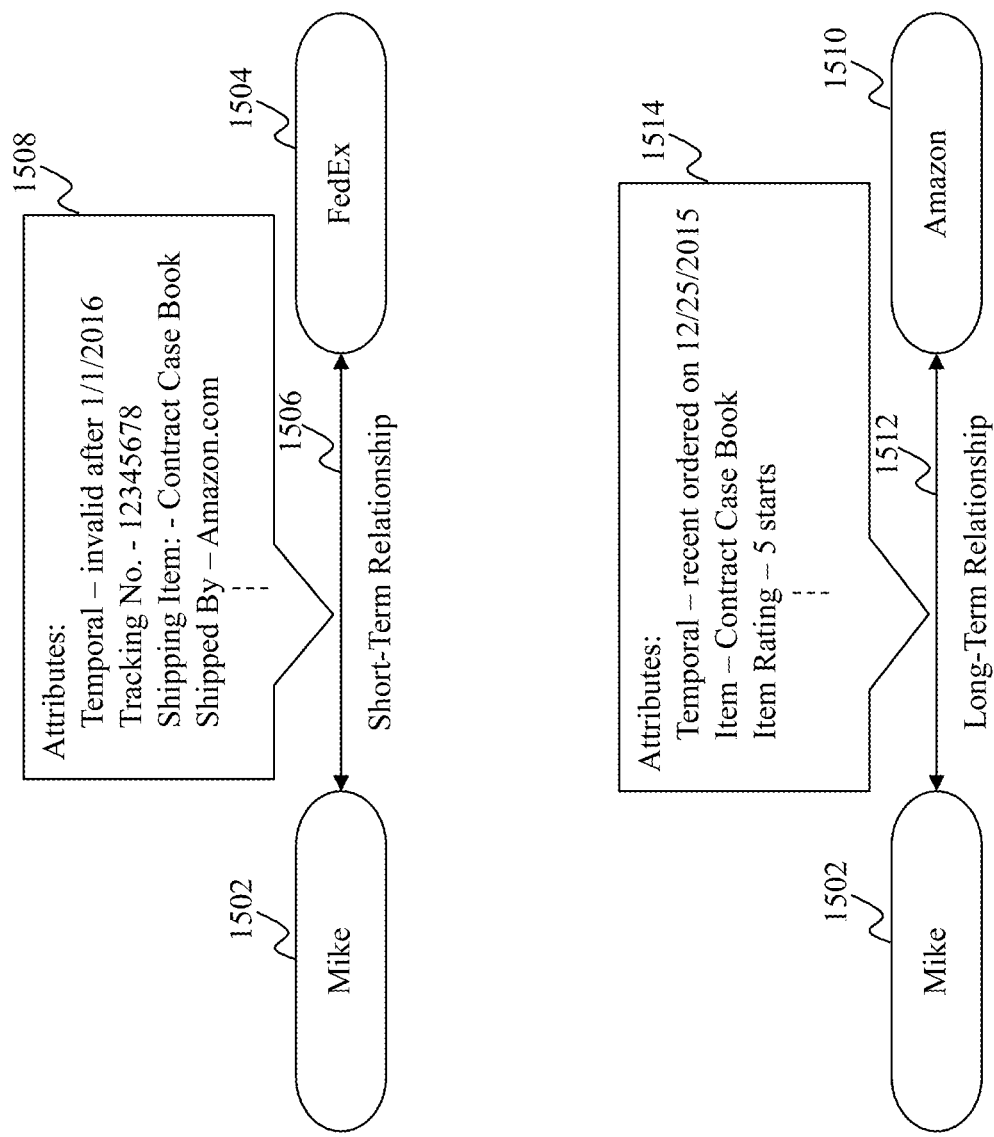
FIG. 15 illustrates exemplary entities extracted from a person-centric space and their relationships established in the process of automatic online order email summary and package tracking.

FIG. 15 illustrates exemplary entities extracted from a person-centric space and their relationships established in the process of automatic online order email summary and package tracking. As described above, the person-centric knowledge database 532 stores person-centric knowledge organized in the form of entity-relationship-entity triples. Entities extracted from the amazon order confirmation email 1202 are formed into entity-relationship-entity triples by the knowledge engine 530. In the example of FIG. 15, entity "Mike" 1502 from the recipient field of the email 1202 is determined as the person using the person-centric INDEX system 202, and entity "FedEx" 1504 is determined as a shipping carrier with a short-term relationship 1506 with entity "Mike" 1502. Attributes 1508 may be associated with the relationship 1506 including, for example, temporal attribute, tracking number, shipping item, sender, etc. These attributes may include related entities extracted from the email 1202 and any other attributes inferred based on the relationship 1506. It is noted that the relationship 1506 between entity "Mike" 1502 and entity "FedEx" 1504 is a short-term, temporary relationship in the sense that the relationship 1506 will become invalid after the shipment is completed, as indicated by the temporal attribute. In this example, entity "Mike" 1502 and another entity "Amazon" 1510 establish a long-term relationship 1512 with a different set of attributes 1514 thereof. The attributes 1514 include, for example, the temporal attribute, item, item rating, and so on. The relationship 1512 is long-term in this example because Mike has been repeatedly ordered goods from Amazon, which has become his behavior pattern or preference. It is understood that the examples described above are for illustrative purpose and are not intended to be limiting.

More detailed disclosures of various aspects of the person-centric INDEX system 202 are covered in different U.S. patent applications, entitled "Method and system for associating data from different sources to generate a person-centric space," "Method and system for searching in a person-centric space," "Methods, systems and techniques for providing search query suggestions based on non-personal data and user personal data according to availability of user personal data," "Methods, systems and techniques for personalized search query suggestions," "Methods, systems and techniques for ranking personalized and generic search query suggestions," "Method and system for entity extraction and disambiguation," "Method and system for generating a knowledge representation," "Method and system for generating a card based on intent," "Method and system for dynamically generating a card," "Method and system for updating an intent space and estimating intent based on an intent space," "Method and system for classifying a question," "Method and system for providing synthetic answers to a personal question," "Method and system for automatically generating and completing a task," "Method and system for online task exchange," "Methods, systems and techniques for blending online content from multiple disparate content sources including a personal content source or a semi-personal content source," and "Methods, systems and techniques for ranking blended content retrieved from multiple disparate content sources." The present teaching is particularly directed to entity extraction and disambiguation.

The system disclosed herein may extract entities from content in a user's person-centric space, e.g., from any personal communication, such as an email sent from or sent to the user; or from the user's input on a social network where the user has an account with credentials. These entities can be places like restaurants or places of interest; contact mentions like names, emails, phone numbers or addresses; and events with date, place and persons involved. In addition to extracting these mentions, the system here can resolve them to what they refer to, i.e. can disambiguate an extracted entity when it may refer to multiple individuals. For example, a word "King" in a user's email may refer to a title of a person who is the King of a country or refer to a person's last name. The system may utilize the user's person-centric knowledge to determine what type of entity the word "King" refers to in the email.

In addition to determining an entity type for an extracted entity name, the system may also determine a specific individual referred to by this entity name. For example, a person's first name may refer to different contacts, and a same restaurant name can refer to several restaurants. The system in the present teaching can make use of contextual information and/or textual metadata associated with the entity name in the email to disambiguate such cases, providing a high precision resolution.

With the precise disambiguation, the system can find right information from unstructured personal data and provide it in a structured way, e.g., in a graph associated with the user. The information in the graph may be used for integration with event cards, calendars, and other applications that provide services such as maps, restaurant reviews, photos, tickets for attractions, movies, trips and advertising to better assist users in daily planning. In contrast to a conventional personal profile, the system here generates a single personal graph for an individual to encompass connections, interests and events associated with the user, with actionable interfaces on top of the graph. It can be understood that a user's person-centric knowledge may also be represented in a format other than a graph.

The system in the present teaching builds a person-centric knowledge representation for a user by extracting and associating data about the user from personal data sources and linking them together. Existing techniques regarding personal profile construction focus on explicitly declared relationships between entities in the person's network, connections and interests. The system in the present teaching can infer entities related to the user and relationships between the entities without the user's explicit declaration and create a person-centric knowledge graph for the user based on these inferred entities and relationships. The inference can be based on the user's private sources like email and/or semi-private sources like Flickr. The knowledge elements that can be inferred or deduced may include the user's social contacts and the user's relationships with places, events or other users. There may be several applications based on the inferred information in the person-centric knowledge graph, e.g., an enriched notification about upcoming events; offers and promotions related to an upcoming event, etc.

Figure 16:
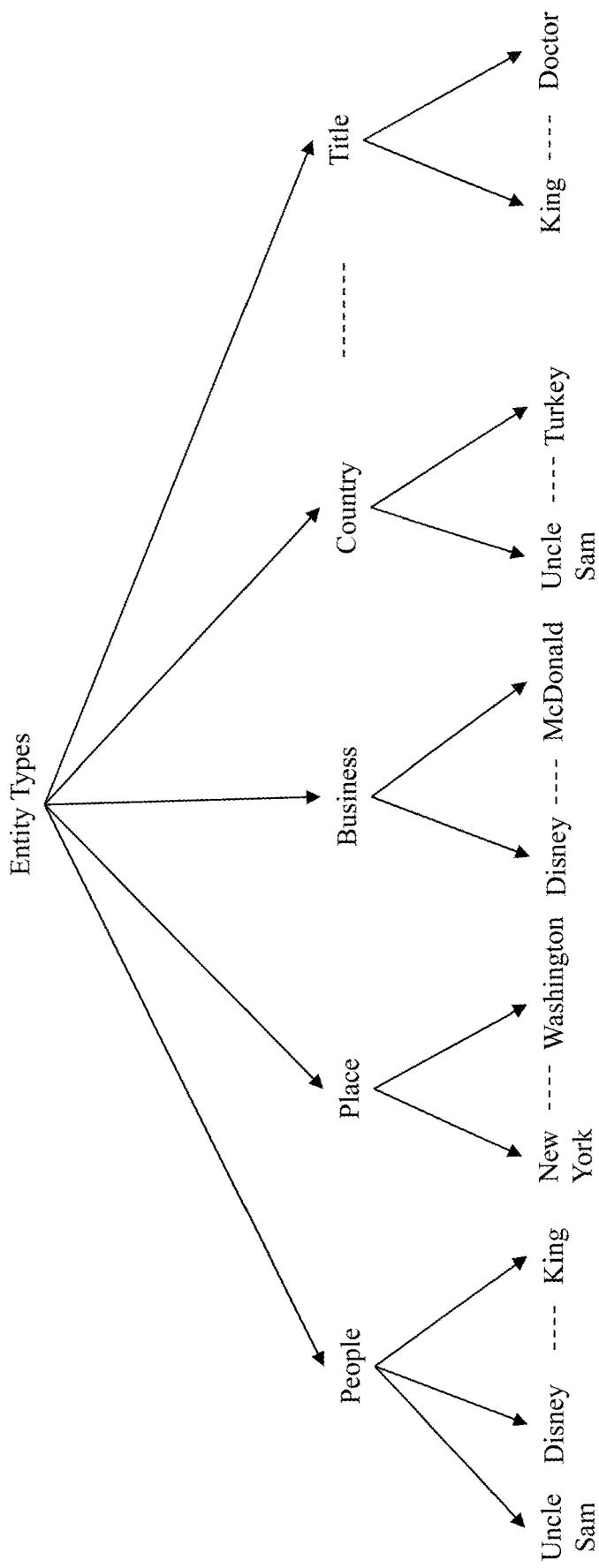
FIG. 16 illustrates examples of entities classified with different entity types, according to an embodiment of the present teaching.

FIG. 16 illustrates examples of entities classified with different entity types, according to an embodiment of the present teaching. The system in the present teaching can classify entities according to different entity types, like people, place, business, title, etc. Two entities may have a same name but belong to different types. For example, Disney may refer to either a name of a person or a name of a company; Turkey may refer to either a name of an animal or a name of a country; and Washington may refer to a name of a person, a name of a city, or a name of a state. Even under a same entity type, one entity name may refer to different entities. For example, Doctor may refer to a title of a person having a doctorate-level degree or a title of a person being a qualified practitioner of medicine. The system can store the classified entities associated with their names and entity types in an entity knowledge database that is either included in the system or can be accessed by the system.

To analyze an entity name, for example one appeared in a user's email, it is important to understand what the name refers to. This may include not only what type the name belongs to in the classification, but also which specific individual the name refers to. For example, if Uncle Sam is extracted from a user's email, the system may determine whether this name refers to a person or refers to the country United States. If the system determines that Uncle Sam in the email refers to a person, the system may also determine who the person is and the relationship between this person and the user. Based on context in the email, other emails, or other data sources related to the user, the system can identify this person, e.g., as the user's uncle, or the user's brother. Then the system can store the identified individual and corresponding identified relationship in a person-centric knowledge database associated with the user. The entities associated with the user may be represented by a person-centric knowledge, e.g., a person-centric knowledge graph, including relationships between the entities and attributes associated with the relationships. The accurate disambiguation of an extracted entity name can help to build an accurate person-centric knowledge for the user, and hence help to provide better services to the user based on the person-centric knowledge, like event or notice cards, maps, coupons and advertisements interesting to the user.

Figure 17:
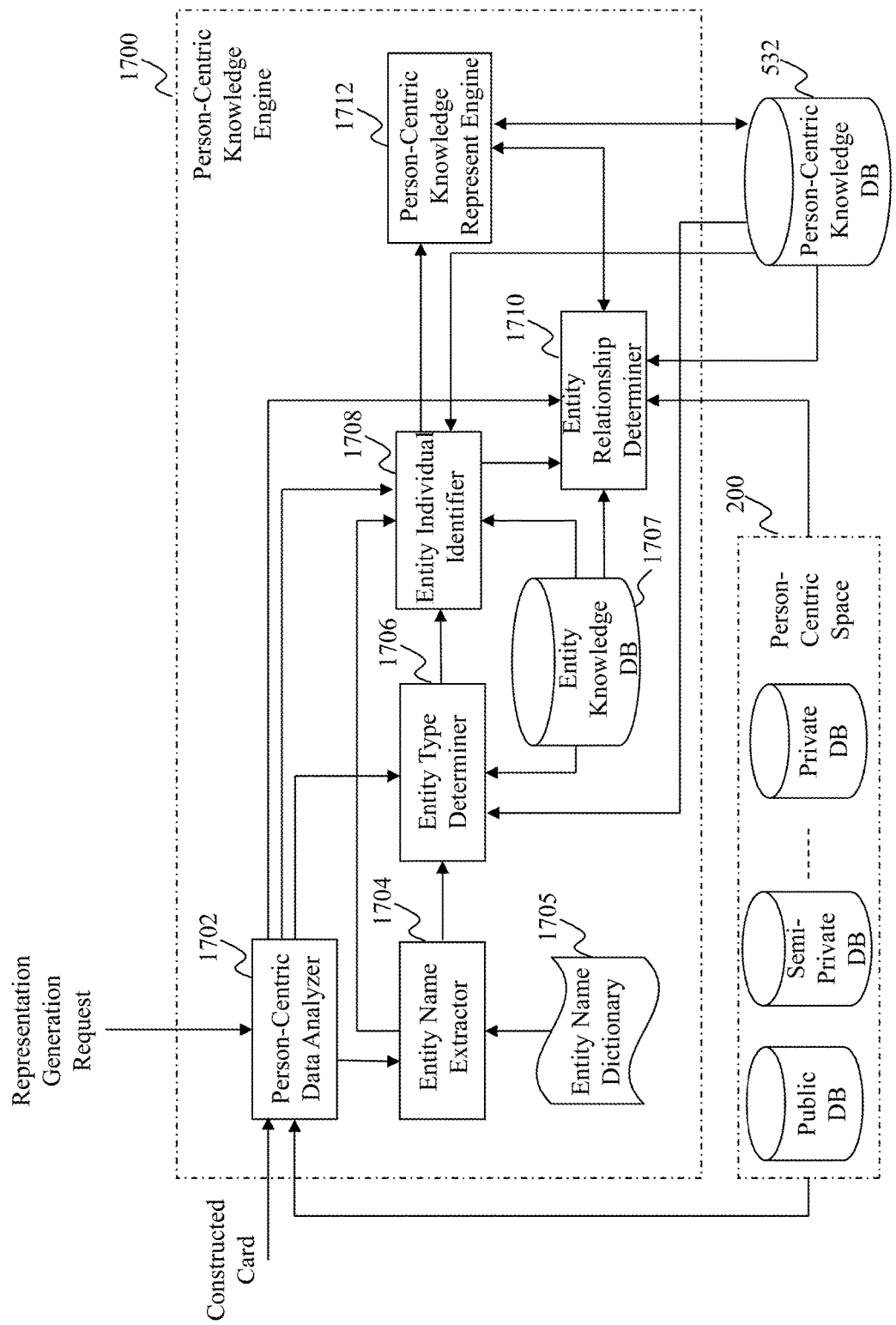
FIG. 17 shows an exemplary system diagram of a person-centric knowledge engine, according to an embodiment of the present teaching.

FIG. 17 shows an exemplary system diagram of a person-centric knowledge engine 1700, according to an embodiment of the present teaching. In one embodiment, the person-centric knowledge engine 1700 may be included in the knowledge engine 530 of a user, e.g. the person 102. The person-centric knowledge engine 1700 can extract information from the person-centric space 200 associated with the person 102, build or update a person-centric knowledge for the user based on the extracted information, and store the person-centric knowledge in the person-centric knowledge DB 532. As shown in FIG. 17, the person-centric knowledge engine 1700 in this example includes a person-centric data analyzer 1702, an entity name extractor 1704, an entity name dictionary 1705, an entity type determiner 1706, an entity knowledge DB 1707, an entity individual identifier 1708, an entity relationship determiner 1710, and a person-centric knowledge represent engine 1712.

The person-centric data analyzer 1702 in this example may receive a request to generate a knowledge representation for a user. The request may come from the person 102 or a service provider related to the person 102 to initiate a generation of a knowledge representation, e.g., a knowledge graph for the user. In another embodiment, the generation may be initiated by a constructed card for the person 102. For example, after the dynamic card builder 528 builds a card for the user, it may send the constructed card to the person-centric data analyzer 1702 for generating or updating a knowledge graph for the user, because the constructed card may include new entities or new relationships associated with the user that are not included in the knowledge graph. In yet another embodiment, the person-centric data analyzer 1702 may proactively monitor changes in the user's person-centric data, e.g., a new email to or from the user, a new post online from the user, or a new connection of the user on a social network. Based on a detected change, the person-centric data analyzer 1702 may itself initiate a generation or update of a knowledge representation for the user. According to various embodiments, once the person-centric data analyzer 1702 obtains or generates the initiation, the person-centric data analyzer 1702 may receive and analyze person-centric data of the user, e.g., a new email, a newly constructed card, a new post, a new message, a new image, or any other content item associated with the user in the person-centric space 200. When it is the first time to generate a person-centric knowledge graph for the user, the person-centric data analyzer 1702 may retrieve all information from the person-centric space 200 associated with the user for generating the person-centric knowledge graph.

The person-centric data analyzer 1702 can analyze the retrieved person-centric data by some pre-processes, including, e.g., data clean up, language detection, tokenization, lemmatization, parsing, speech tagging, sentence splitting, named entity recognition, etc. The person-centric data analyzer 1702 may then send the analyzed person-centric data to the entity name extractor 1704 for entity name extraction, to the entity type determiner 1706 for entity type determination, and to the entity individual identifier 1708 for entity individual identification.

The entity name extractor 1704 in this example can extract one or more entity names from the person-centric data, e.g., from an email of the user. As discussed above, because an entity of interest may have different aliases, a detected entity name may correspond to various potential entities of interest. The detection may be based on the entity name dictionary 1705, which includes entity names that can potentially be resolved to entities of interest for the user. In one embodiment, the entity name dictionary 1705 may be updated by the system periodically or upon request. In another embodiment, the entity name extractor 1704 may also extract entities' relationships and metadata, if available, from the person-centric data. The entity name extractor 1704 may send an extract entity name to the entity type determiner 1706 for entity type determination.

Based on the extracted entity name and the analyzed person-centric data, the entity type determiner 1706 in this example may determine one or more entity types that are potentially associated with the entity of interest. For example, an entity name "King" detected from a user's email may refer to any of the three entity types: a person, a title, or a company. The entity type determiner 1706 may determine which entity type the word "King" refers to in the user's email. This determination may be based on a deep machine learning model trained with some entities with known types from the entity knowledge DB 1707. The deep learning model can be trained with various corpora. The corpus source can be selected based on entity type, e.g., Yelp for local entities, IMDB for movies, Wikipedia for other generic types, etc. By analyzing some features associated with the entity name, the entity type determiner 1706 may determine an entity type that has corresponding features based on the deep machine learning model. In addition, the determination may also be based on the person-centric knowledge about this user. For example, if the user's person-centric knowledge graph includes the entity "King" as a person rather than a title or a company, the entity type determiner 1706 may determine the entity name "King" in the email as a person as well. Furthermore, the entity type determiner 1706 may determine the entity type based on context or metadata in the email, other emails, or other data sources related to the user. The entity type determiner 1706 may send the determined entity type to 1708 for identifying an entity individual.

In one embodiment, the entity type determiner 1706 may select multiple potential entity types for the entity name, each with a confidence score. In that case, the entity type determiner 1706 may send the multiple entity types with their confidence scores to the entity individual identifier 1708. The entity individual identifier 1708 may identify the entity individual with an entity type within the multiple entity types.

In another embodiment, the entity type determiner 1706 may assign a confidence score for each possible entity type associated with the entity name and send all of the possible entity types without selection to the entity individual identifier 1708. The entity individual identifier 1708 may identify the entity individual with an entity type within the possible entity types.

The entity individual identifier 1708 in this example receives the extracted entity name from the entity name extractor 1704, receives the one or more determined entity types associated with the entity name, and receives the analyzed person-centric data from the person-centric data analyzer 1702. In one case, once an entity type is determined for the entity name, it is easy to identify an entity individual as there is just one possibility. For example, if entity name "Turkey" is determined to refer to a country, the entity individual identifier 1708 may immediately identify the country because there is just one country named Turkey in the world, or say in the entity knowledge DB 1707. In another case, after an entity type is determined for the entity name, the entity name may still refer to different entity individuals under this entity type. For example, if entity name "McDonald" is determined to refer to a restaurant, the entity individual identifier 1708 may identify which McDonald's restaurant is referred to by the entity name in the user's email. In yet another case, the entity type determiner 1706 determines multiple potential entity types for the entity name with confidence scores. The entity individual identifier 1708 may then select an entity individual with one of the potential entity types, taking into consideration of the types' confidence scores.

The entity individual identifier 1708 may identify an entity individual based on contextual information, textual metadata and features with respect to the entity name from the person-centric data. The contextual information may include relevant key phrases mentioned in the text, their position and distances from the mentioned entity name (including global mentions or local mentions near the entity name), tokens surrounding the mentioned entity name, etc. The textual metadata, e.g., for a mail or email, may include location from which the mail was sent, date and time of the mail, type of the mail, attachments information, discussion threads in the mail, etc. The textual features may include case (lowercase or uppercase) and part-of-speech (POS) tags of the entity name, other entity names and their distances, etc.

The entity individual identifier 1708 may also identify the entity individual based on prior user information and prior entity information with respect to the entity name. The prior user information may be obtained offline and may include the user's location, contacts, gender, age, calendar data, etc. Many of these may come from the user's person-centric knowledge database 532. The prior entity information may include entity aliases, entity type, terms that usually co-occur with a given entity name or entity type, entity relationships, entity geographic information, etc. Many of these may come from the entity knowledge database 1707.

For each determined entity type about the entity name, the entity individual identifier 1708 may generate a candidate list of possible entity individuals. Based on the above mentioned contextual information, textual metadata and features, prior user information, and/or prior entity information, the entity individual identifier 1708 may identify an entity individual referred to by the entity name, i.e., to resolve the entity name. For example, the entity individual identifier 1708 may identify a specific person (with name and address if available) referred to by the name "King" or identify a specific business location (e.g., a specific resort) referred to by the name "Disney." The entity individual identifier 1708 may send the resolved entity to the entity relationship determiner 1710 for determining entity relationships, and to the person-centric knowledge represent engine 1712 for generating or updating a person-centric knowledge representation for the user.

The entity relationship determiner 1710 in this example may determine relationships between different entities related to the user. As shown in FIG. 15, two entities may have a short-term or long-term relationship between each other. In one embodiment, the relationship may be declared in the person-centric data. For example, in a user's email, the user has called the entity "King" as his English teacher, or has said that the entity "McDonald" is the restaurant where he is working at. In another embodiment, the relationship may be predetermined based on general knowledge and not dependent on the user. For example, if two entity names "basketball" and "NBA" are both within the user's email, the entity relationship determiner 1710 can determine they are related based on general knowledge. In yet another embodiment, the relationship may be inferred by the entity relationship determiner 1710 based on the person-centric data of the user and/or other users related to the user. For example, a user may tell his son in one email that "your uncle is coming to have dinner with us this weekend," and in another email that "let us have salmon this weekend because Sam loves that." Based on the two emails, the entity relationship determiner 1710 may infer that Sam is the user's brother and the user's son's uncle, although this was not declared in either email. In another example, a user may tell a friend in a text message "let's play tennis this afternoon, and see you at the usual place." If the "usual place" cannot be identified based on the user's person-centric data, the entity relationship determiner 1710 may infer that a specific location is the "usual place" based on the friend's person-centric data, e.g., GPS data, an email to the friend's wife, etc.

For each relationship, the entity relationship determiner 1710 may also determine one or more attributes associated with the relationship. For example, as shown in FIG. 15, attributes 1514 including temporal, item, and item rating are determined for the long-term relationship between the entity Mike 1502 and the entity Amazon 1510.

The entity relationship determiner 1710 may send the relationships with their attributes to the person-centric knowledge represent engine 1712 for generating or updating a person-centric knowledge representation about the user. A person-centric knowledge representation about a user may include knowledge information about the user, e.g., all entities related to the user, relationships among the entities, relationships between the entities and the user, attributes associated with each relationship, and/or other metadata about the user's person-centric knowledge. An example of a person-centric knowledge representation is a person-centric knowledge graph. It can be understood that a person-centric knowledge representation may also be in other formats, like a table, a tree, etc.

Figure 27:
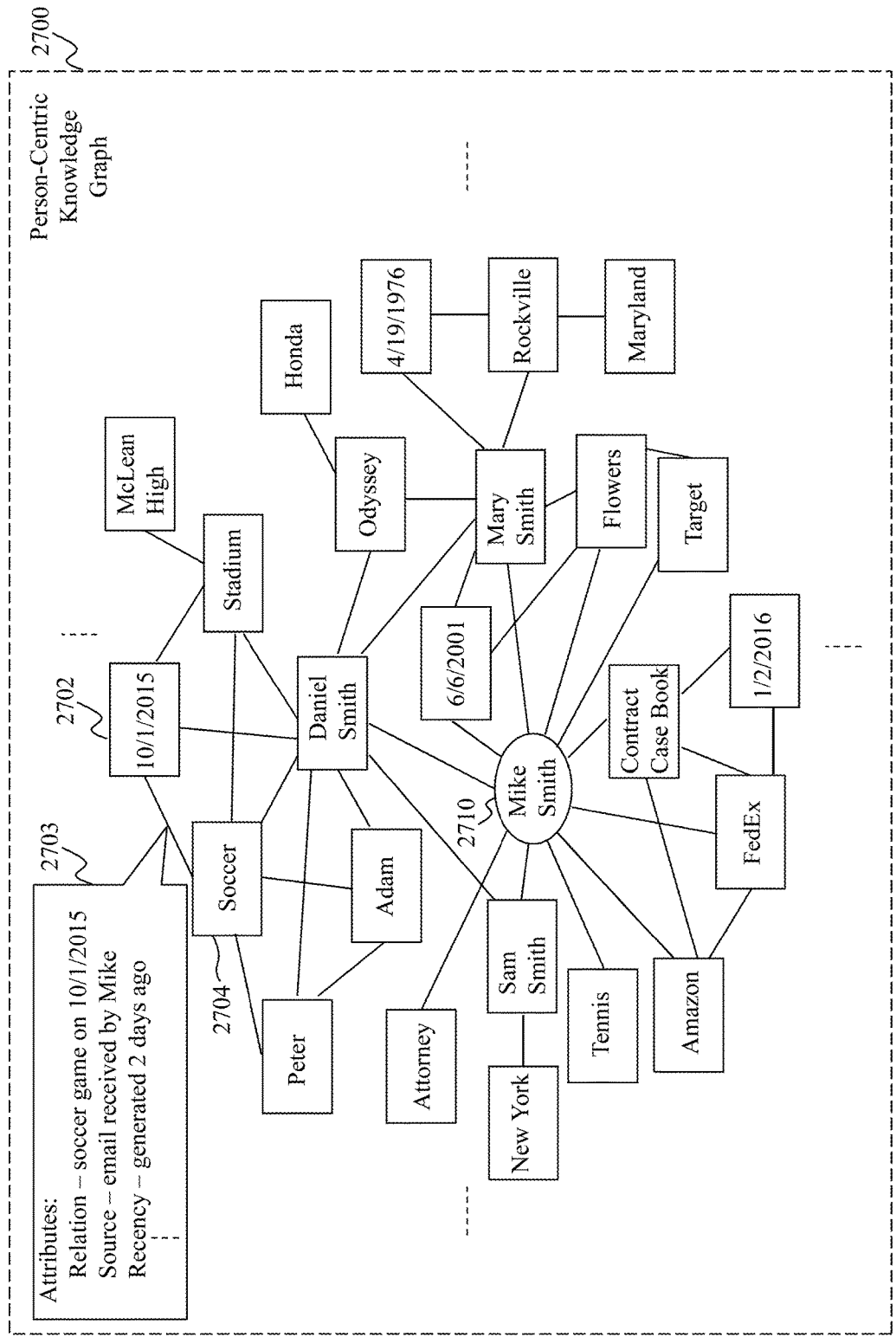
FIG. 27 shows an exemplary person-centric knowledge graph, according to an embodiment of the present teaching.

FIG. 27 shows an exemplary person-centric knowledge graph 2700, according to an embodiment of the present teaching. In this example, the person-centric knowledge graph 2700 is associated with the user Mike Smith 2710. As shown in FIG. 27, the person-centric knowledge graph 2700 includes a plurality of entities related to Mike Smith 2710. Some of the entities are people, e.g., Mary Smith is Mike's wife, Daniel Smith is the son of Mike and Mary Smith, and Sam Smith is Mike's brother. Some of the entities are dates, e.g., Jun. 6, 2001 is the date when Mike and Mary were married, Apr. 19, 1976 is Mary's date of birth, and Oct. 1, 2015 is the date of Daniel's soccer game. An edge linking two entities means a relationship between the two entities. For example, Mike is linked to Tennis as Mike likes to play Tennis; and Mary Smith is linked to Odyssey because Mary drives an Odyssey car.

One or more attributes may be assigned to each of the relationships in the person-centric knowledge graph 2700. For example, the entity Soccer 2704 is linked to the entity Oct. 1, 2015 2702 and they are both linked to the entity Daniel Smith. This is because Daniel will play soccer on Oct. 1, 2015. The attributes 2703 are shown in FIG. 27 for illustration to explain features of the relationship between the entity Soccer 2704 and the entity Oct. 1, 2015 2702. For example, the attributes 2703 include that: a relation between the two entities is that there is a soccer game on Oct. 1, 2015; the source of the relationship is an email received by Mike Smith; and the relationship was generated two days ago. Based on the attributes, the person-centric knowledge represent engine 1712 may determine whether and when to update an entity or a relationship in the person-centric knowledge graph 2700.

In one embodiment, operators and primitives may be used to access the information in the person-centric knowledge representation or graph associated with the user. An operator may indicate a user case like "traveling to" or "upcoming events." Each entity and each entity relationship in a person-centric knowledge representation, e.g., the person-centric knowledge graph 2700, may be stored in association with a particular operator that might be used later for data retrieval or curation. Based on a given operator, the system can determine what information or which portion of the person-centric knowledge graph 2700 may be useful and can be retrieved for a corresponding application.

Referring back to FIG. 17, the person-centric knowledge represent engine 1712 may receive the identified entity individuals from the entity individual identifier 1708 and entity relationships from the entity relationship determiner 1710. The entities and relationships may be derived from the user's email, online post, text message, received card, etc. In one embodiment, the person-centric knowledge represent engine 1712 generates a new person-centric knowledge representation for the user based on the entities and relationships generated from the person-centric space 200. In another embodiment, the person-centric knowledge represent engine 1712 updates a person-centric knowledge representation for the user based on the entities and relationships derived from a new piece of information in the person-centric space 200.

For a new entity, e.g., identified from a new email of the user, the person-centric knowledge represent engine 1712 may also retrieve entities related to the new entity from the user's person-centric knowledge database 532, and send them to the entity relationship determiner 1710 for determining their relationships with the new entity. In this case, the person-centric knowledge represent engine 1712 may update the person-centric knowledge representation of the user based on the new entity and newly determined relationships from the entity relationship determiner 1710. The person-centric knowledge represent engine 1712 can store the generated or updated person-centric knowledge representation in the person-centric knowledge database 532 for future use by an application that provides services or products to the user.

Figure 18:
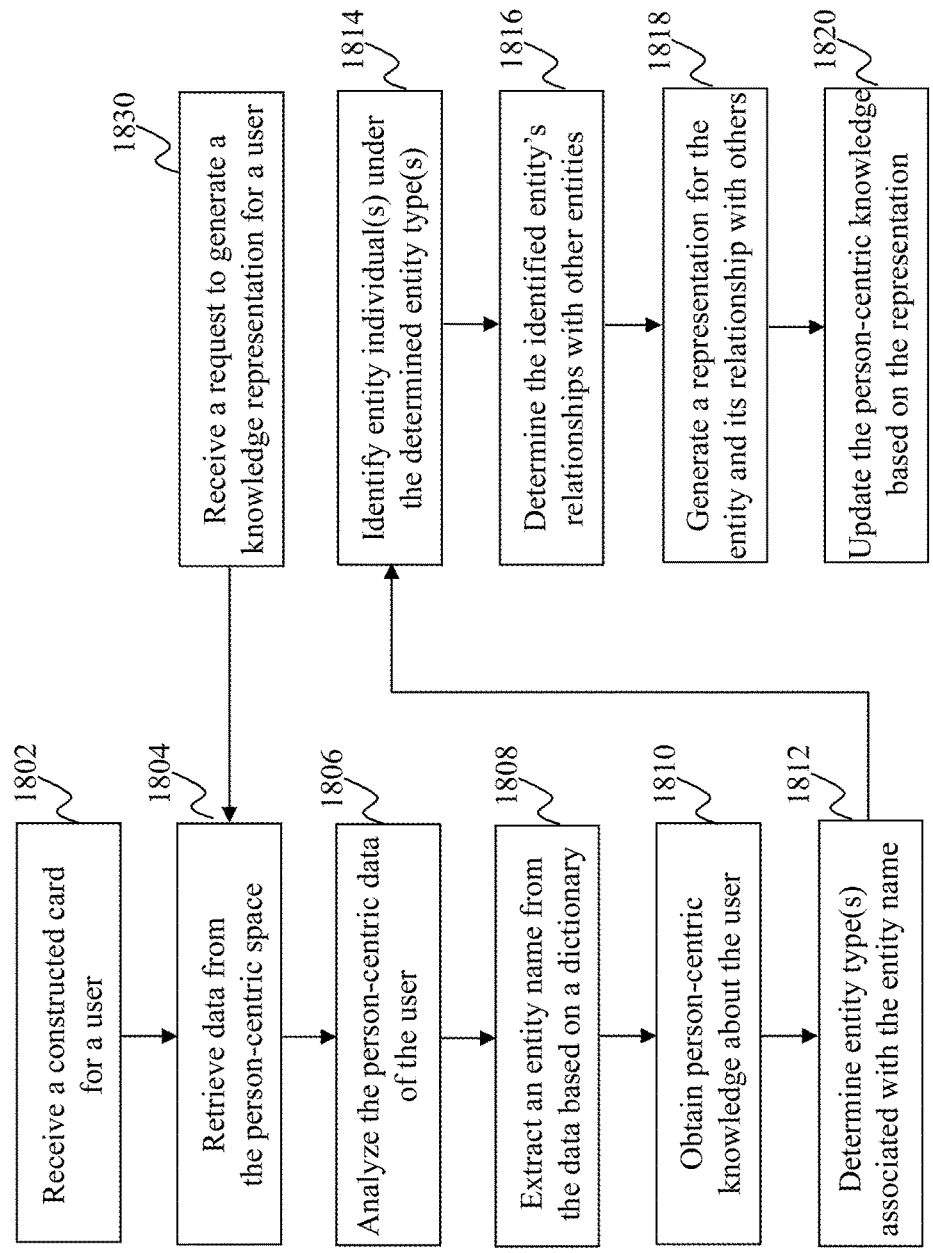
FIG. 18 shows a flow chart of an exemplary process performed by a person-centric knowledge engine, according to an embodiment of the present teaching.

FIG. 18 shows a flow chart of an exemplary process performed by a person-centric knowledge engine, according to an embodiment of the present teaching. At 1802, a constructed card is received for a user. This may be a source to extract entities for the user. The process then goes to 1804. In one embodiment, a request may be received at 1830 to generate a knowledge representation for a user. This may also trigger an extraction of entities from person-centric data of the user. The process then goes to 1804.

Person-centric data is retrieved from the person-centric space of the user at 1804. At 1806, the person-centric data is analyzed, e.g., by some pre-processes as described above. At 1808, an entity name is extracted from the data, e.g., a new text or image related to the user in the person-centric space or a newly constructed card for the user, based on a dictionary. At 1810, person-centric knowledge about the user is obtained, e.g., from a person-centric knowledge representation generated for the user. One or more entity types are determined at 1812 for the entity name, e.g., based on the person-centric knowledge about the user.

At 1814, one or more entity individuals are identified under the determined entity types. In one embodiment, one entity individual is identified associated with one of the entity types to be an entity referred to by the entity name. At 1816, the identified entity's relationships with other entities are determined. At 1818, a representation for the entity and its relationship with other entities is generated for the user. At 1820, the person-centric knowledge of the user is updated based on the representation.

Figure 19:
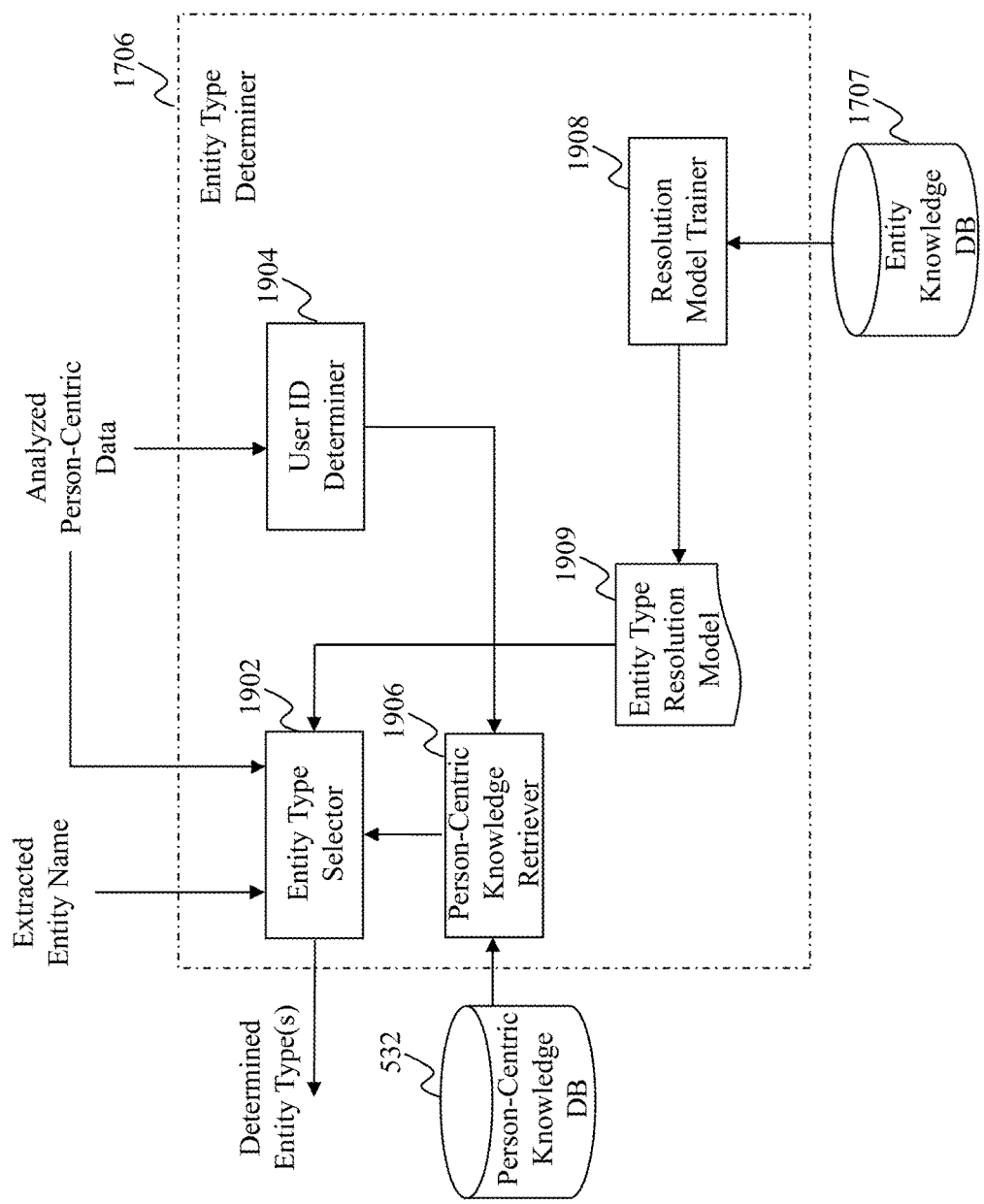
FIG. 19 shows an exemplary system diagram of an entity type determiner, according to an embodiment of the present teaching.

FIG. 19 shows an exemplary system diagram of an entity type determiner 1706, according to an embodiment of the present teaching. The entity type determiner 1706 in this example includes an entity type selector 1902, a user ID determiner 1904, a person-centric knowledge retriever 1906, an entity type resolution model 1909, and a resolution model trainer 1908.

The entity type selector 1902 in this example may receive an extracted entity name that can potentially be resolved to an entity of interest for a user. The entity type selector 1902 may also receive analyzed person-centric data from which the entity name is extracted. The analyzed person-centric data may include information about some features associated with the entity name. Based on the analyzed person-centric data and the entity name, the entity type selector 1902 may determine one or more entity types that the entity name may refer to, using the entity type resolution model 1909.

The entity type resolution model 1909 may be a deep machine learning model trained by the resolution model trainer 1908. The resolution model trainer 1908 may train the entity type resolution model 1909 based on some entities with known types from the entity knowledge DB 1707, either periodically or upon request. The entity type resolution model 1909 may specify distinct features associated with each entity type that may be referred to by the entity name. For example, the entity type resolution model 1909 may specify terms that usually co-occur with a given entity type. Based on the entity type resolution model 1909 and features associated with the entity name, the entity type selector 1902 may determine one or more entity types, each with a confidence score to indicate how likely the entity name refers to the entity type.

In one embodiment, the entity type selector 1902 may also determine an entity type for the entity name based on person-centric knowledge of the user. For example, if the entity name "Uncle Sam" is extracted from an email sent by Mike Smith to his son Daniel Smith, the entity type selector 1902 may determine that it is very likely for the entity name to refer to the entity "Sam Smith" as shown in the person-centric knowledge graph 2700 in FIG. 27, although "Uncle Sam" usually means the country United States. The user ID determiner 1904 in this example may determine a user ID associated with the person-centric data from which the entity name is extracted. The person-centric knowledge retriever 1906 in this example retrieves person-centric knowledge associated with the user ID, from a corresponding person-centric knowledge database 532. The person-centric knowledge retriever 1906 then sends the retrieved person-centric knowledge to the entity type selector 1902 for entity type determination. The entity type selector 1902 may send the determined one or more entity types to the resolution model trainer 1908 for further determining a specific individual referred to by the entity name under the entity types.

Figure 20:
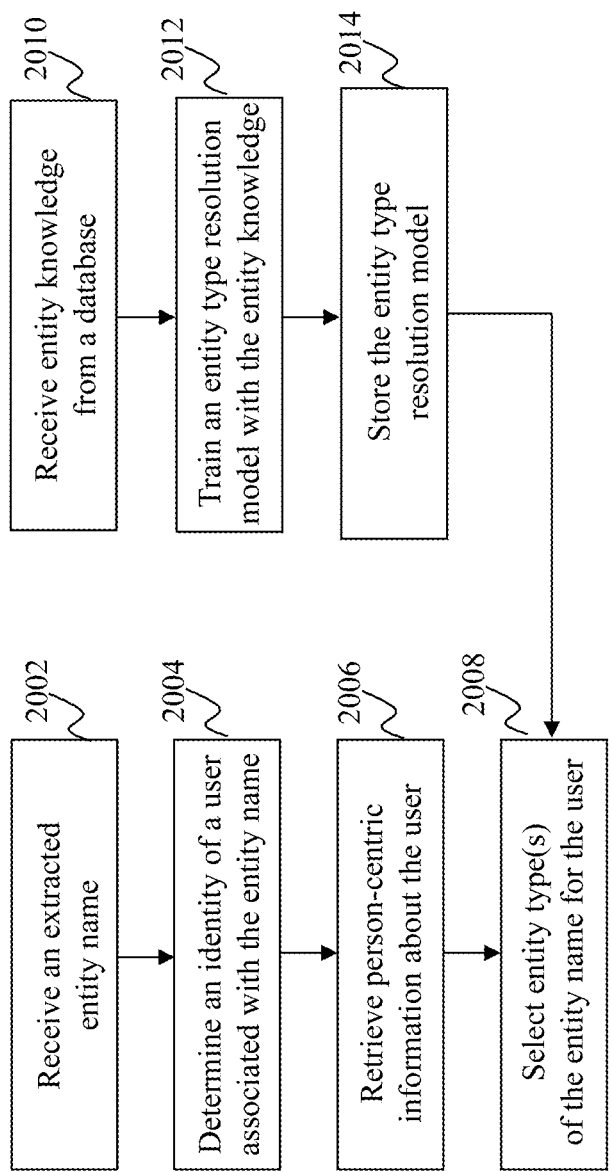
FIG. 20 shows a flow chart of an exemplary process performed by an entity type determiner, according to an embodiment of the present teaching.

FIG. 20 shows a flow chart of an exemplary process performed by an entity type determiner, according to an embodiment of the present teaching. At 2002, an extracted entity name is received with respect to a user. An identity of the user is determined at 2004. At 2006, person-centric information about the user is retrieved. The process then goes to 2008.

The entity type determiner may also perform steps 2010 to 2014 in parallel to 2002 to 2006. 2010 to 2014 may be performed periodically or upon request. At 2010, entity knowledge is received from a database. At 2012, an entity type resolution model is trained with the entity knowledge. The entity type resolution model is stored at 2014. The process then goes to 2008 as well.

At 2008, one or more entity types of the entity name are selected for the user, e.g., based on the stored entity type resolution model and/or the retrieved person-centric information about the user.

Figure 21:
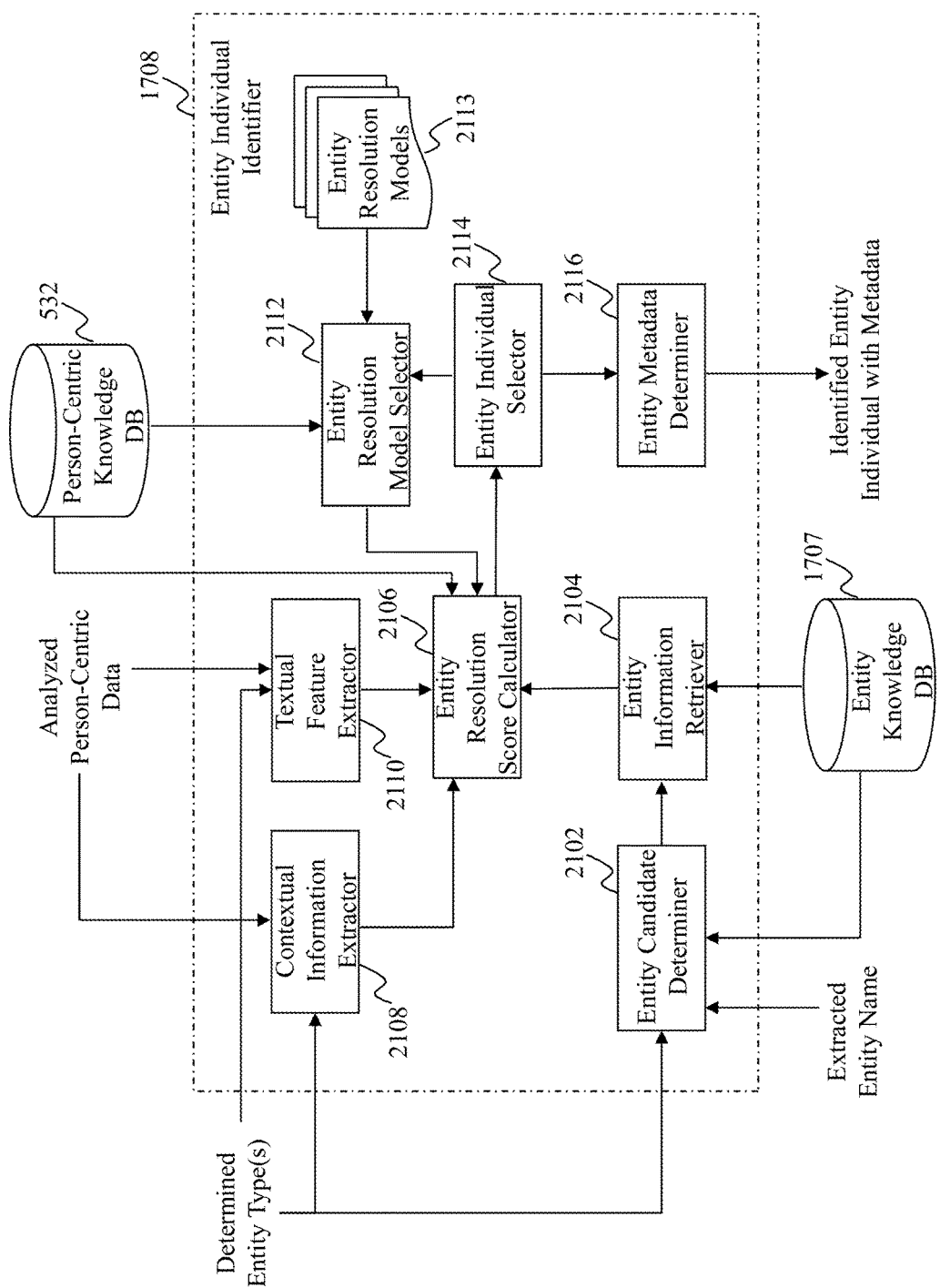
FIG. 21 shows an exemplary system diagram of an entity individual identifier, according to an embodiment of the present teaching.

FIG. 21 shows an exemplary system diagram of an entity individual identifier 1708, according to an embodiment of the present teaching. The entity individual identifier 1708 in this example includes an entity candidate determiner 2102, an entity information retriever 2104, an entity resolution score calculator 2106, a contextual information extractor 2108, a textual feature extractor 2110, an entity resolution model selector 2112, one or more entity resolution models 2113, an entity individual selector 2114, and an entity metadata determiner 2116.

The entity candidate determiner 2102 in this example receives the extracted entity name and the determined entity types that may be referred to by the extracted entity name. The entity candidate determiner 2102 can determine entity candidates for the extracted entity name, e.g., based on the determined entity types and knowledge from the entity knowledge DB 1707. For example, for a restaurant type entity name "McDonald," the entity candidate determiner 2102 may determine a list of McDonald restaurants that may be referred to by the entity name of interest here.

The entity information retriever 2104 may retrieve information associated with each entity candidate determined by the entity candidate determiner 2102 from the entity knowledge DB 1707. In one embodiment, the retrieved information may include information like: entity aliases, entity types, terms that usually co-occur with a given entity name or entity type, entity relationships, entity geographic information, etc. The entity information retriever 2104 may send the entity candidates along with their associated information to the entity resolution score calculator 2106 for calculating a score for each candidate.

The entity resolution score calculator 2106 in this example may calculate an entity resolution score for each of the entity candidates to indicate how likely the entity name refers to the entity candidate. This calculation may be based on contextual information, textual metadata and features with respect to the entity name from the person-centric data.

The contextual information extractor 2108 in this example may extract contextual information from the analyzed person-centric data based on the determined entity type. The contextual information may include relevant key phrases mentioned in the text, their position and distances from the mentioned entity name (including global mentions or local mentions near the entity name), tokens surrounding the mentioned entity name, etc. Different entity types may correspond to different contextual information to be used for resolution score calculation. For example, for a restaurant entity, useful contextual information may include location, operation hours, menu, user reviews, etc. For an entity referring to a person, useful contextual information may include how the user and the person call or refer to each other, the person's address, the person's full name, the person's title in the user's contact list, etc. After the contextual information extractor 2108 extracts the useful contextual information based on the determined entity type, the contextual information extractor 2108 may send it to the entity resolution score calculator 2106 for resolution score calculation.

The textual feature extractor 2110 in this example may extract textual metadata and features from the analyzed person-centric data, based on the determined entity type. The textual metadata, e.g., for a mail or email, may include location from which the mail was sent, date and time of the mail, type of mail, attachment information, discussion threads in the mail, etc. The textual features may include case (lowercase or uppercase) and POS tags of the entity name, other entity names and their distances, etc. Different entity types may correspond to different textual metadata and features to be used for resolution score calculation. For example, for an entity referring to a country, useful textual metadata and features may include location from which the mail was sent, case (lowercase or uppercase), the entity name, original language used in the mail, etc. After the textual feature extractor 2110 extracts the useful textual metadata and features based on the determined entity type, the textual feature extractor 2110 may send it to the entity resolution score calculator 2106 for resolution score calculation.

In one embodiment, the contextual information extractor 2108 and/or the textual feature extractor 2110 may extract all possibly useful information from the analyzed person-centric data without consideration of the determined entity types. The entity resolution score calculator 2106 can determine whether and which of the extracted information is useful based on an entity resolution model.

The entity resolution score calculator 2106 may also calculate the resolution scores based on prior user information with respect to the user obtained from the person-centric knowledge DB 532. The prior user information may include the user's location, contacts, gender, age, calendar data, etc. As discussed above, the entity resolution score calculator 2106 may also calculate the resolution scores for the entity candidates based on their respective associated information obtained from the entity knowledge DB 1707.

The entity resolution model selector 2112 in this example may select one of the entity resolution models 2113 for the resolution score calculation at the entity resolution score calculator 2106. An entity resolution model may indicate how to calculate a resolution score for an entity candidate based on the extracted contextual and textual information, and the prior user and entity information. Different entity resolution models may assign different weights to these different types of information. The entity resolution model selector 2112 may select an entity resolution model based on person-centric data from the user's person-centric knowledge database 532.

In one example, for an entity referring to a person, the person-centric data may show that the user usually puts declared relationships with the person at the beginning or ending of an email. In that case, the entity resolution model selector 2112 may select an entity resolution model to put more weights on the contextual information than other information for resolution score calculation.

In another example, for an entity referring to a business, the person-centric data may show that the user usually gives comments about the business in contexts, which may include description, identity and location information about the business. In that case, the entity resolution model selector 2112 may select an entity resolution model to put more weight on these contexts than on other information for resolution score calculation.

In yet another example, for an entity referring to a country or title, the person-centric data may show that the user usually uses fixed case (lowercase or uppercase) and fixed acronyms (e.g., Ph.D., M.D., etc.) to refer to the entity. In that case, the entity resolution model selector 2112 may select an entity resolution model to put more weight on the textual metadata and features than on other information for resolution score calculation.

In still another example, for an entity name "McDonald," the person-centric data may show that the user has a preference or pattern to use "McDonald" to refer to a specific friend but use "McDonalds" to refer to a restaurant. In that case, the entity resolution model selector 2112 may select an entity resolution model to put more weight on the user preference information than on other information for resolution score calculation.

Based on the entity resolution model selected by the entity resolution model selector 2112, the entity resolution score calculator 2106 may calculate an entity resolution score for each entity candidate associated with the entity name, and send the scores to the entity individual selector 2114. The entity individual selector 2114 may select an entity individual from the entity candidates based on their respective scores.

In one embodiment, the entity individual selector 2114 may select the entity candidate having the highest score to be the identified individual. If there are two entity candidates having the same highest score, the entity individual selector 2114 may inform the entity resolution model selector 2112 to select another resolution model for another round of resolution score calculation at the entity resolution score calculator 2106. The entity individual selector 2114 may then combine the scores from two rounds and make a determination thereby.

In another embodiment, the entity individual selector 2114 may select one or more entity candidates having scores higher than a threshold, and inform the entity resolution model selector 2112 to select another resolution model for another round of resolution score calculation at the entity resolution score calculator 2106 regarding the one or more entity candidates. The entity individual selector 2114 may then further narrow down the candidate list with another threshold until there is one entity candidate left. The entity individual selector 2114 can then identify the entity individual based on the remaining entity candidate. The entity individual selector 2114 may send the identified entity individual to the entity metadata determiner 2116.

The entity metadata determiner 2116 can determine metadata associated with the entity individual. The metadata may include the source of the entity, time and date the entity individual is identified, model used to identify the entity individual, and also useful contextual and textual information related to the entity individual. The useful contextual and textual information may be a subset of the contextual and textual information used by the entity resolution score calculator 2106 to calculate resolution scores, because some contextual and textual information, although related to the entity name in general, may not be related to the specific entity individual. The entity metadata determiner 2116 may send the identified entity individual with metadata to the person-centric knowledge represent engine 1712 and the entity relationship determiner 1710.

It can be understood that the entity individual identifier 1708 may identify an individual for an entity name regardless of how many entity types are determined for the entity name. The entity individual identifier 1708 can calculate scores for all possible candidates in the entity types, and select the best candidate based on the scores.

Figure 22:
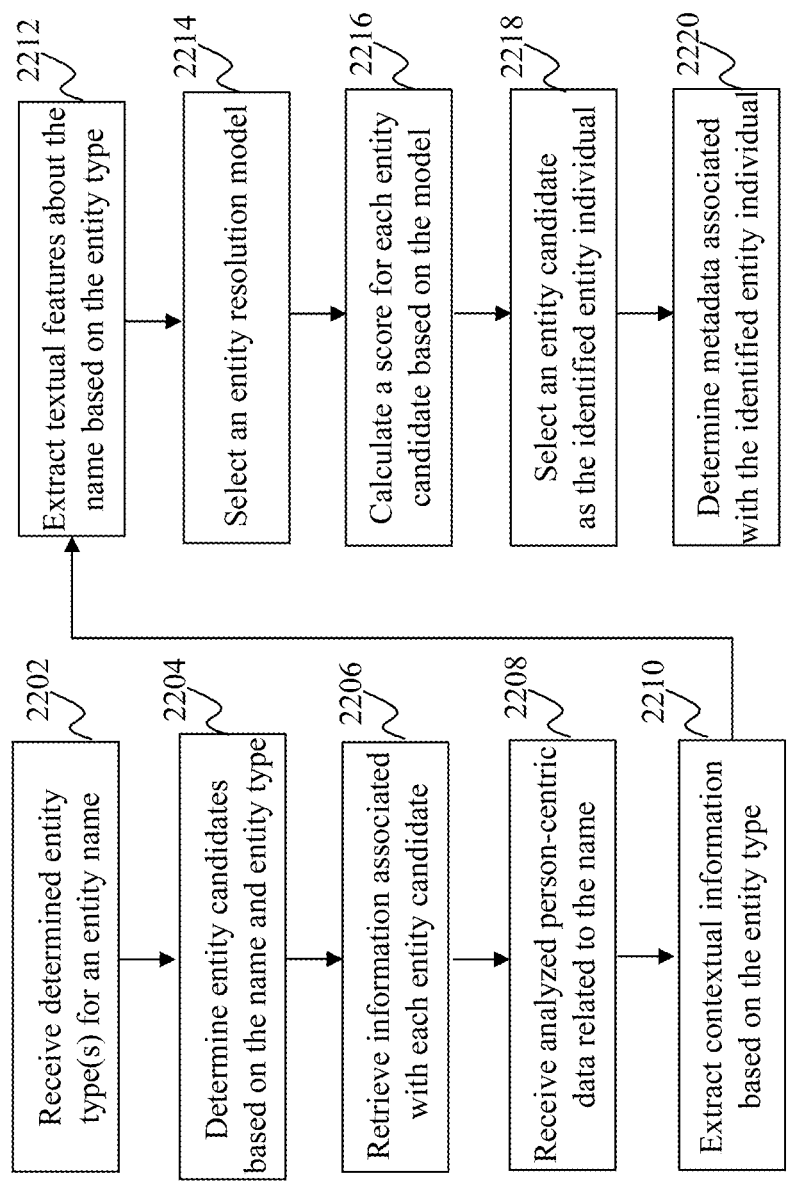
FIG. 22 shows a flow chart of an exemplary process performed by an entity individual identifier, according to an embodiment of the present teaching.

FIG. 22 shows a flow chart of an exemplary process performed by an entity individual identifier, according to an embodiment of the present teaching. At 2202, determined entity type(s) are received for an entity name. One or more entity candidates are determined at 2204 based on the name and the entity type(s). At 2206, information associated with each entity candidate is retrieved. Analyzed person-centric data related to the name is received at 2208.

Contextual information about the entity name is extracted at 2210 based on the entity type. Textual features and metadata about the entity name are extracted at 2212 based on the entity type. An entity resolution model is selected at 2214. Based on the model, a score is calculated at 2216 for each entity candidate. An entity candidate is selected at 2218 as the identified entity individual. At 2220, metadata associated with the identified entity individual is determined.

Figure 23:
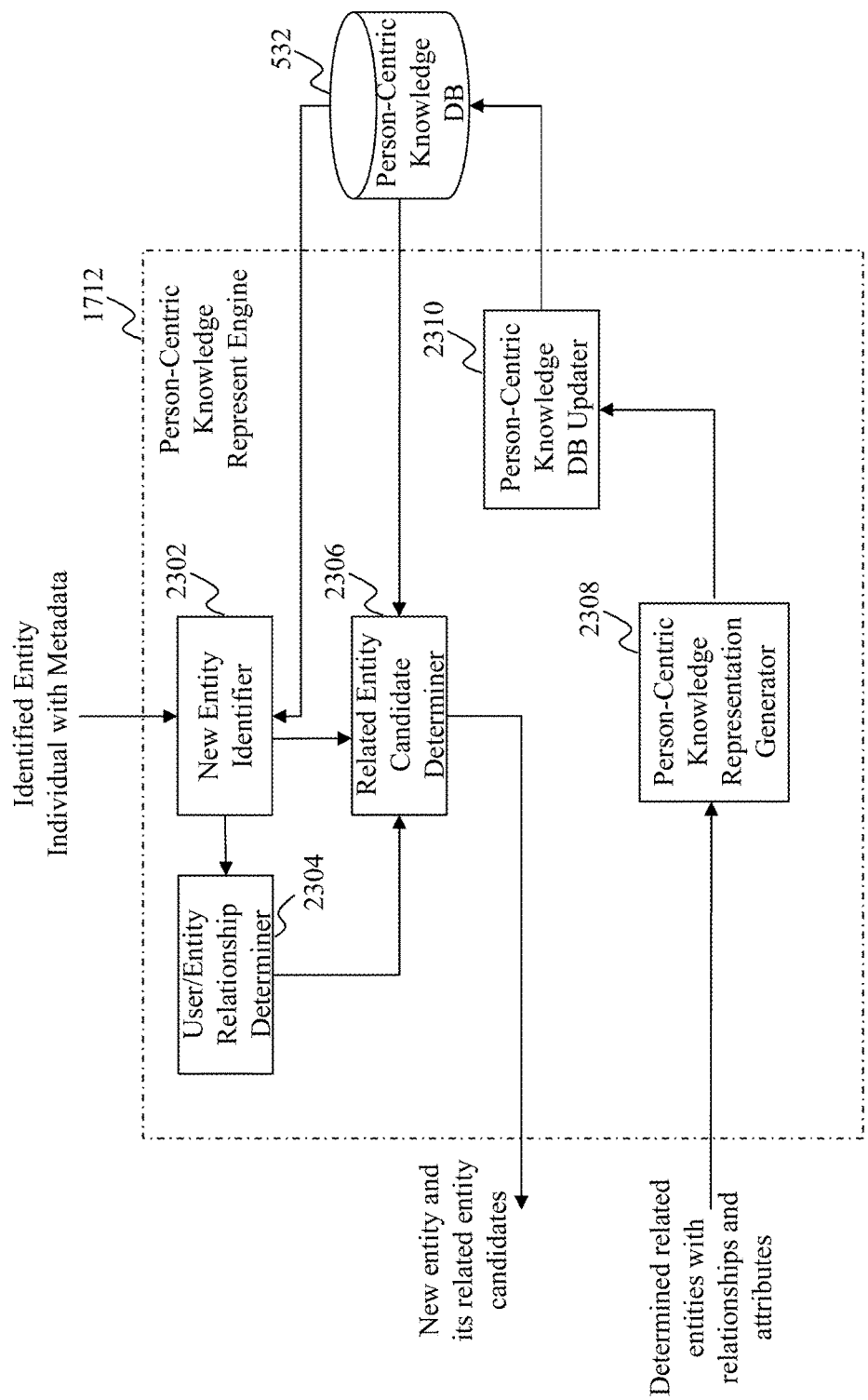
FIG. 23 shows an exemplary system diagram of a person-centric knowledge represent engine, according to an embodiment of the present teaching.

FIG. 23 shows an exemplary system diagram of a person-centric knowledge represent engine 1712, according to an embodiment of the present teaching. The person-centric knowledge represent engine 1712 in this example includes a new entity identifier 2302, a user/entity relationship determiner 2304, a related entity candidate determiner 2306, a person-centric knowledge representation generator 2308, and a person-centric knowledge DB updater 2310.

The new entity identifier 2302 in this example can receive identified entity individual with metadata from the entity individual identifier 1708, and identify a new entity to be added to the person-centric knowledge DB 532. The new entity may be an entity that is not in the person-centric knowledge representation of the user, or an entity that may bring new relationships or other new information to the person-centric knowledge representation of the user. In one embodiment, there is no person-centric knowledge representation for the user yet. Then the new entity identifier 2302 may identify every extracted and resolved entity as a new entity for generating a person-centric knowledge representation associated with the user. The new entity identifier 2302 may send the identified new entity to the user/entity relationship determiner 2304 and the related entity candidate determiner 2306.

The user/entity relationship determiner 2304 may determine a relationship between the user and the new entity. In one embodiment, some new entities are not related to the user, or have a relationship that is very indirect and not close at all. In that case, the person-centric knowledge represent engine 1712 may include in the person-centric knowledge representation only other new entities that have relationships or close relationships with the user.

The related entity candidate determiner 2306 may retrieve entities that are potentially related to the new entity from the user's person-centric knowledge DB 532. This retrieval may depend on the entity type of the new entity and/or the relationship between the new entity and the user. In one example, if the new entity is a school where the user's son goes to, entities related to the user's son may be retrieved from the person-centric knowledge representation, with metadata, relationship, and attributes. In another example, if the new entity is a time related to an event, more entities related to the event may be retrieved from the person-centric knowledge representation, with metadata, relationships, and attributes. The retrieved entities are candidates to be analyzed for determining whether there is a relationship between each retrieved entity and the new entity. In another embodiment, the related entity candidate determiner 2306 may retrieve entities that are potentially related to the new entity from the user's person-centric knowledge DB 532, and then select some of the retrieved entities as the entity candidates, based on the entity type of the new entity and/or the relationship between the new entity and the user.

The related entity candidate determiner 2306 may then send the new entity and its related entity candidates to the entity relationship determiner 1710 for determining which of these candidates are related to the new entity, and what are the relationships and attributes associated with the relationships. The person-centric knowledge representation generator 2308 can receive the determined related entities with relationships and attributes from the entity relationship determiner 1710 and generate a person-centric knowledge representation for these related entities, the new entity, and their relationships. This may become a subset of the person-centric knowledge representation of all knowledge about the user stored in the person-centric knowledge DB 532. The person-centric knowledge DB updater 2310 may use the representation generated at the person-centric knowledge representation generator 2308 to update the person-centric knowledge representation stored in the person-centric knowledge DB 532.

Figure 24:
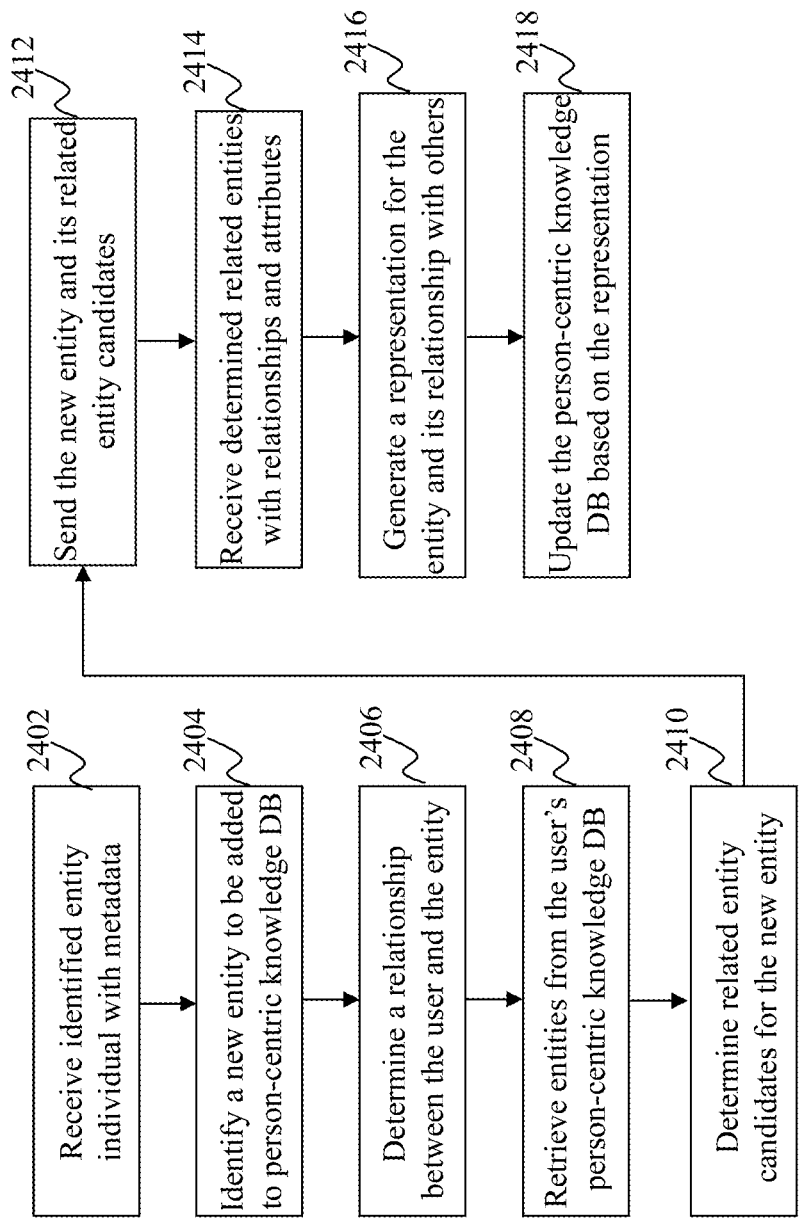
FIG. 24 shows a flow chart of an exemplary process performed by a person-centric knowledge represent engine, according to an embodiment of the present teaching.

FIG. 24 shows a flow chart of an exemplary process performed by a person-centric knowledge represent engine, according to an embodiment of the present teaching. At 2402, an identified entity individual is received with metadata. A new entity is identified at 2404 to be added to the person-centric knowledge DB. A relationship is determined at 2406 between the user and the new entity. At 2408, entities are retrieved from the user's person-centric knowledge DB. Related entity candidates are determined for the new entity at 2410.

The new entity and its related entity candidates are sent at 2412. Determined related entities are received at 2414 with relationships and attributes. A representation is generated at 2416 for the entity and its relationship with others. At 2418, the person-centric knowledge DB is updated based on the representation.

Figure 25:
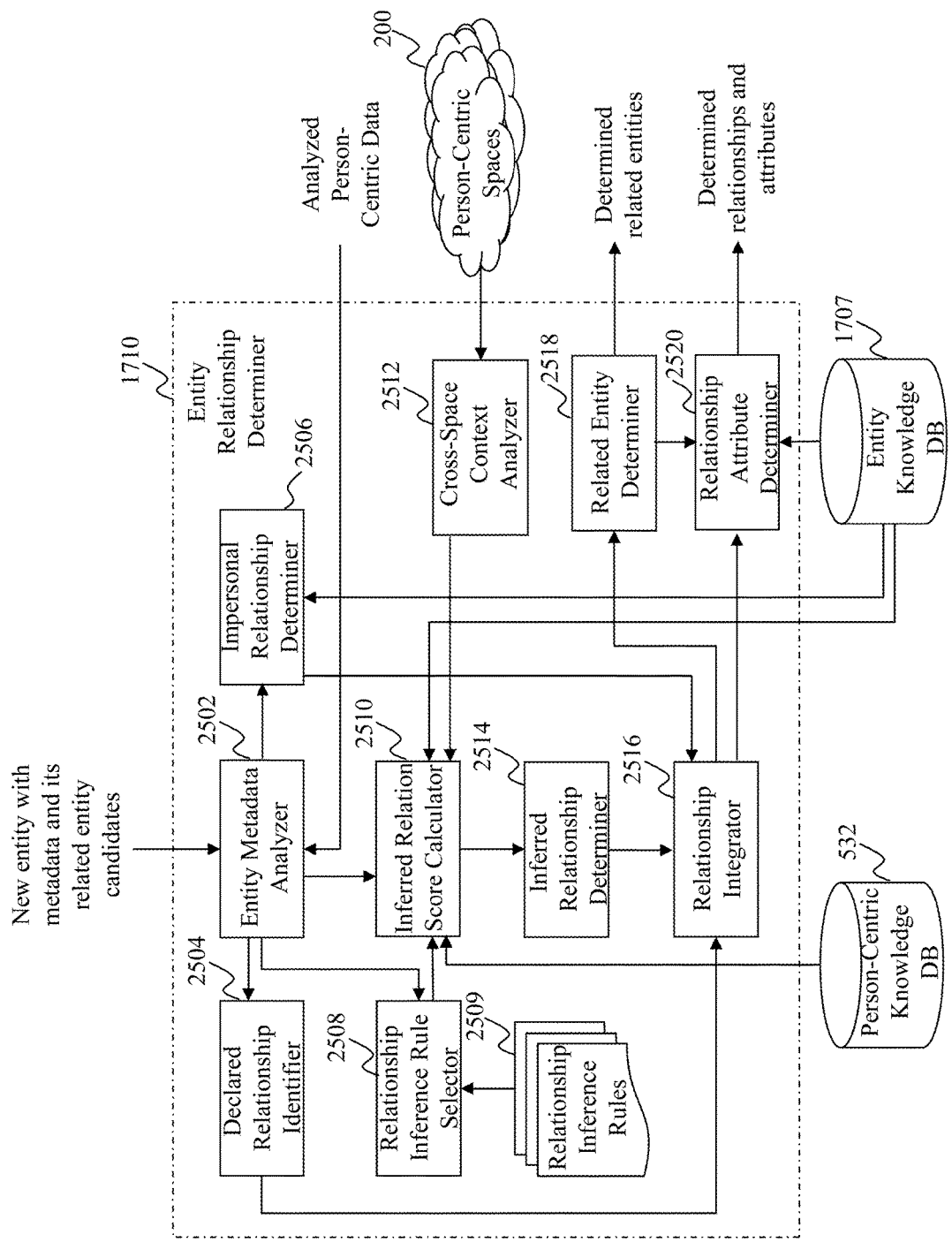
FIG. 25 shows an exemplary system diagram of an entity relationship determiner, according to an embodiment of the present teaching.

FIG. 25 shows an exemplary system diagram of an entity relationship determiner 1710, according to an embodiment of the present teaching. The entity relationship determiner 1710 in this example includes an entity metadata analyzer 2502, a declared relationship identifier 2504, an impersonal relationship determiner 2506, a relationship inference rule selector 2508, one or more relationship inference rules 2509, an inferred relation score calculator 2510, a cross-space context analyzer 2512, an inferred relationship determiner 2514, a relationship integrator 2516, a related entity determiner 2518, a relationship attribute determiner 2520.

The entity metadata analyzer 2502 in this example analyzes new entity with metadata and its related entity candidates. The analysis may be based on the analyzed person-centric data from which the new entity was extracted. The entity metadata analyzer 2502 may determine possible places in the data to find relationships of interest based on the analysis. The entity metadata analyzer 2502 may send the analysis result to the declared relationship identifier 2504, the impersonal relationship determiner 2506, and the inferred relation score calculator 2510.

The declared relationship identifier 2504 may identify declared relationships between the new entity and some related entity candidates. For example, in a user's email or post, the user has declared that entity "New York" is the city where he was born, or has referred to the entity "Mary" as his wife. The declared relationship identifier 2504 may send the identified declared relationships to the relationship integrator 2516 for relationship integration.

The impersonal relationship determiner 2506 may determine impersonal relationships between the new entity and some related entity candidates. The impersonal relationships may be predetermined based on general knowledge from the entity knowledge DB 1707 and not be dependent on the user. For example, the new entity "US open" is related to the retrieved entity candidate "tennis" based on general knowledge, instead of the user's person-centric knowledge. The impersonal relationship determiner 2506 may send the determined impersonal relationships to the relationship integrator 2516 for relationship integration.

Some entity candidates may be related to the new entity based on an inferred relationship that is not declared and not based on general knowledge. The inferred relation score calculator 2510 may calculate an inferred relation score to indicate how likely an entity candidate is related to a new entity based on an inferred relationship. The inference may be based on person-centric data of the user and/or other users related to the user. For example, a user may tell his son in one email that "your uncle is coming to have a dinner with us this weekend," and in another email that "let us have salmon this weekend, because Sam loves that." Based on the two emails from the person-centric knowledge DB 532, the entity relationship determiner 1710 may infer that Sam is the user's brother and the user's son's uncle, although this was not declared in either email. In another example, a user may tell a friend in a text message that "let's play tennis this afternoon, and see you at the usual place." If the "usual place" cannot be identified based on the user's person-centric data, the entity relationship determiner 1710 may infer that a specific location is the "usual place" based on the friend's person-centric data, e.g., GPS data, an email to the friend's wife, etc., from the person-centric spaces 200. The cross-space context analyzer 2512 may retrieve and analyze these person-centric data from multiple person-centric spaces 200, and send the data to the inferred relation score calculator 2510 for inference score calculation.

The inferred relation score calculator 2510 may calculate the inferred relation scores based on a relationship inference rule selected by the relationship inference rule selector 2508. The relationship inference rule selector 2508 may select one of the relationship inference rules 2509 based on metadata of the new entity. For example, if the new entity has contextual information referring to another data source associated with user, e.g., another email, another post, etc., the relationship inference rule selector 2508 may select a relationship inference rule to infer relationships based on multiple data sources of the user. In another example, if the new entity has only been referred to in an email from the user to a second user, the relationship inference rule selector 2508 may select a relationship inference rule to infer relationships based on person-centric knowledge about the user and the second user. Based on the selected relationship inference rule, the inferred relation score calculator 2510 can calculate an inferred relation score for each inferred relationship between the new entity and a retrieved entity candidate.

The inferred relationship determiner 2514 in this example may determine inferred relationships based on the relation scores. In one embodiment, the inferred relationship determiner 2514 may compare the relation scores with a threshold, and determine inferred relationships that having relation scores higher than the threshold. In another embodiment, the inferred relationship determiner 2514 may rank the relation scores and determine inferred relationships having relation scores at a predetermined top percentage of all relation scores. The inferred relationship determiner 2514 may also send the inferred relationships to the relationship integrator 2516 for relationship integration.

The relationship integrator 2516 may receive the declared relationships, the impersonal relationships, and the inferred relationships, each of which is between the new entity and a related entity candidate. The relationship integrator 2516 can integrate these relationships by merging multiple consistent relationships and/or selecting among multiple inconsistent relationships. For example, if the declared relationship identifier 2504 identifies that the user declared that he was born in New York City, and the inferred relationship determiner 2514 infers that the user is living in New York City now, the relationship integrator 2516 can combine these two relationships for both of them to be put into a knowledge graph about the user, because the two relationships do not contradict each other. In another example, if the declared relationship identifier 2504 identifies that the user declared that he was born in New York City, and the inferred relationship determiner 2514 infers that the user was born in Los Angeles, the relationship integrator 2516 can use the declared relationship to trump the inferred relationship for generation or update of a knowledge graph about the user, because the two relationships contradict each other. In general, when there are multiple relationships that are related to the same two entities and contradict each other, the declared relationship and the impersonal relationship may trump the inferred relationship; and the declared relationship may trump the impersonal relationship, or vice versa. The relationship integrator 2516 may send the integrated relationships, each of which is between the new entity and a related entity candidate, to the related entity determiner 2518 and the relationship attribute determiner 2520.

The related entity determiner 2518 in this example determines related entities from the candidates based on the integrated relationships. Each related entity determined at the related entity determiner 2518 has at least one integrated relationship with the new entity. The related entity determiner 2518 may send the determined related entities to the person-centric knowledge represent engine 1712 for person-centric knowledge representation generation or update.

The relationship attribute determiner 2520 may determine one or more attributes for each determined or integrated relationship. The attributes may be determined based on information about the entities of interest, the relationship of interest, and general knowledge from the entity knowledge DB 1707. Examples of attributes for a relationship can be found in FIG. 15 and FIG. 27. The relationship attribute determiner 2520 may send the determined relationships and attributes to the person-centric knowledge represent engine 1712 for person-centric knowledge representation generation or update.

Figure 26:
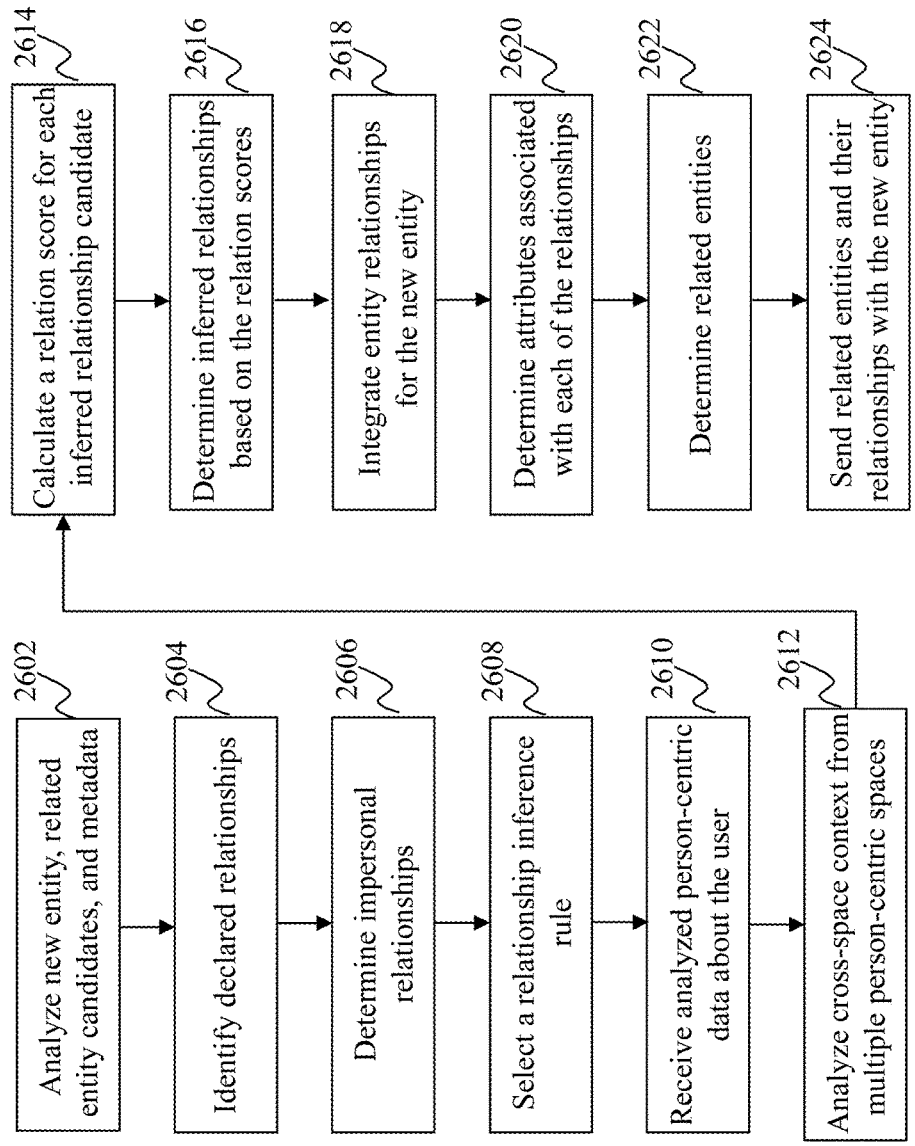
FIG. 26 shows a flow chart of an exemplary process performed by an entity relationship determiner, according to an embodiment of the present teaching.

FIG. 26 shows a flow chart of an exemplary process performed by an entity relationship determiner, according to an embodiment of the present teaching. At 2602, new entities, related entity candidates, and their metadata are analyzed. Declared relationships are identified at 2604. Impersonal relationships are determined at 2606. A relationship inference rule is selected at 2608. At 2610, analyzed person-centric data about the user is received. At 2612, cross-space contexts from multiple person-centric spaces are analyzed.

A relation score for each inferred relationship candidate is calculated at 2614. Inferred relationships are determined at 2616 based on the relation scores. Entity relationships are integrated at 2618 for the new entity. One or more attributes associated with each of the relationships are determined at 2620. At 2622, the related entities are determined based on the integrated relationships. At 2624, related entities and their relationships with the new entity are sent with associated attributes.

In one embodiment, the system disclosed in the present teaching may be integrated into the CAP (Content Analysis Platform) framework, which is a Natural Language Processing System for meta-data detection and enrichments. A dedicated component may be created for detecting and resolving each particular kind of entity. It may first collect the mentioned entities using CAP components, such as regular expressions for phones, emails, dates, and times, dictionary matching to detect concepts such as events or places and Named Entity Recognizer for person names. It may then create a candidate pool for each relevant entity. Using the context of the mail and external data, such as user contact lists or a knowledge base, it may create a set of features for each kind of entities to be resolved. Heuristics or Machine Learning models may be applied over the generated features to score and select the best candidate to determine the final entity for each use case.

Figure 28:
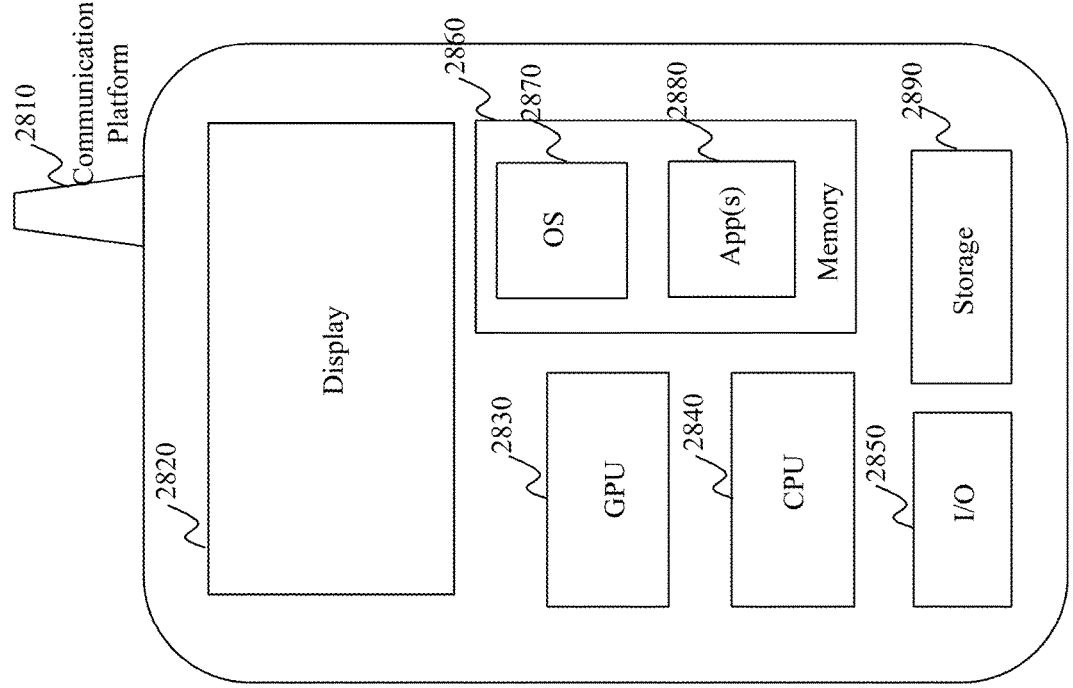
FIG. 28 depicts the architecture of a mobile device which can be used to implement a specialized system incorporating the present teaching.

FIG. 28 depicts the architecture of a mobile device which can be used to realize a specialized system implementing the present teaching. In this example, the user device on which a person-centric knowledge graph is presented and interacted with is a mobile device 2800, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 2800 in this example includes one or more central processing units (CPUs) 2840, one or more graphic processing units (GPUs) 2830, a display 2820, a memory 2860, a communication platform 2810, such as a wireless communication module, storage 2890, and one or more input/output (I/O) devices 2850. Any other suitable component, including but not limited to a system bus or a controller (not shown), may also be included in the mobile device 2800. As shown in FIG. 28, a mobile operating system 2870, e.g., iOS, Android, Windows Phone, etc., and one or more applications 2880 may be loaded into the memory 2860 from the storage 2890 in order to be executed by the CPU 2840. The applications 2880 may include a browser or any other suitable mobile apps for receiving cards or person-centric knowledge graphs on the mobile device 2800. User interactions with the cards or other content items may be achieved via the I/O devices 2850 and provided to the person-centric index system 202.

To implement various modules, units, and their functionalities described in the present disclosure, computer hardware platforms may be used as the hardware platform(s) for one or more of the elements described herein (e.g., the knowledge engine 530, and/or other components described with respect to FIGS. 1-27). The hardware elements, operating systems and programming languages of such computers are conventional in nature, and it is presumed that those skilled in the art are adequately familiar therewith to adapt those technologies to disambiguate extracted entity and build person-centric knowledge representation as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 29:
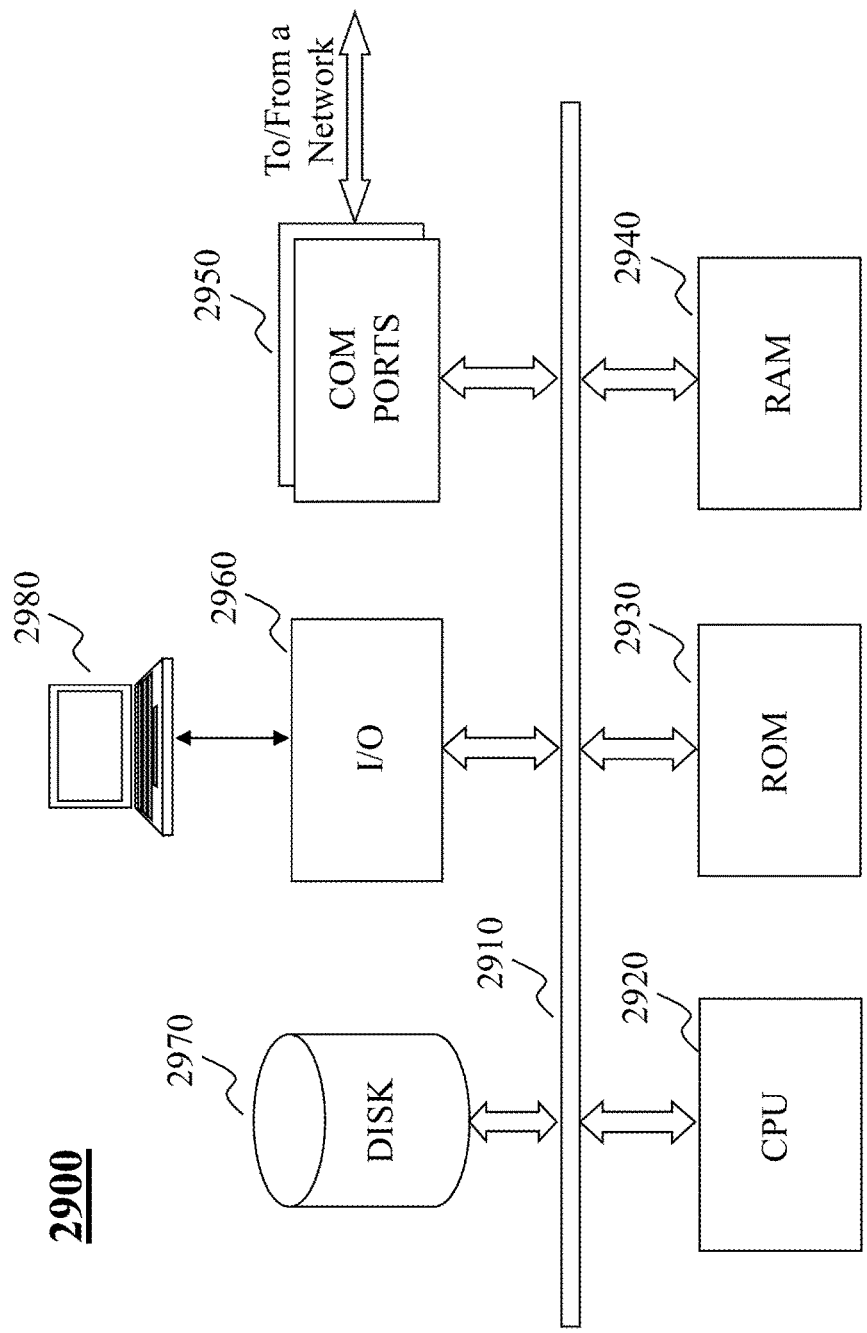
FIG. 29 depicts the architecture of a computer which can be used to implement a specialized system incorporating the present teaching.

FIG. 29 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 2900 may be used to implement any component of entity disambiguation and knowledge representation construction techniques, as described herein. For example, the person-centric knowledge engine 1700, etc., may be implemented on a computer such as computer 2900, via its hardware, software program, firmware, or a combination thereof. Although only one such computer is shown, for convenience, the computer functions relating to entity disambiguation and knowledge representation construction as described herein may be implemented in a distributed fashion on a number of similar platforms, to distribute the processing load.

The computer 2900, for example, includes COM ports 2950 connected to and from a network connected thereto to facilitate data communications. The computer 2900 also includes a central processing unit (CPU) 2920, in the form of one or more processors, for executing program instructions. The exemplary computer platform includes an internal communication bus 2910, program storage and data storage of different forms, e.g., disk 2970, read only memory (ROM) 2930, or random access memory (RAM) 2940, for various data files to be processed and/or communicated by the computer, as well as possibly program instructions to be executed by the CPU. The computer 2900 also includes an I/O component 2960, supporting input/output flows between the computer and other components therein such as user interface elements 2980. The computer 2900 may also receive programming and data via network communications.

Hence, aspects of the methods of entity disambiguation and knowledge representation construction, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with entity disambiguation and knowledge representation construction. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the entity disambiguation and knowledge representation construction as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for generating a representation associated with a user, the method comprising:

training, via deep machine learning, and based on entities with known entity types from a knowledge database, an entity type resolution model specifying features, associated with each of the known entity types, that may be referred to by names of the entities;

extracting, from electronic content associated with the user, an entity name;

determining multiple entity types associated with the entity name;

estimating, using the trained entity type resolution model and based on one or more features in the entity name, one of the multiple entity types as an estimated entity type associated with the entity name based on contextual information of the electronic content, wherein the one of the multiple entity types includes one or more features corresponding to the one or more features in the entity name;

identifying one or more entity candidates with respect to each of the multiple entity types;

calculating, for each of the one or more entity candidates in each of the multiple entity types, a resolution score based on person-centric knowledge related to the user;

selecting, based on the estimated entity type and the resolution scores for the entity candidates for the multiple entity types, one of the entity candidates; and generating, based on the selected entity candidate, the representation associated with the user for providing a response to a query issued by the user.

2. The method of claim 1, wherein the contextual information comprises one or more of demographic information, locale information, temporal information, user device information, and user-session information.

3. The method of claim 1, wherein the electronic content comprises an email in which the entity name is mentioned at the beginning or ending of the email, and the selected entity resolution model puts more weight on the email than other information in the content.

4. The method of claim 1, wherein the representation is a graph.

5. A non-transitory, computer-readable medium having information recorded thereon for generating a representation associated with a user, wherein the information, when read by a machine, causes the machine to perform operations comprising:

training, via deep machine learning, and based on entities with known entity types from a knowledge database, an entity type resolution model specifying features, associated with each of the known entity types, that may be referred to by names of the entities;

extracting from electronic content associated with the user, an entity name;

determining multiple entity types associated with the entity name;

estimating, using the trained entity type resolution model and based on one or more features in the entity name, one of the multiple entity types as an estimated entity type associated with the entity name based on contextual information of the electronic content, wherein the one of the multiple entity types includes one or more features corresponding to the one or more features in the entity name;

identifying one or more entity candidates with respect to each of the multiple entity types;

calculating, for each of the one or more entity candidates in each of the multiple entity types, a resolution score based on person-centric knowledge related to the user;

selecting, based on the estimated entity type and the resolution scores for the entity candidates for the multiple entity types, one of the entity candidates; and generating, based on the selected entity candidate, the representation associated with the user for providing a response to a query issued by the user.

6. The medium of claim 5, wherein the contextual information comprises one or more of demographic information, locale information, temporal information, user device information, and user-session information.

7. The medium of claim 5, wherein the electronic content comprises an email in which the entity name is mentioned at the beginning or ending of the email, and the selected entity resolution model puts more weight on the email than other information in the content.

8. The medium of claim 5, wherein the representation is a graph.

9. A system for advertising, the system comprising:

memory storing computer program instructions; and one or more processors that, in response to executing the computer program instructions, effectuate operations comprising:

training, via deep machine learning, and based on entities with known entity types from a knowledge database, an entity type resolution model specifying features, associated with each of the known entity types, that may be referred to by names of the entities;

extracting from electronic content associated with the user, an entity name;

determining multiple entity types associated with the entity name;

estimating, using the trained entity type resolution model and based on one or more features in the entity name, one of the multiple entity types as an estimated entity type associated with the entity name based on contextual information of the electronic content, wherein the one of the multiple entity types includes one or more features corresponding to the one or more features in the entity name;

identifying one or more entity candidates with respect to each of the multiple entity types;

calculating, for each of the one or more entity candidates in each of the multiple entity types, a resolution score based on person-centric knowledge related to the user;

selecting, based on the estimated entity type and the resolution scores for the entity candidates for the multiple entity types, one of the entity candidates; and generating, based on the selected entity candidate, the representation associated with the user for providing a response to a query issued by the user.

10. The system of claim 9, wherein the contextual information comprises one or more of demographic information, locale information, temporal information, user device information, and user-session information.

11. The system of claim 9, wherein the electronic content comprises an email in which the entity name is mentioned at the beginning or ending of the email, and the selected entity resolution model puts more weight on the email than other information in the content.

\* \* \* \* \*